(12) United States Patent
Harada et al.

(10) Patent No.: US 11,674,858 B2
(45) Date of Patent: Jun. 13, 2023

(54) HEAT FLUX SENSOR AND METHOD OF MANUFACTURING THE SAME

(71) Applicants: DENSO CORPORATION, Kariya (JP); TOYOTA JIDOSHA KABUSHIKI KAISHA, Toyota (JP)

(72) Inventors: Toshikazu Harada, Kariya (JP); Atusi Sakaida, Kariya (JP); Toshihisa Taniguchi, Kariya (JP); Tomohiro Imura, Kariya (JP); Hayato Watanabe, Kariya (JP); Masaya Hirabayashi, Kariya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 1130 days.

(21) Appl. No.: 16/317,046

(22) PCT Filed: Jul. 7, 2017

(86) PCT No.: PCT/JP2017/024985
§ 371 (c)(1),
(2) Date: Jan. 11, 2019

(87) PCT Pub. No.: WO2018/012430
PCT Pub. Date: Jan. 18, 2018

(65) Prior Publication Data
US 2019/0226923 A1    Jul. 25, 2019

(30) Foreign Application Priority Data

Jul. 12, 2016 (JP) ............................ JP2016-137608
May 22, 2017 (JP) ............................ JP2017-101012

(51) Int. Cl.
*G01K 17/20* (2006.01)
*B29C 43/18* (2006.01)
(Continued)

(52) U.S. Cl.
CPC .............. *G01K 17/20* (2013.01); *B29C 43/18* (2013.01); *B29K 2101/12* (2013.01); *B29K 2995/0013* (2013.01); *B29L 2031/34* (2013.01)

(58) Field of Classification Search
CPC ......... B29C 43/18; G01K 17/20; H01L 35/32; B29K 2079/085; B29K 2101/12; B29K 2995/0013; B29L 2031/34
See application file for complete search history.

(56) References Cited

U.S. PATENT DOCUMENTS

2015/0144171 A1    5/2015   Taniguchi et al.
2015/0308906 A1*  10/2015   Durrer ................... G01K 17/20
                                                           374/29
2017/0213953 A1    7/2017   Taniguchi et al.

FOREIGN PATENT DOCUMENTS

| JP | H11046021 A | 2/1999 |
| JP | 2007116086 A | 5/2007 |
| JP | 2014007376 A | 1/2014 |

* cited by examiner

*Primary Examiner* — Michael M. Robinson
*Assistant Examiner* — Victoria Bartlett
(74) *Attorney, Agent, or Firm* — Harness, Dickey & Pierce, P.L.C.

(57) ABSTRACT

A heat flux sensor is provided with a main body which detects heat flux, and filling members. The main body has a first surface. The first surface has an uneven shape, with a plurality of concave portions and a plurality of convex portions. The filling members are filled in the plurality of concave portions. Surfaces of the filling members constitutes a part of an outer surface of the heat flux sensor. The degree of flatness of the outer surface is higher than the degree of flatness of the first surface of the main body.

11 Claims, 57 Drawing Sheets

(51) Int. Cl.
*B29K 101/12* (2006.01)
*B29L 31/34* (2006.01)

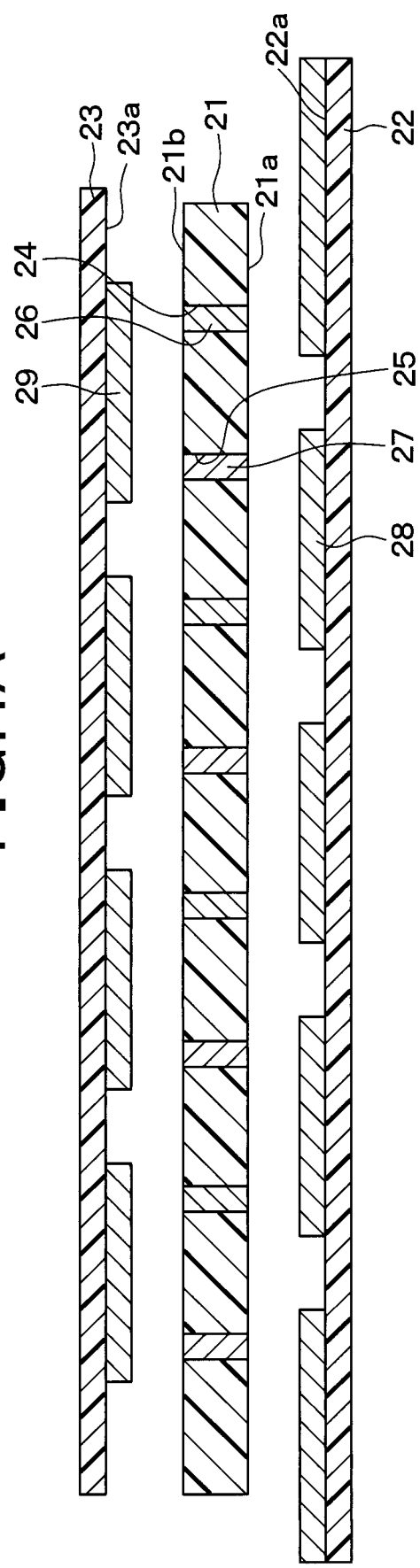

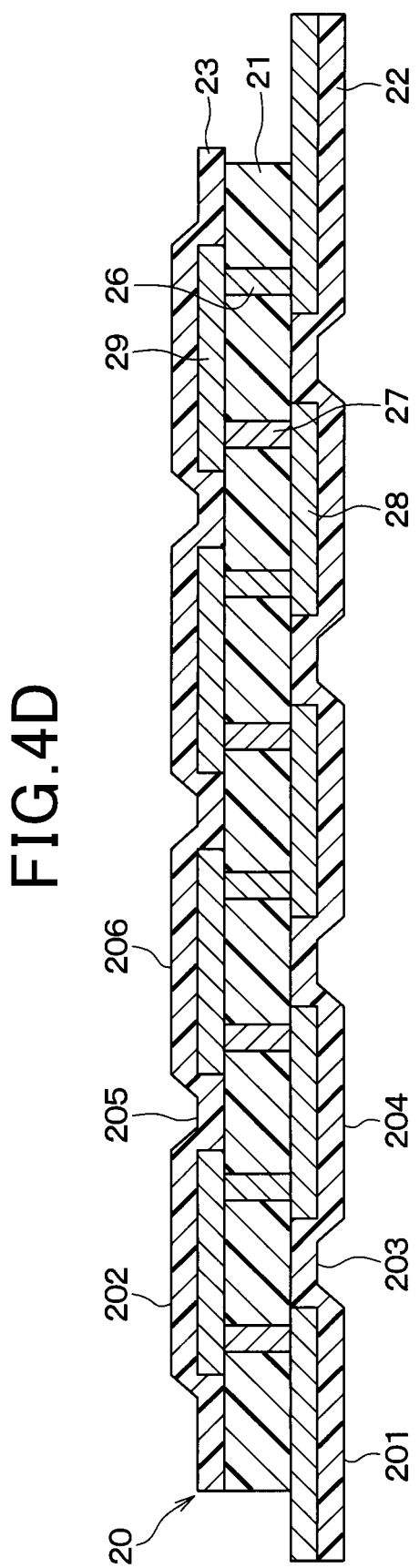

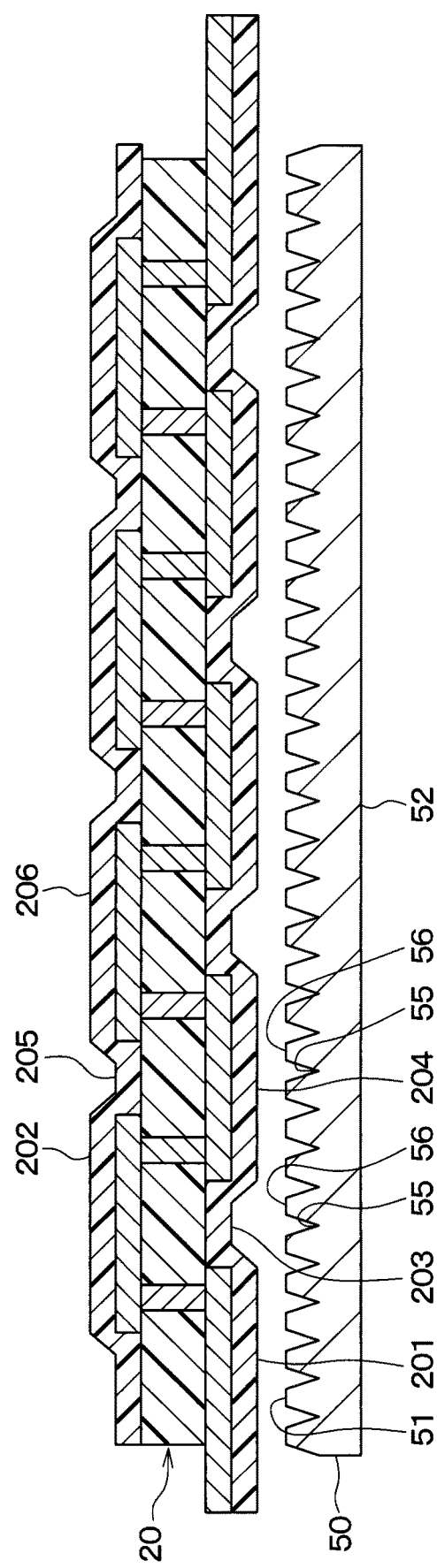

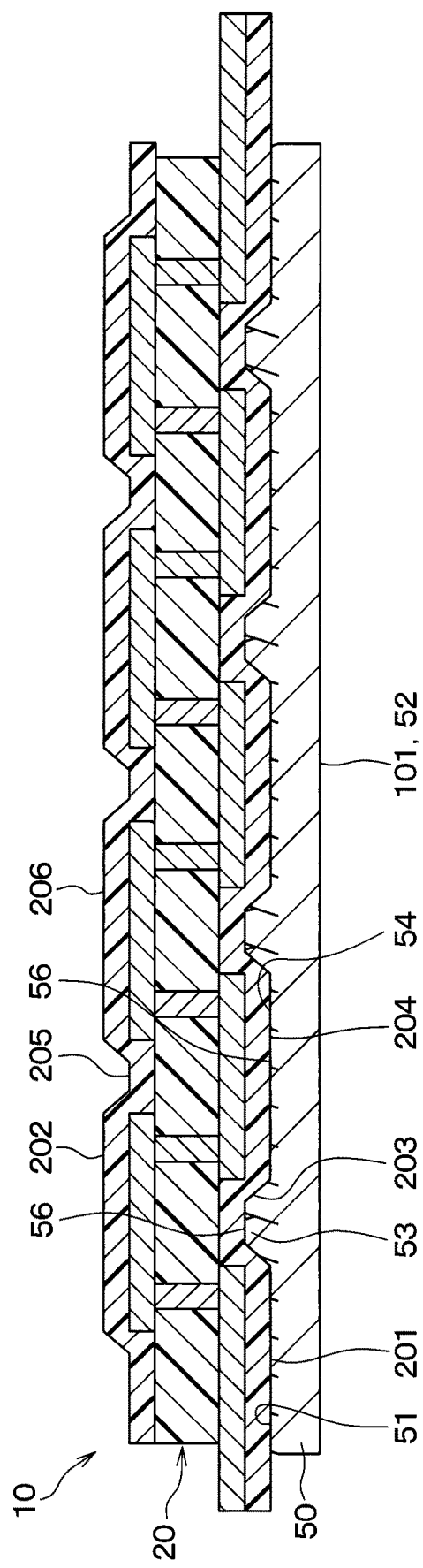

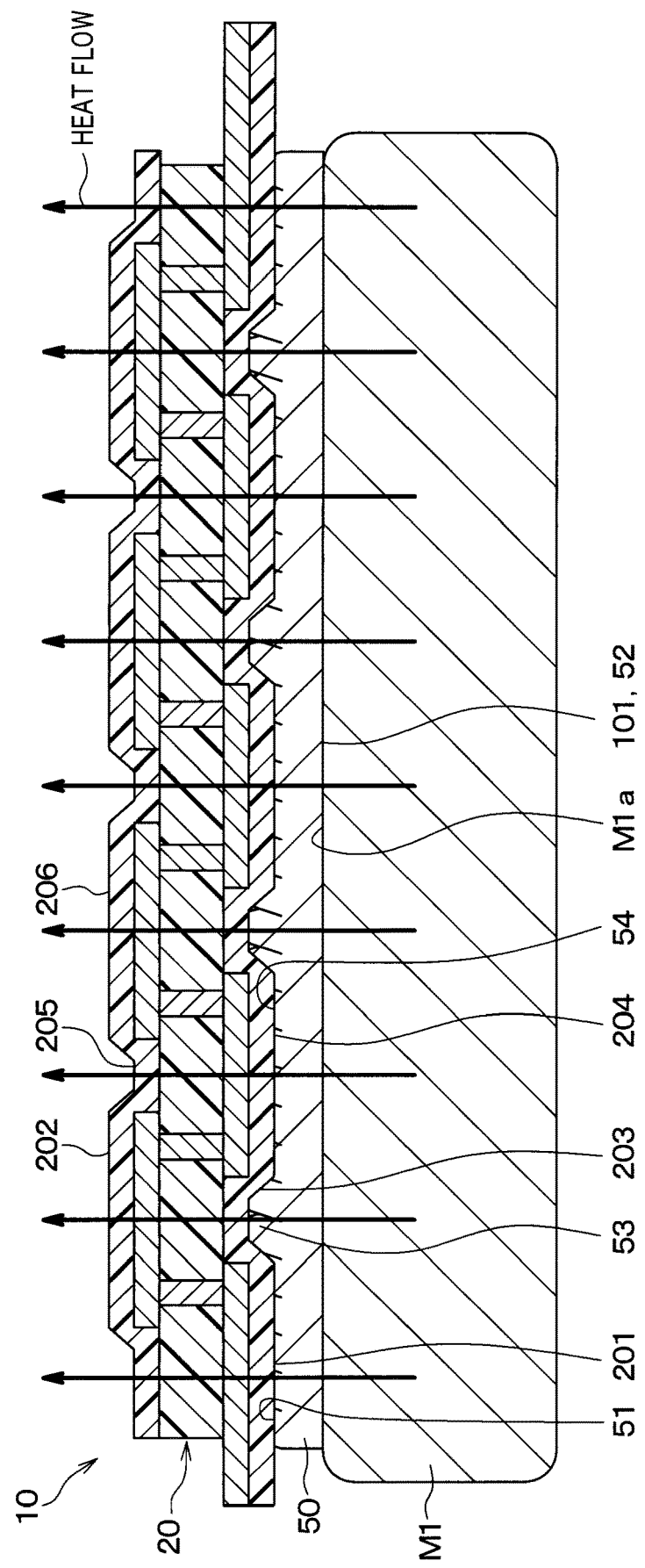

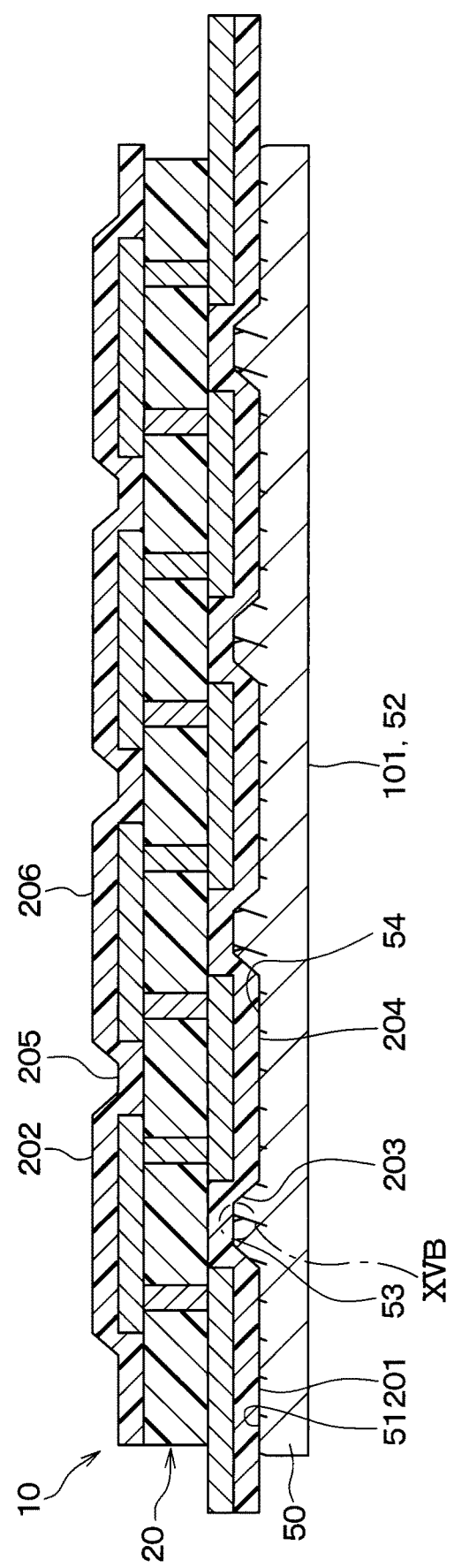

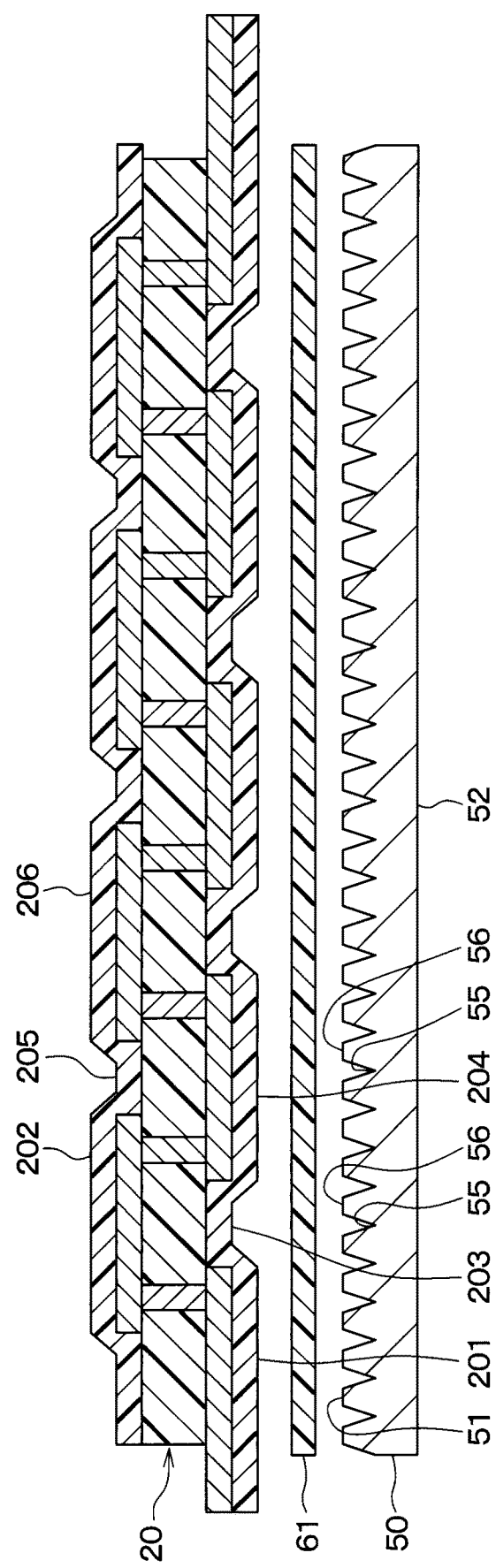

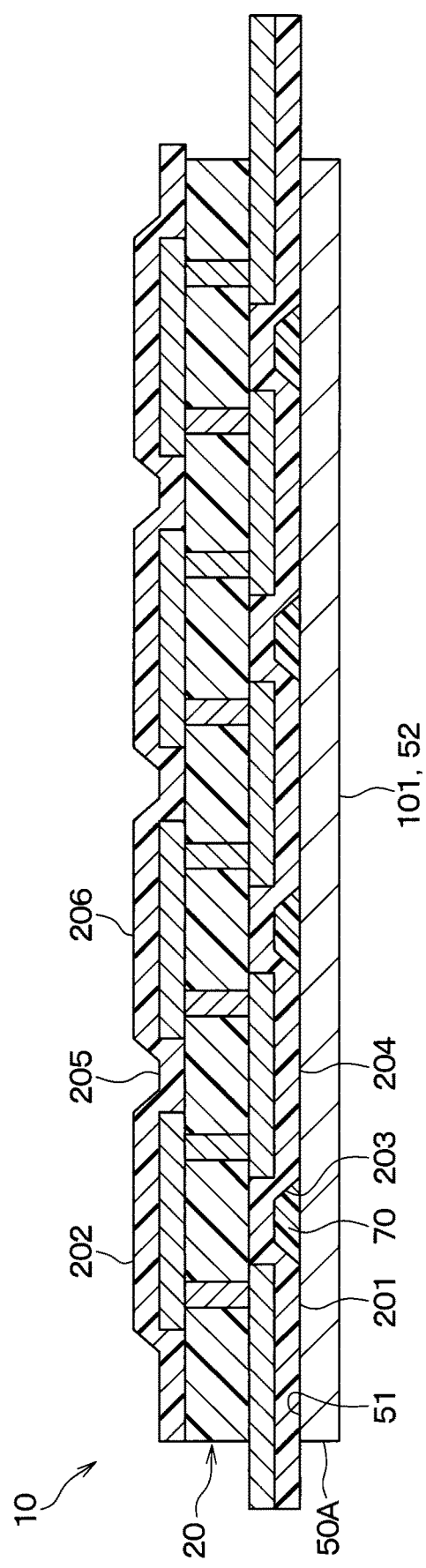

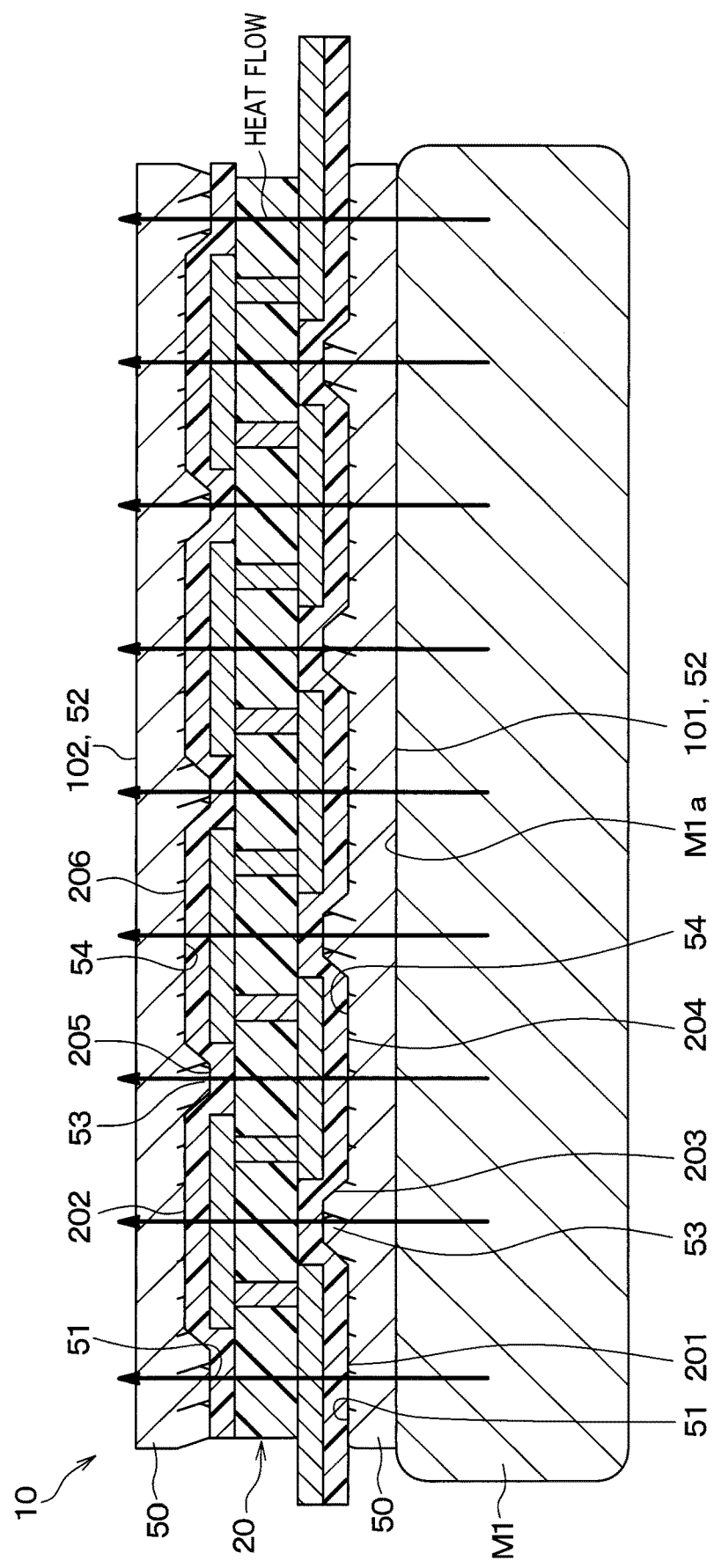

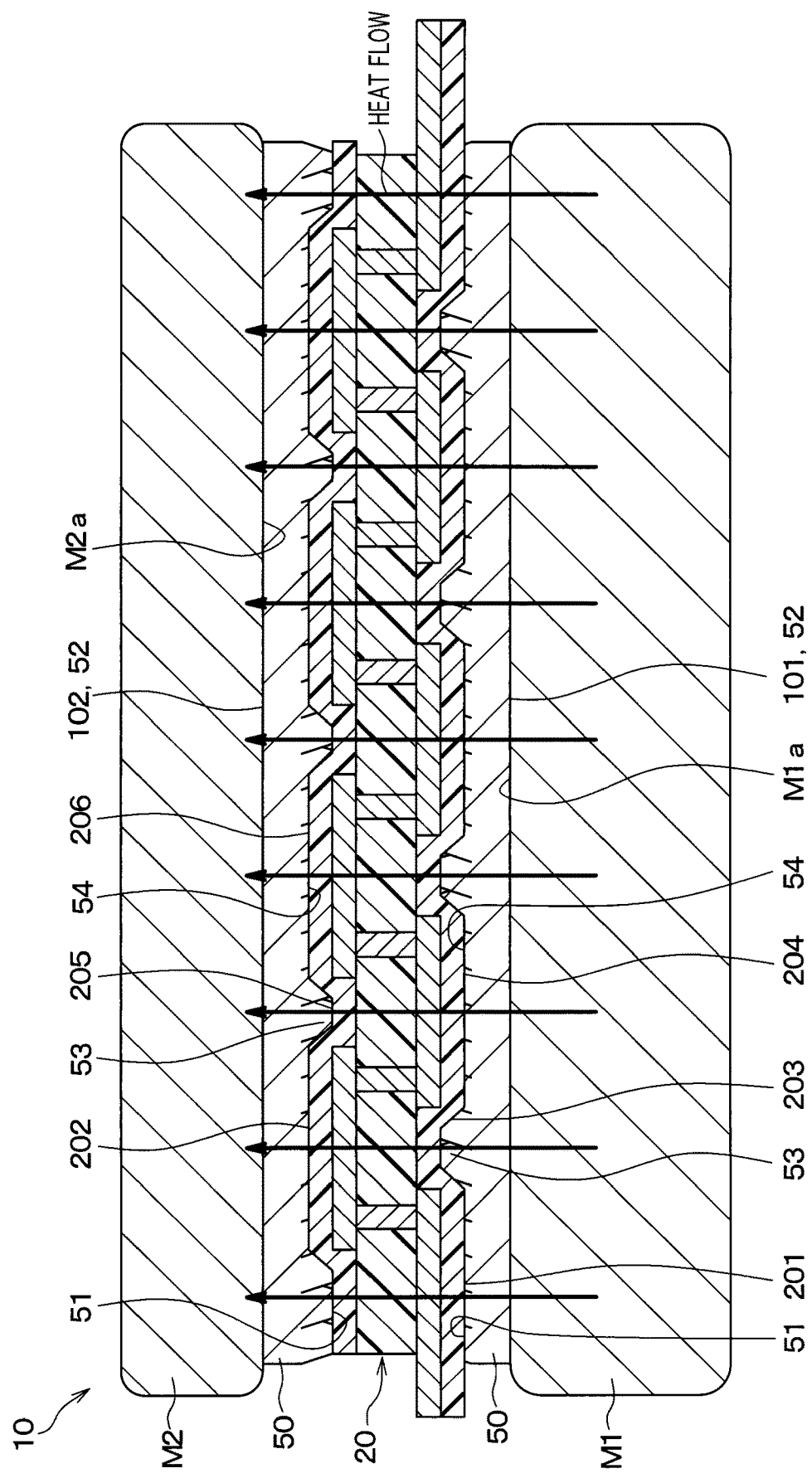

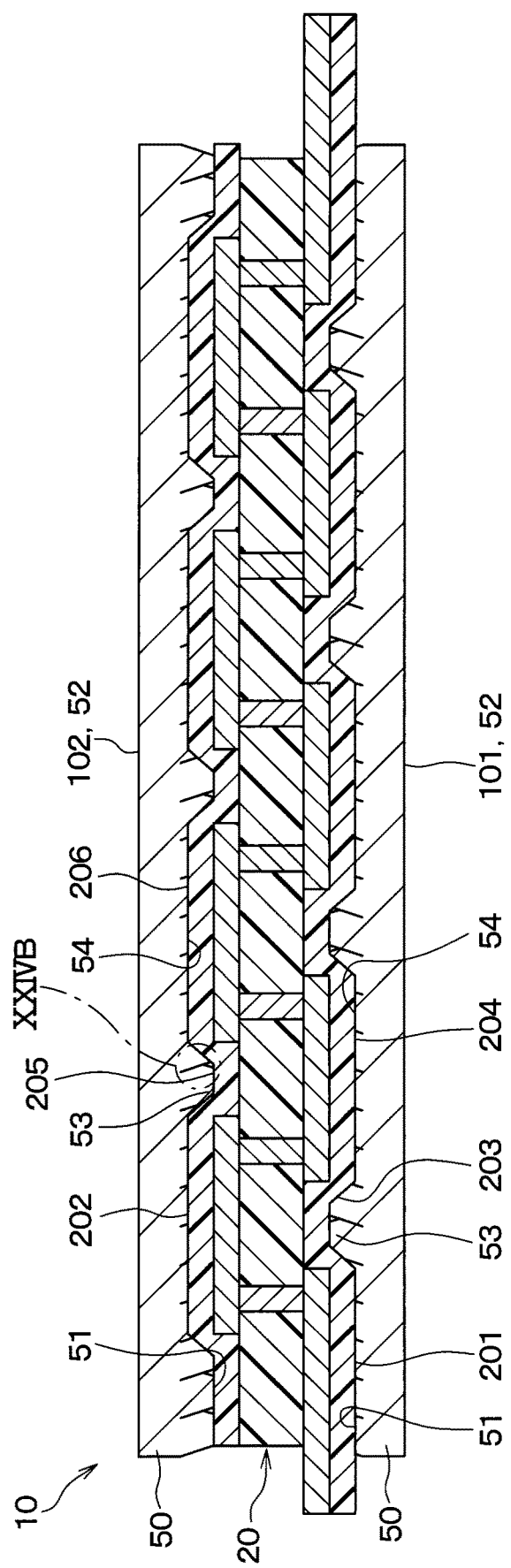

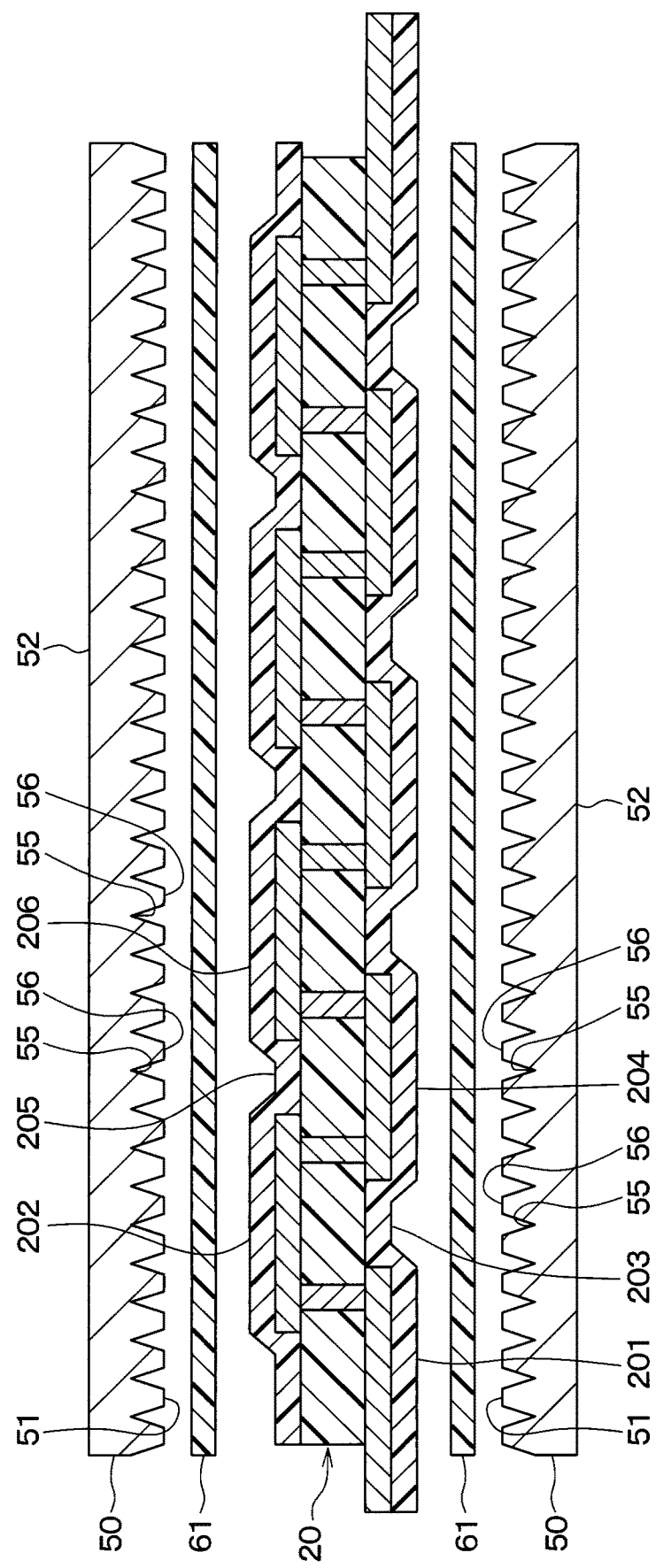

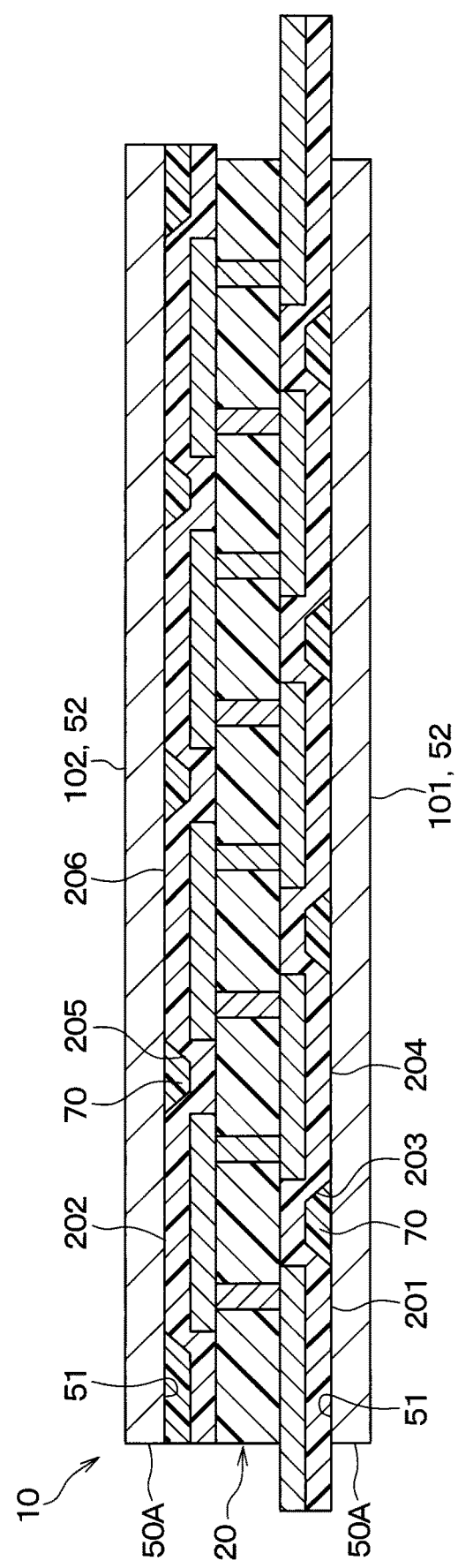

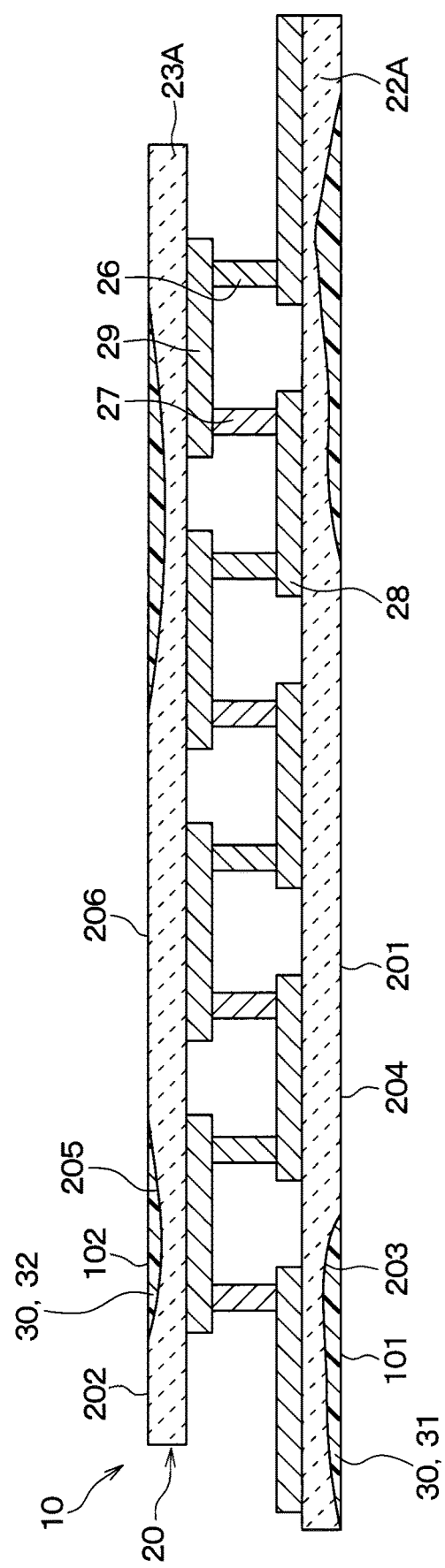

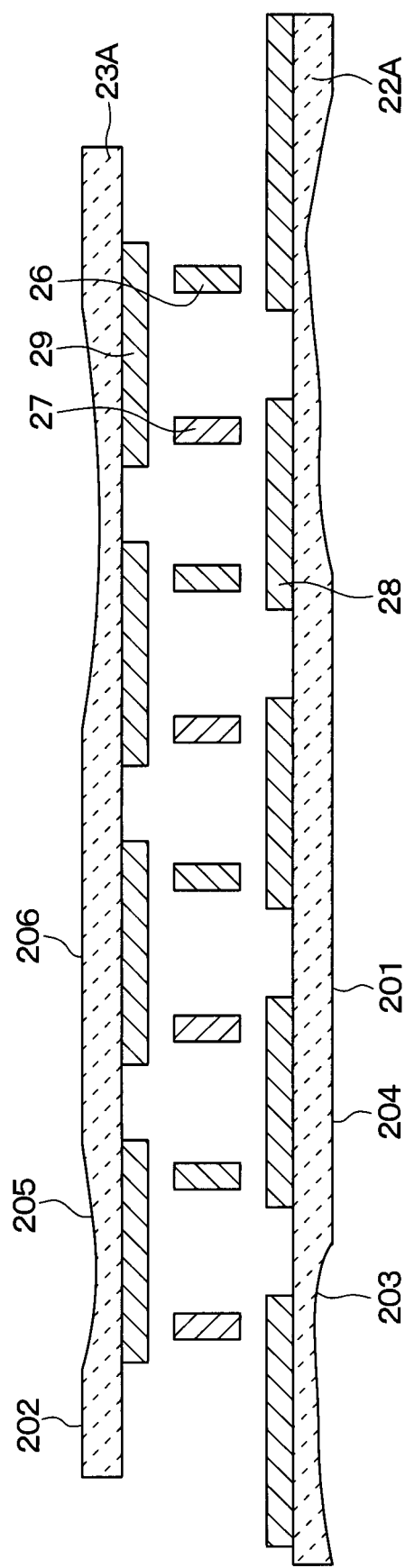

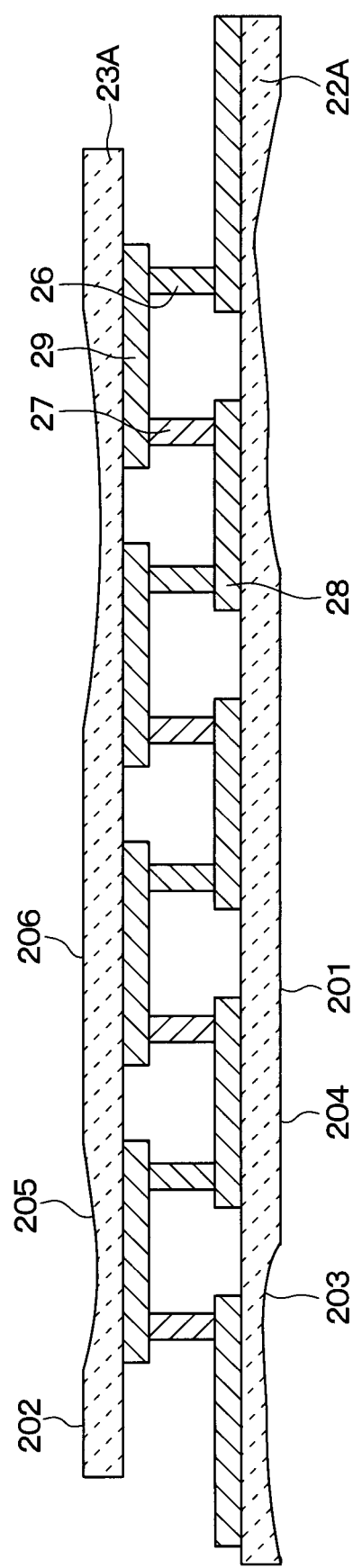

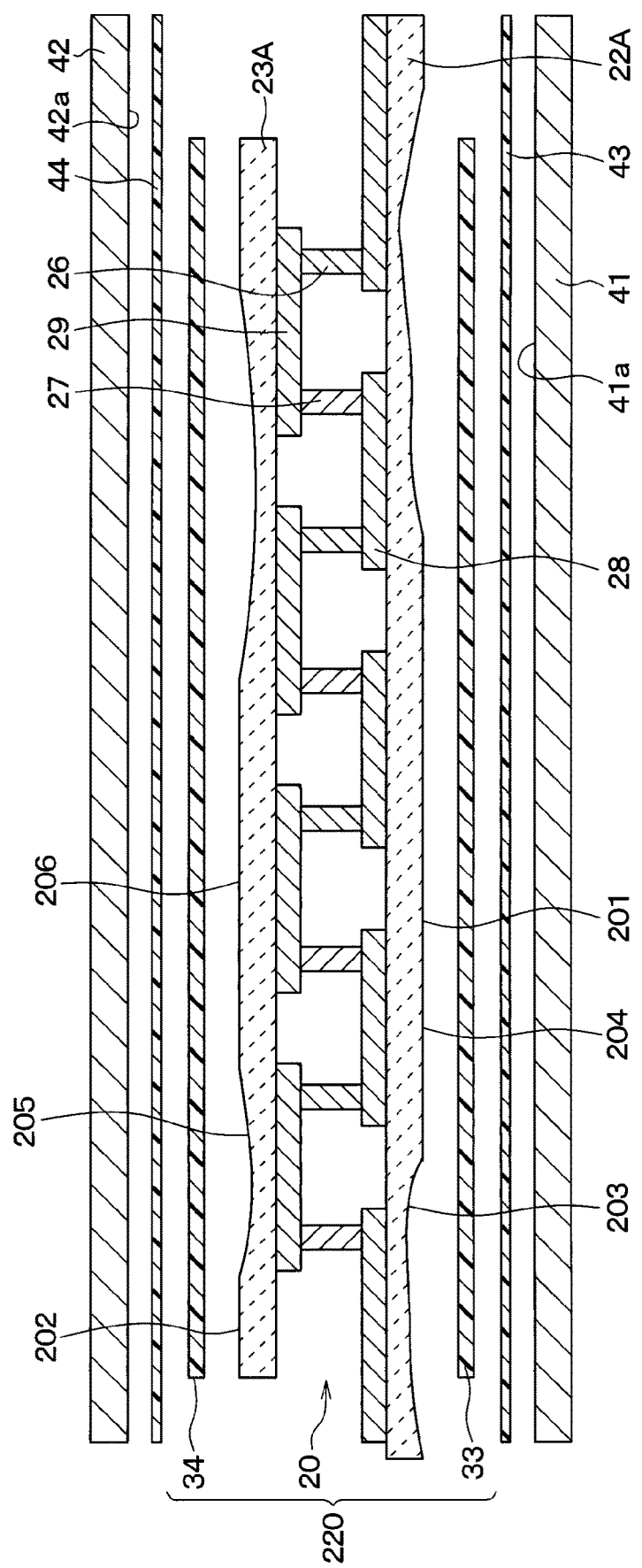

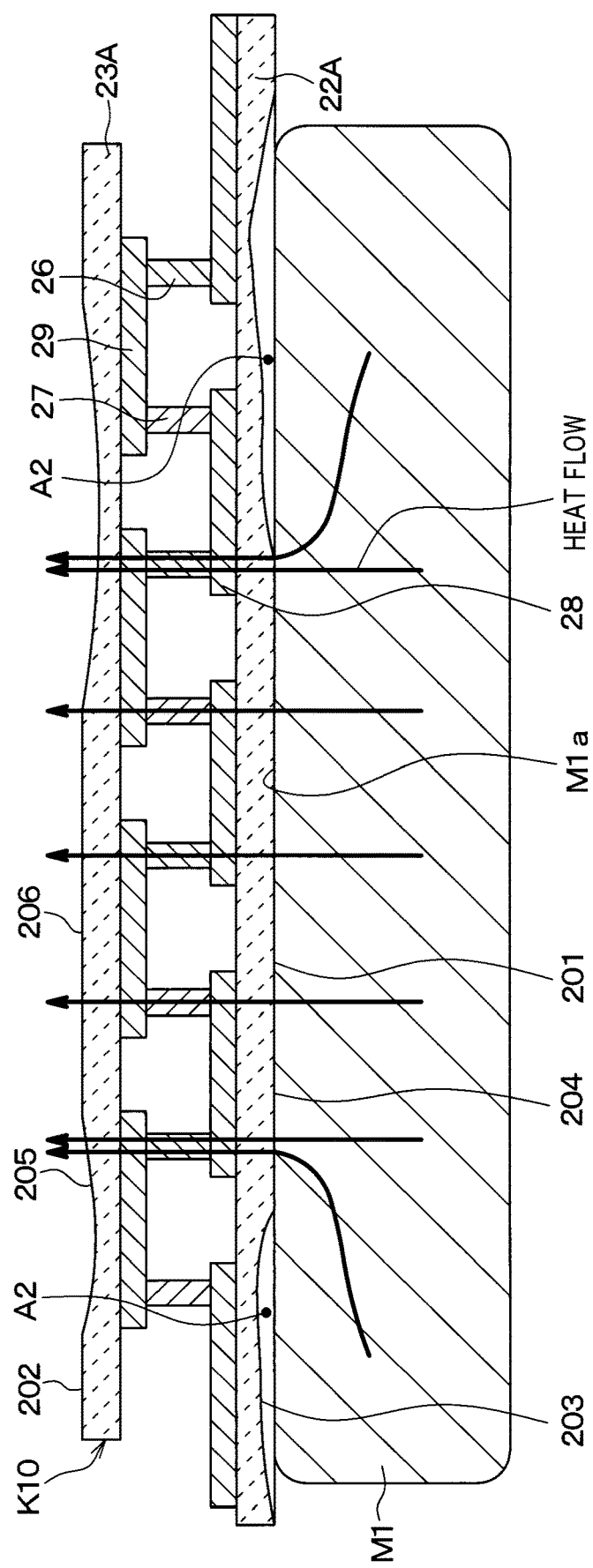

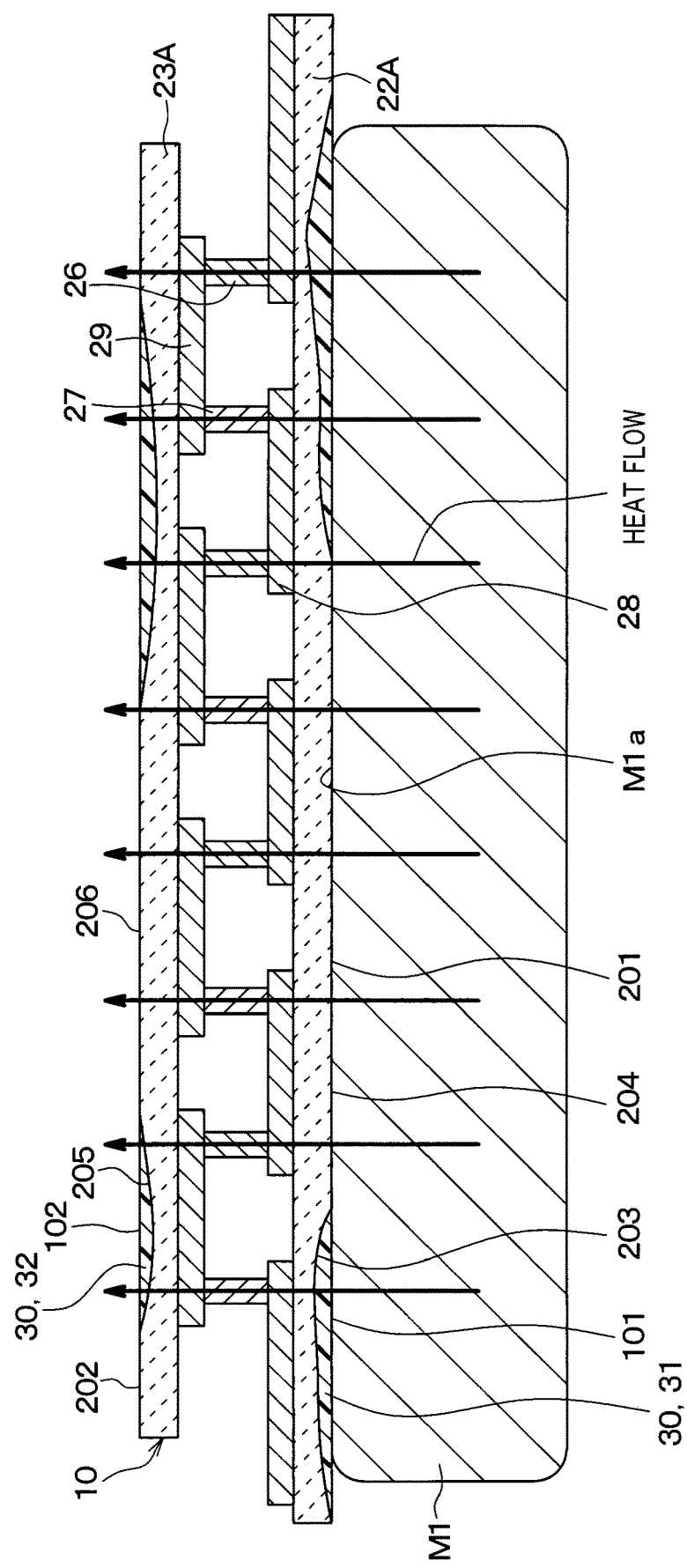

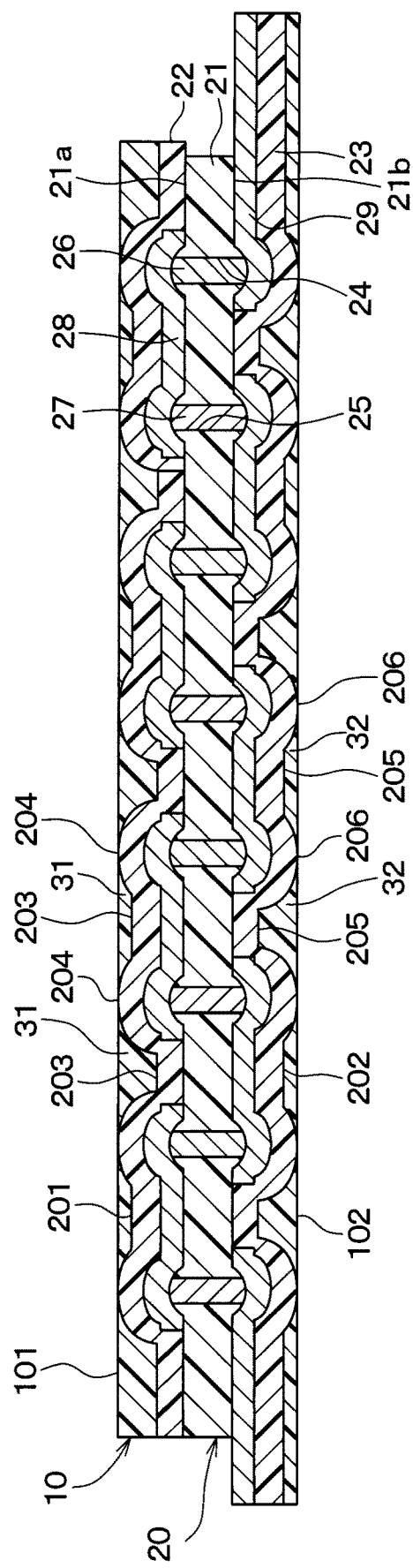

HEAT FLUX SENSOR AND METHOD OF MANUFACTURING THE SAME

CROSS REFERENCE TO RELATED APPLICATIONS

This application is a U.S. National Phase Application under 35 U.S.C. 371 of International Application No. PCT/JP2017/024985 filed on Jul. 7, 2017. This application is based on and claims the benefit of priority from Japanese Patent Application No. 2016-137608 filed on Jul. 12, 2016 and Japanese Patent Application No. 2017-101012 filed on May 22, 2017. The entire disclosures of all of the above applications are incorporated herein by reference.

FIELD

The present disclosure relates to a heat flux sensor and a method of manufacturing the same.

BACKGROUND

PTL 1 discloses a thermoelectric converter which can be used as a heat flux sensor. That thermoelectric converter is provided with an insulating base member, a front surface protective member, and a rear surface protective member. The insulating base member, front surface protective member and rear surface protective member are made of thermoplastic resin. A plurality of first and second via holes are formed in the insulating base member, in the thickness direction of the insulating base member. First and second thermoelectric elements, made of mutually different thermoelectric materials, are embedded in the first and second via holes. The plurality of first and plurality of second thermoelectric elements are alternately connected in series by a front surface conductive pattern that is formed on the front surface protective member and a rear surface conductive pattern that is formed on the rear surface protective member.

This thermoelectric converter is manufactured as follows. A stacked body is formed of the insulating base member with the first and second thermoelectric elements formed thereon, the front surface protective member with the front surface conductive pattern formed thereon, and the rear surface protective member with the rear surface conductive pattern formed thereon. This stacked body is compressed while being heated. The insulating base member, the front surface protective member and the rear surface protective member are thereby integrated.

Patent Literature

PTL 1: Japanese Patent Publication No. 2014-007376

With the above technology, the front-surface conductor pattern and the back-surface conductor pattern exist partially on the front surface and partially on the back surface of the insulating base member. Hence, when a heat flux sensor is manufactured with the configuration of the above technology, the outer surface may have an uneven shape, with a plurality of concave portions and a plurality of convex portions.

In that case, when the outer surface of the heat flux sensor is brought into contact with an object to be measured, a layer of air is formed between the sensor and the object to be measured, due to the concave portions. The thermal conductivity of air is low. Hence, when heat from the object to be measured passes through the sensor, the heat passes with the air layer being avoided. That is to say, the way in which heat flows through the sensor is different from the way in which heat flows inside the object to be measured. Thus, due to the concave portions, the heat flux from the object to be measured cannot be accurately measured. In a vacuum such as in outer space, there would be no air inside the concave portions. Hence, the thermal conductivity inside the concave portions would become zero. Thus, the effect of the concave portions on measurement of the heat flux would be particularly great.

This problem is not limited to the case of a heat flux sensor which has the configuration of the above technology. When a heat flux sensor has some other configuration, that effect will arise if there are concave portions and convex portions in the outer surface of the heat flux sensor.

SUMMARY

It is an objective of the present disclosure to provide a heat flux sensor which can reduce the effects of concave portions upon the measurement of heat flux.

With a first aspect of the present disclosure, a heat flux sensor that detects heat flux includes a main body that detects heat flux, having a first surface, and a second surface on the opposite side from the first surface, the first surface having an uneven shape with a plurality of concave portions and a plurality of convex portions, and a flattening member disposed on the first surface side of the main body, made of a material having a higher thermal conductivity than air, for flattening an outer surface of the heat flux sensor on the first surface side.

The flattening member is filled in at least one of the plurality of concave portions.

A surface of the flattening member constitutes at least part of the outer surface of the heat flux sensor.

The degree of flatness of the outer surface is higher than the degree of flatness of the first surface.

According to this, the flattening member is filled in the concave portions. Furthermore, the degree of flatness of the outer surface is made higher than the degree of flatness of the first surface, by means of the flattening member. Hence, when heat flux is being measured, with the outer surface of the heat flux sensor set in contact with an object under measurement, a layer of air that arises between the heat flux sensor and the object under measurement can be made smaller than for the case in which the heat flux sensor does not have a flattening member. Alternatively, it can be ensured that a layer of air does not arise between the heat flux sensor and the object under measurement. Thus, the effects of concave portions upon the measurement of heat flux can be made small.

Furthermore, with the first aspect of the present disclosure, in a method of manufacturing a heat flux sensor that comprises a main body which detects heat flux, with the main body having a first surface and a second surface on the opposite side from the first surface, and the first surface having an uneven shape with a plurality of concave portions and a plurality of convex portions, the method of manufacturing includes: preparing the main body, and a filler material that has a higher thermal conductivity than air, and pressing a pressing member against the filler material, in a condition in which the filler material is disposed on the first surface side of the main body; wherein in executing the pressing, a pressing member is used which has a flat surface that has a higher degree of flatness than that of the first surface, thereby causing the filler material to be filled in at least one of the plurality of concave portions and thereby forming a filling member that is made of the filler material, and making the degree of flatness of an outer surface of the heat flux sensor, that is constituted at least of the filler material, higher than the degree of flatness of the first surface.

According to this, a heat flux sensor can be manufactured which is provided with a flattening member that is filled in concave portions of the main body and which, due to the flattening member, has an outer surface with a higher degree of flatness than that of the first surface.

Furthermore, with the first aspect of the present disclosure, in a method of manufacturing a heat flux sensor that comprises a main body which detects heat flux, the main body having a first surface and a second surface on the opposite side from the first surface, the first surface having an uneven shape with a plurality of concave portions and a plurality of convex portions, the method of manufacturing includes: preparation of the main body, made at least of a resin, and a plate-like member that is plate-shaped and has one surface and an other surface on the opposite side, and is made of a material having higher thermal conductivity than the resin of the main body, formation of a stacked body, by stacking the plate-like member on the first surface side of the main body with the one surface facing the first surface, and application of pressure to the stacked body in the stacking direction of the stacked body; and wherein, in the preparation, the plate-like member is prepared as a member on which one surface has an uneven shape with a plurality of concave portions and a plurality of convex portions, with the density of the plurality of concave portions and the plurality of convex portions of the one being higher than the density on the first surface, and with the degree of flatness of the other surface being higher than the degree of flatness of the first surface, and during application of pressure, the plurality of convex portions of the one surface are deformed such as to follow the uneven shape of the first surface, causing a part of the plate-like member to be filled in at least one of the plurality of concave portions of the first surface.

According to this, a heat flux sensor can be manufactured which is provided with a flattening member that is filled in concave portions of the main body, with the flattening member thereby making an outer surface of the main body and which, due to the flattening member, has outer surface with a higher degree of flatness than that of the first surface. This heat flux sensor has the following configuration. The flattening member has a plate-like member, which is plate-shaped. The plate-like member has one surface, and an other surface that is on the opposite side, and is stacked on the first surface side of the main body, with the one surface facing the first surface. A part of the plate-like member is filled in the concave portions. The other surface of the plate-like member constitutes an outer surface.

Furthermore, with the first aspect of the present disclosure, in a method of manufacturing a heat flux sensor that comprises a main body which detects heat flux, the main body having a first surface, and a second surface on the opposite side from the first surface, the first surface having an uneven shape with a plurality of concave portions and a plurality of convex portions, the method of manufacturing includes: preparation of the main body, made at least of a resin, a plate-like member that is plate-shaped and has one surface and an other surface on the opposite side, made of a material having a higher thermal conductivity than the resin of the main body, and a filler material which is different from the material of the main body, and has a higher thermal conductivity than air, formation of a stacked body by stacking the plate-like member on the first surface side of the main body, with the one surface facing the first surface; and application of pressure to the stacked body in the stacking direction of the stacked body, while applying heat; wherein in the preparation, the plate-like member is prepared as a member on which one surface has a higher degree of flatness than that of the first surface, the formation of the stacked body is executed in a condition in which the filler material is disposed between the main body and the plate-like member, and the filler material thereby becomes filled in at least one of the plurality of concave portions, due to the applying of pressure, thus forming a filling member that is made of the filler material.

According to this, a heat flux sensor can be manufactured which is provided with a flattening member that is filled in concave portions of the main body and which, due to the flattening member, has an outer surface with a higher degree of flatness than that of the first surface. This heat flux sensor has the following configuration. The flattening member has a plate-like member, which is plate-shaped, and a filling member which is made of a different material from that of the plate-like member. The plate-like member has one surface, and an other surface on the opposite side, and is stacked on the first surface side of the main body, with the one surface facing the first surface. The filling member is filled in the concave portions.

Furthermore, with the first aspect of the present disclosure, a method of manufacturing a heat flux sensor includes: preparation of a sheet-like insulating base member, a sheet-like first protection member, a sheet-like second protection member and a sheet-like filler material, formation of a stacked body by stacking the insulating base member, the first protection member, the second protection member and the filler material, and integration of the insulating base member, the first protection member and the second protection member, by applying pressure while heating.

In the preparation, the insulating base member is prepared as a member having one surface, and an other surface on the opposite side, containing internally a plurality of alternating first thermoelectric elements and second thermoelectric elements, and the filler material is prepared as a material having a higher thermal conductivity than air.

In forming the stacked body: the first protective member is disposed on one surface of the insulating base member, a plurality of first conductor patterns are disposed between the insulating base member and the first protective member, with each of the plurality of first conductor patterns being set in contact with a first thermoelectric element and a second thermoelectric element that are mutually adjacent, among the plurality of first thermoelectric elements and second thermoelectric elements, the filler material is disposed on the side of the insulating base member that is opposite the first protection member, the second protection member is disposed on the other side of the insulating base member, and a plurality of second conductor patterns are disposed between the insulating base member and the second protective member, with each of the plurality of second conductor patterns being set in contact with a first thermoelectric element and a second thermoelectric element that are mutually adjacent, among the plurality of first thermoelectric elements and second thermoelectric elements.

In the application of pressure, a pressing plate having a flat surface is used, with the flat surface being pressed against the filler material, thereby causing the filler material to flow, while also deforming the first protective member and making the surface of the first protective member on the side opposite the side insulating base member side have an uneven shape, with a plurality of concave portions and a plurality of convex portions, and by the flowing of the filler material, forming a filling member that is filled in at least one of the concave portions, and making the degree of flatness of an outer surface of the heat flux sensor, constituted by at least a surface of the filling member, higher than the degree of flatness of the surface of the first protective member which is on the opposite side from the insulating base member side.

According to this, a heat flux sensor can be manufactured which has an outer surface that is flat.

DRAWINGS

FIG. 4A is a cross-sectional view illustrating a manufacturing step for a main body according to the first embodiment;

FIG. 4D is a cross-sectional view of the main body shown in FIG. 4C, after the manufacturing step;

FIG. 12 is a cross-sectional view showing the arrangement of each member in a crimping step S13 of FIG. 11;

FIG. 13 is a cross-sectional view showing the arrangement of each member in the crimping step S13 of FIG. 11;

FIG. 14 is a cross-sectional view of a heat flux sensor according to the third embodiment, in a condition of being set on an object under measurement, conceptually illustrating the flow of heat from the object under measurement;

FIG. 15A is a cross-sectional view of a heat flux sensor according to a fourth embodiment;

FIG. 16 is a cross-sectional view showing the arrangement of each member in a crimping step S13 of a fourth embodiment;

FIG. 17 is a cross-sectional view of a heat flux sensor according to a fifth embodiment;

FIG. 22 is a cross-sectional view of a heat flux sensor according to the sixth embodiment, in a condition of being set on an object under measurement, conceptually illustrating the flow of heat from the object under measurement;

FIG. 23 is a cross-sectional view of a heat flux sensor according to the sixth embodiment, in a condition of being set on an object under measurement, conceptually illustrating the flow of heat from the object under measurement;

FIG. 24A is a cross-sectional view of a heat flux sensor according to a seventh embodiment;

FIG. 25 is a cross-sectional view showing the arrangement of each member in a crimping step S13 of the seventh embodiment;

FIG. 26 is a cross-sectional view of a heat flux sensor according to an eighth embodiment;

FIG. 30 is a cross-sectional view of a heat flux sensor according to a ninth embodiment;

FIG. 31A is a cross-sectional view illustrating a manufacturing step of a main body according to the ninth embodiment;

FIG. 31B is a cross-sectional view that is a continuation of FIG. 31A, illustrating a manufacturing step of a main body;

FIG. 32 is a cross-sectional view showing the arrangement of each member in a thermocompression step of the ninth embodiment;

FIG. 33 is a cross-sectional view of a comparison example 2 of a heat flux sensor, in a condition of being set on an object under measurement, conceptually illustrating the flow of heat from the object under measurement;

FIG. 34 is a cross-sectional view of a heat flux sensor according to the ninth embodiment, in a condition of being set on an object under measurement, conceptually illustrating the flow of heat from the object under measurement;

FIG. 48 is a cross-sectional view of a heat flux sensor after the manufacturing step of FIG. 47.

DESCRIPTION OF EMBODIMENTS

Figure 1:
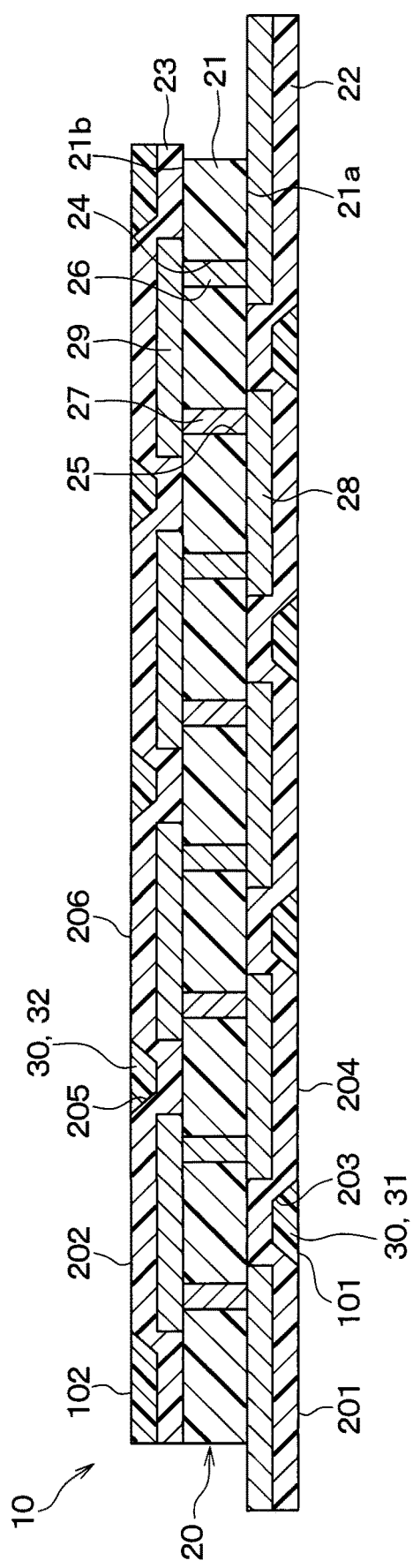
FIG. 1 is a cross-sectional view of a heat flux sensor according to a first embodiment.

Embodiments are described in the following referring to the drawings. In the following embodiments, parts which are the same or are equivalent to one another are designated by the same reference numerals.

First Embodiment

As shown in FIG. 1, the heat flux sensor 10 of the present embodiment is provided with a main body 20 and filling members 30. With the present embodiment, first filling member 31 that are part of filling members 30, as described in the following, constitute a flattening member for flattening the outer surface 101 of the heat flux sensor 10.

The main body 20 has a plate shape. The main body 20 has a first surface 201, and a second surface 202 on the opposite side from the first surface 201. The first surface 201 has an uneven shape, with a plurality of concave portions 203 and a plurality of convex portions 204. The second surface 202 also has an uneven shape, with a plurality of concave portions 205 and a plurality of convex portions 206.

The main body 20 is provided with an insulating base member 21, a first protection member 22 and a second protection member 23.

The insulating base member 21, the first protection member 22 and the second protection member 23 have a film shape, and are made of thermoplastic resin. Hence, the main body 20 is flexible. It would be equally possible for the first protection member 22 and the second protection member 23 to be made of a flexible plastic material other than thermoplastic resin.

The insulating base member 21 has a surface 21a and a surface 21b on the opposite side. The insulating base member 21 is formed with first and second via holes 24, 25 which penetrate in the thickness direction of the insulating base member 21. First and second thermoelectric elements 26, 27 made of mutually different thermoelectric materials are embedded in the first and second via holes 24, 25. With the present embodiment, the first thermoelectric elements 26 are made of a P-type semiconductor material. The second thermoelectric elements 27 are made of an N-type semiconductor material.

A plurality of first conductor patterns 28 are formed on the surface 21a of the insulating base member 21. The first conductor patterns 28 connect mutually adjacent first thermoelectric elements 26 and second thermoelectric elements 27. The first conductor patterns 28 constitute one connection part of the first thermoelectric elements 26 and the second thermoelectric elements 27. A plurality of second conductor patterns 29 are formed on the surface 21b of the insulating base member 21. The second conductor patterns 29 connect mutually adjacent first thermoelectric elements 26 and second thermoelectric elements 27. The second conductor patterns 29 constitute another connection part of the first thermoelectric elements 26 and the second thermoelectric elements 27. The first thermoelectric elements 26 and second thermoelectric elements 27 are alternately connected in series by the first conductor patterns 28 and the second conductor patterns 29.

The first protection member 22 is stacked on a surface 21a of the insulating base member 21. The first protection member 22 covers the first conductor patterns 28. The surface of the first protection member 22 that is on the opposite side from the insulating base member 21 constitutes a first surface 201 of the main body 20.

The second protection member 23 is stacked on the other surface 21b side of the insulating base member 21. The second protection member 23 covers the second conductor patterns 29. The surface of the second protection member 23 that is on the opposite side from the insulating base member 21 constitutes a second surface 202 of the main body 20.

Heat flows through the main body 20 from the first surface 201 of the main body 20 towards the second surface 202. At that time, a temperature difference arises between the side of the surface 21a and the side of the other surface 21b of the main body 20. That is to say, a temperature difference arises between one of the connection parts of the first thermoelectric elements 26 and second thermoelectric elements 27 and the other connection part. As a result, due to the Seebeck effect, a thermoelectric force is generated by the first thermoelectric elements 26 and the second thermoelectric elements 27. The main body 20 outputs this generated thermoelectric force, specifically, outputting a voltage as a sensor signal.

The filling members 30 are a first filling member 31 at the first surface 201 and a second filling member 32 at the second surface 202. The first filling member 31 is filled in all of the plurality of concave portions 203 of the first surface 201. The second filling member 32 is filled in the plurality of concave portions 205 of the second surface 202. The filling members 30 are made of a thermoplastic resin. The thermoplastic resin could be polyethylene, polyetherimide, polyimide, etc. The thermal conductivity of polyethylene is 0.41 W/(m·K). The thermal conductivity of polyetherimide is 0.22 W/(m·K). The thermal conductivity of polyimide is 0.28-0.34 W/(m·K). The thermal conductivity of air is 0.0241 W/(m·K). Thus, the thermal conductivity of thermoplastic is higher than that of air.

Furthermore, a material having a softening point that is lower than the heatproof temperature of the resin that constitutes the main body 20 is used as the thermoplastic resin. Specifically, the insulating base member 21, the first protection member 22 and the second protection member 23 are made of thermoplastic polyetherimide. At this time, the filling member 30 is made of polyetherimide. The heatproof temperature of thermoplastic polyetherimide is more than 300° C. A heatproof temperature is a temperature at which a main body made of a resin does not become deformed or alter. The softening point of polyetherimide is close to 210° C., which is lower than the heatproof temperature of a thermoplastic polyimide.

With the present embodiment, the surface of the first filling member 31 and a part of the first surface 201 (surfaces of the convex portions 204) form the outer surface 101 of the heat flux sensor 10 at the first surface 201 side. The degree of flatness of the outer surface 101 is higher than the degree of flatness of the first surface 201 of the main body 20. Here, flatness is synonymous with planarity or smoothness. A high degree of flatness of a surface signifies that, when a reference plane is applied to the surface, the space formed between the reference plane and the surface will be small.

Similarly, the surface of the second filling member 32 and a part of the second surface 202 (surface with convex portions 206) form the outer surface 102 of the heat flux sensor 10 at the second surface 202 side. The degree of flatness of this outer surface 102 is higher than the degree of flatness of the second surface 202 of the main body 20.

The method of manufacture of the present embodiment will next be described.

Figure 2:
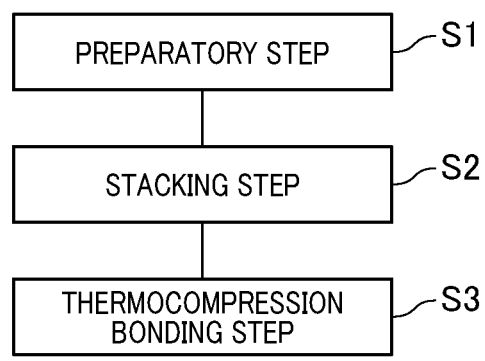
FIG. 2 is a flow diagram showing a manufacturing process for a heat flux sensor according to the first embodiment.

As shown in FIG. 2, a preparatory step S1, a stacking step S2 and a thermocompression bonding step S3 are executed in that order.

In the preparatory step S1, a first sheet 33 and a second sheet 34 are prepared.

The main body 20 has an uneven shape, with the first surface 201 having a plurality of concave portions 203 and a plurality of convex portions 204, and the second surface 202 having a plurality of concave portions 205 and a plurality of convex portions 206. The main body 20 is manufactured as follows.

Figure 4B:
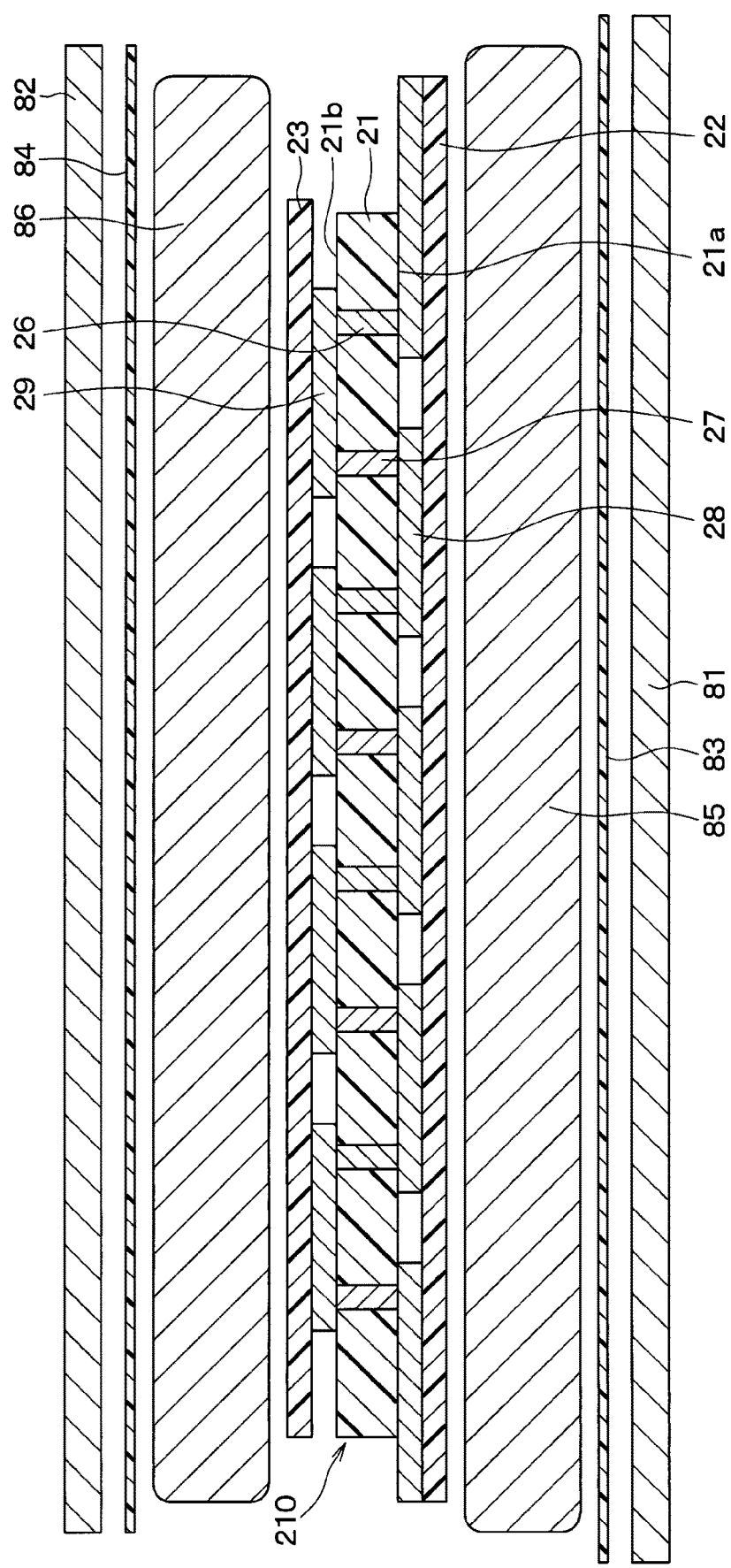
FIG. 4B is a cross-sectional view that is a continuation of FIG. 4A, illustrating a manufacturing step for a main body according to the first embodiment, and showing the disposition of respective parts during application of pressure.

As shown in FIG. 4A, the insulating base member 21, the first protection member 22 and the second protection member 23 are prepared. The insulating base member 21, the first protection member 22 and the second protection member 23 are made of thermoplastic polyimide. The insulating base member 21 has first and second thermoelectric elements 26, 27 embedded in first and second via holes 24, 25. The first protection member 22 has first conductor patterns 28 formed on a front surface 22a on the insulating base member 21 side. The second protection member 23 has second conductor patterns 29 formed on a front surface 23a on the insulating base member 21 side Next, the stacked body 210 is formed as shown in FIG. 4B. That is to say, the first protection member 22 is stacked on the surface 21a of the insulating base member 21. The first conductor patterns 28 are made to contact the first and second thermoelectric elements 26, 27. The second protection member 23 is stacked on the other surface 21b of the insulating base member 21. At that time, the second conductor patterns 29 are made to contact the first and second thermoelectric elements 26, 27.

Next as shown in FIG. 4B, the stacked body 210 is heated while being pressed in the stacking direction of the stacked body 210. As a result, as shown in FIG. 4C, the insulating base member 21, the first protection member 22 and the second protection member 23 become integrated, to form the main body 20.

Figure 4C:
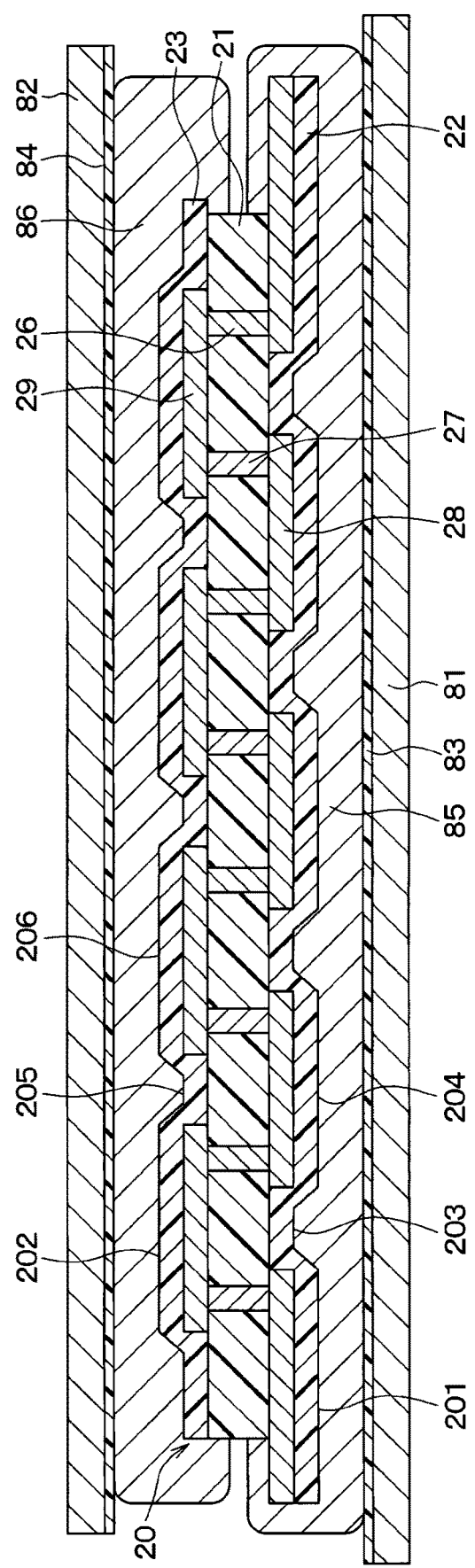
FIG. 4C is a cross-sectional view that is a continuation of FIG. 4B, illustrating a manufacturing step for a main body according to the first embodiment, showing the condition during the application of pressure.

Specifically, as shown in FIGS. 4B, 4C, this pressing is executed by sandwiching the stacked body 210 between a pair of pressing plates 81, 82. At that time, release films 83, 84 are respectively disposed between the stacked body 210 and the pair of pressing plates 81, 82. Furthermore, buffer members 85, 86 are in a condition of being disposed between the stacked body 210 and the release films 83, 84, on both sides of the stacked body 210.

The buffer members 85, 86 are auxiliary pressurizing members, which assist in pressing the first protection member 22 and the second protection member 23. That is to say, the buffer members 85, 86 are components provided for pressing the first protection member 22 and the second protection member 23 with the pressure dispersed between the pair of pressing plates 81, 82. The buffer members 85, 86 have sufficiently high heat resistance not to become altered at the softening temperature of the first protection member 22 and the second protection member 23.

Furthermore, the buffer members 85, 86 are members that become deformed when pressed. That is to say, the buffer members 85, 86 provide a buffering effect with respect to a pressure of 1-10 MPa. A cloth using metallic fiber, such as that made by Nippon Seisen Co., Ltd. under the trade name "NASLON", or that made by Mitsubishi Paper Mills Co., Ltd. under the trade name "RAB", or that made by Nippon Gore Co., Ltd. under the trade name "HYPER-SHEET", or the like, could be used as the buffer members 85, 86.

As shown in FIG. 4C, by applying pressure using the buffer members 85, 86, the first protection member 22 and second protection member 23 are deformed, following the unevenness of the first and second conductor patterns 28, 29 and the insulating base member 21. As a result, both of the first surface 201 and second surface 202 of the main body 20 have uneven shapes.

Thereafter, the release films 83, 84, etc., are peeled off. In this way, the main body 20 having the shape shown in FIG. 4D is produced.

Figure 3:
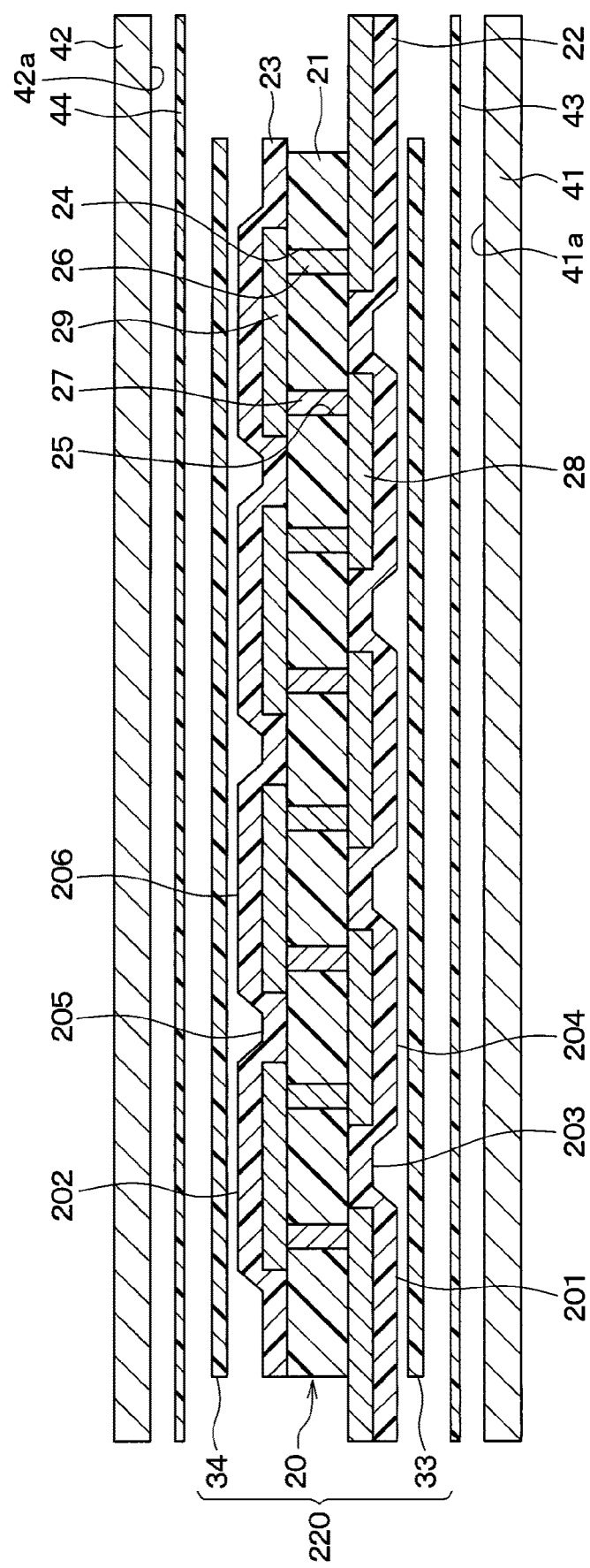
FIG. 3 is a is a cross-sectional view showing the arrangement of each member in a thermocompression bonding step in FIG. 2.

Returning to FIG. 3, the first sheet 33 and second sheet 34 are sheet-like filling members which become the first filling member 31 and second filling member 32 after the thermocompression bonding step S3. The filler material is a material having a thermal conductivity higher than that of air. A thermoplastic resin, specifically polyetherimide, is used as this filler material, In the stacking step S2, as shown in FIG. 3, the first sheet 33 is stacked on the first surface 201 side of the main body 20. The second sheet 34 is stacked on the second surface 202 side of the main body 20. A stacked body 220 made up of the main body 20 and the two sheets 33 and 34 is formed in this way.

In the thermocompression bonding step S3 as shown in the FIG. 3, the stacked body 220 is inserted between pressing plates 41 and 42. The pair of pressing plates 42, 42 used at this time have flat surfaces 41a and 42a. The degree of flatness of the surface 41a is higher than that of the first surface 201. The degree of flatness of the surface 42a is higher than that of the second surface 202. Release films 43 and 44 are interposed between the stacked body 220 and the pressing plates 41 and 42. In this state, the stacked body 220 is subjected to pressure while being heated, with the pressure being applied in the stacking direction of the stacked body 220. The heating temperature is lower than the heat resistant temperature of the resin that forms the main body 20, and is a temperature at which the first sheet 33 and second sheet 34 soften.

In this way the first sheet 33 and second sheet 34 become softened, and flow. As shown in the FIG. 1, the first filling member 31 is filled in the concave portions 203 of the first surface 201, and the second filling member 32 is filled in the concave portions 205 of the second surface 202, due to the flowing of the first sheet 33 and second sheet 34. At this time the first filling member 31 is formed inside the concave portions 203 of the first surface 201, and not on the surfaces of the convex portions 204 of the first surface 201. The second filling member 32 is formed inside the concave portions 205 of the second surface 202, and not on the surfaces of the convex portions 206 of the second surface 202.

Furthermore, in the thermocompression bonding step S3, the flat surface 41a of the pressing plate 41 is pressed against the first sheet 33. The flat surface 42a of the pressing plate 42 is pressed against the second sheet 34. In the present embodiment, the pressing plate 42 corresponds to a pressing member. As a result of this, the outer surfaces 101, 102 of the heat flux sensor 10 become flattened. That is to say, the degree of flatness of the outer surface 101 on the first surface 201 side becomes higher than the degree of flatness of the first surface 201. The degree of flatness of the outer surface 102 of the heat flux sensor 10 on the second surface 202 side becomes higher than the degree of flatness of the second surface 202.

In this way, the heat flux sensor 10 of the present embodiment is manufactured.

Figure 5:
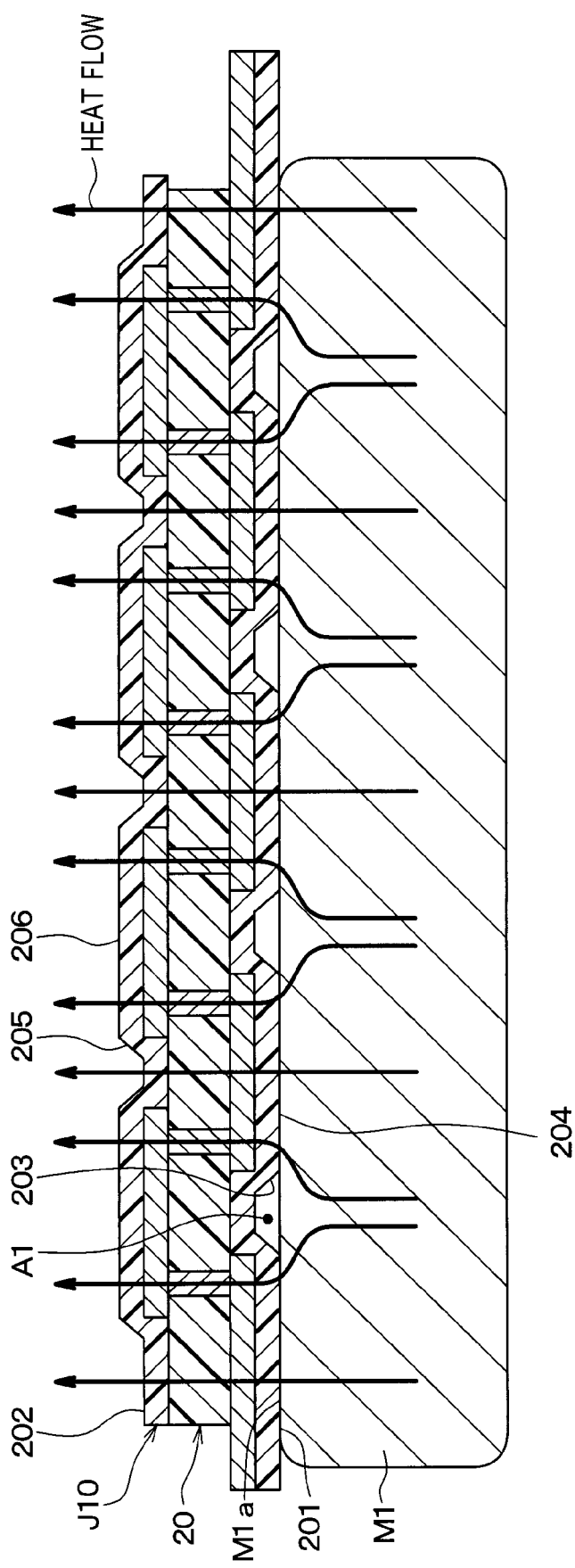
FIG. 5 is a cross-sectional view of a comparison example 1 of a heat flux sensor, in a condition of being set on an object under measurement, conceptually illustrating the flow of heat from the object under measurement.

The heat flux sensor 10 of the present embodiment and the heat flux sensor J10 of the prior art example shown in FIG. 5 will be compared. The heat flux sensor J10 of the prior art example differs from the heat flux sensor 10 of the present embodiment in that the heat flux sensor J10 is not provided with filling members 30. That is to say, of the main body 20 and the filling members 30, the heat flux sensor J10 of the prior art example is provided only with the main body 20.

As shown in FIG. 5, when measuring heat flux, the first surface 201 of the heat flux sensor J10 is set in contact with a contact surface M1a of the object under measurement M1. The contact surface M1a is flat. At that time, the heat flux sensor J10 has a plurality of concave portions 203 on the first surface 201. As a result of these concave portions 203, an air layer exists between the heat flux sensor J10 and the object under measurement M1. The thermal conductivity of air is low, being 0.0241 W/(m·K) approximately. Hence, air obstructs the conducting of heat. Thus, when heat flows from the object under measurement M1 and passes through the heat flux sensor J10, the heat flows such as to avoid the air layer A1. That is to say, the way in which heat flows through the heat flux sensor J10 is different from the way in which heat flows in the interior of the object under measurement M1. As a result, the heat flux from the object under measurement M1 cannot be accurately measured.

Figure 6:
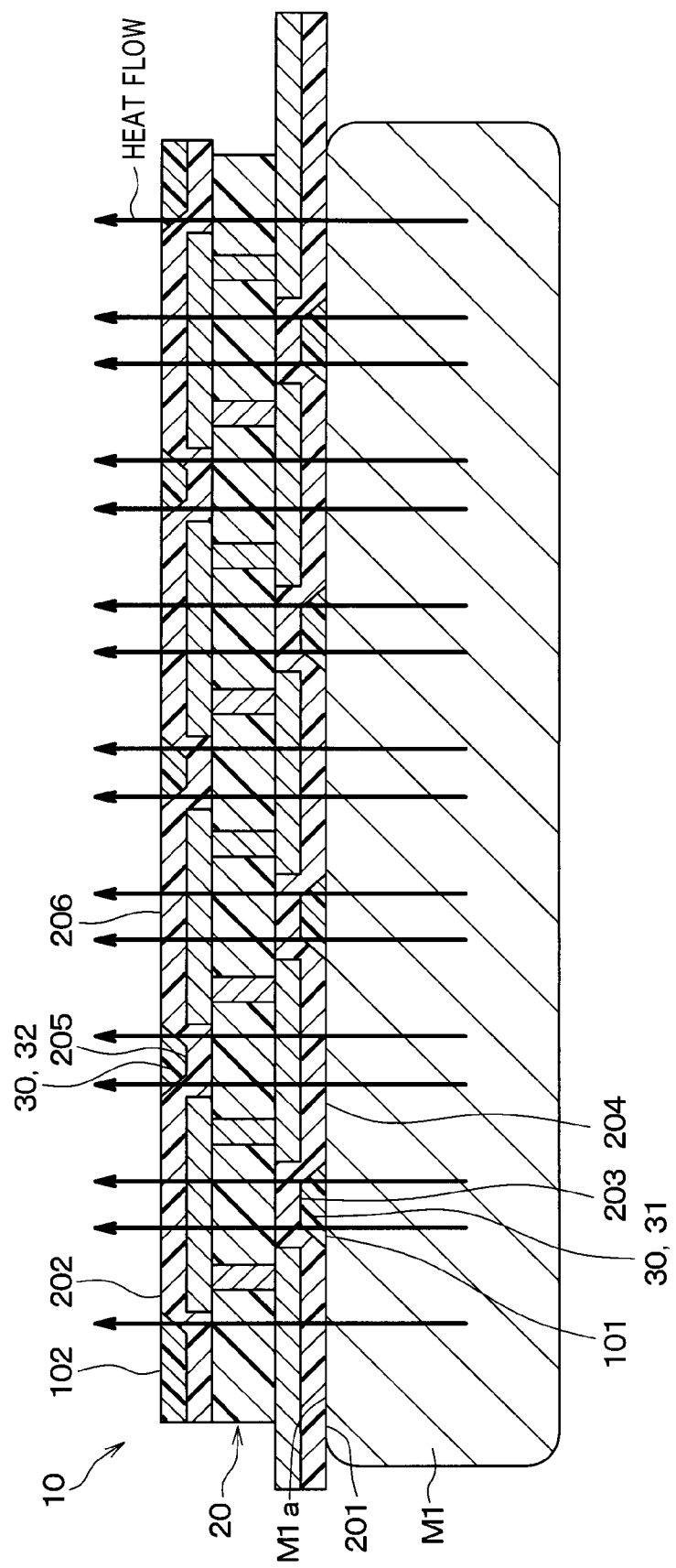
FIG. 6 is a cross-sectional view of a heat flux sensor according to the first embodiment, in a condition of being set on an object under measurement, conceptually illustrating the flow of heat from the object under measurement.

In contrast to this, in the case of the heat flux sensor 10 of the present embodiment, the outer surface 101 of the heat flux sensor 10 on the first surface 201 side is made flat by the first filling member 31. As shown in FIG. 6, the outer surface 101 of the heat flux sensor 10 is set in contact with the contact surface M1a of the object under measurement M1. The air layer A1 that arises between the heat flux sensor 10 and the object under measurement M1 at that time, can be made smaller than in the case of the prior art example. Alternatively, formation of an air layer between the heat flux sensor 10 and the object under measurement M1 can be prevented.

Hence, the effects of the concave portions 203 of the main body 20 on the measurement of heat flux can be reduced, that is to say, as shown by the arrows in FIG. 6, the way in which heat flows through the heat flux sensor 10 can be made identical to, or close to, that of the flow of heat within the object under measurement M1. As a result, the heat flux from the object under measurement M1 can be accurately measured.

Figure 7:
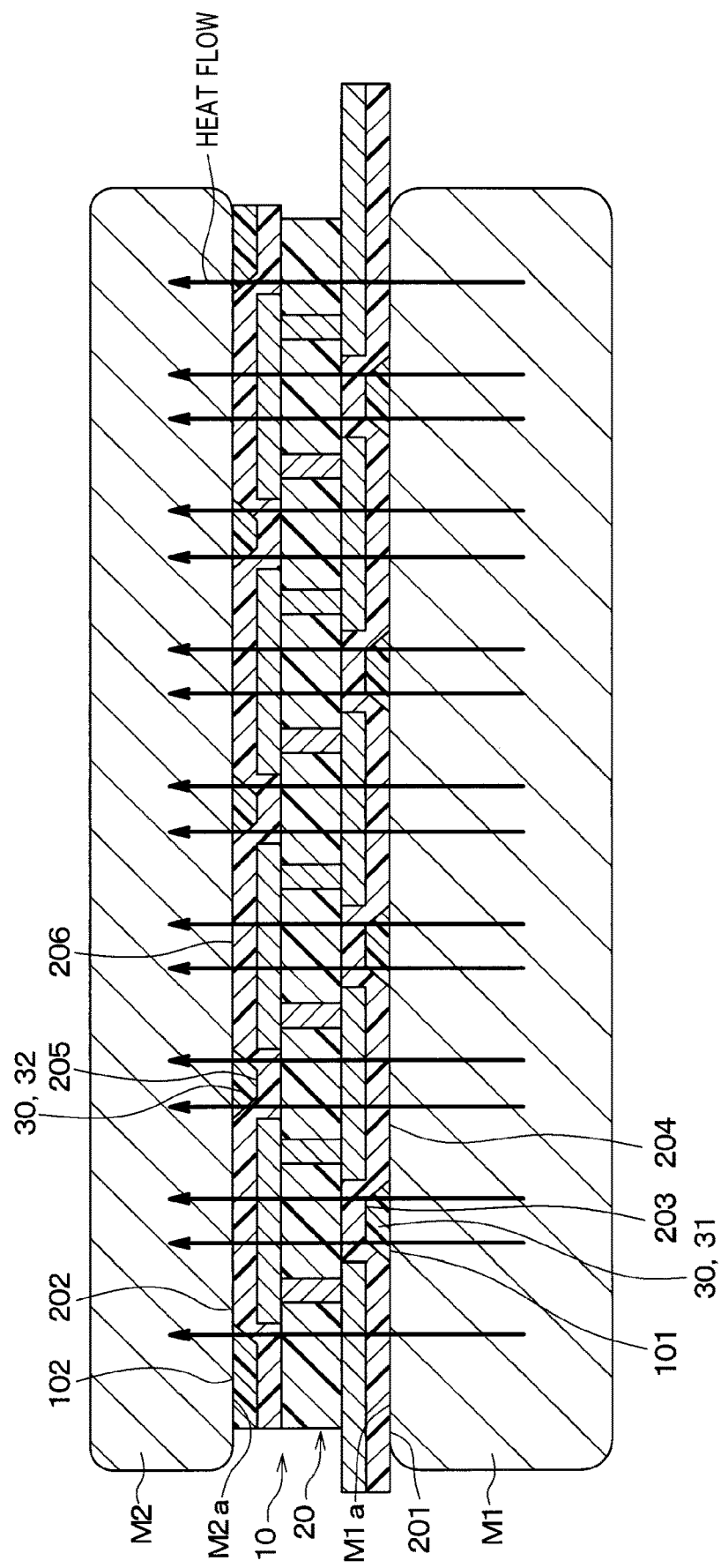
FIG. 7 is a cross-sectional view of a heat flux sensor according to the first embodiment, in a condition of being set on an object under measurement, conceptually illustrating the flow of heat from the object under measurement.

Furthermore, with the heat flux sensor 10 of the present embodiment, the outer surfaces 101, 102 are made flat by means of the first and second filling members 31 and 32. As shown in FIG. 7, the outer surface 101 of the heat flux sensor 10 is set in contact with contact surface M1a of the object under measurement M1, at the first surface 201 side. Furthermore, the contact surface M2a of a heat dissipation member M2 is set in contact with the outer surface 102 of the heat flux sensor 10, at the second surface 202 side. The heat dissipation member M2 is made of a metal. The contact surface M2a is a flat surface. When the heat flux sensor 10 of the present embodiment is used in this way, the heat flux from the object under measurement M1 is measured under a condition in which the heat flux sensor 10 is enclosed between the object under measurement M1 and the heat dissipation member M2. At that time, layers of air that arise between the heat flux sensor 10 and the object under measurement M1 and between the heat flux sensor 10 and the heat dissipation member M2 can be reduced, by comparison with when the heat flux sensor J10 of the comparison example is used. Alternatively, formation of the layers of air can be prevented from occurring. For that reason, the heat flux from the object under measurement M1 can be accurately measured.

Furthermore, with the method of manufacture of the heat flux sensor 10 of the present embodiment, filling members 30 are formed on both of the first surface 201 and the second surface 202 of the main body 20. If filling members were to be formed on only one of the first surface 201 and the second surface 202 of the main body 20, warping of the main body 20 could occur, due to shrinkage of the filling members after being formed. However, with the present embodiment, such warping can be suppressed.

Second Embodiment

Figure 8:
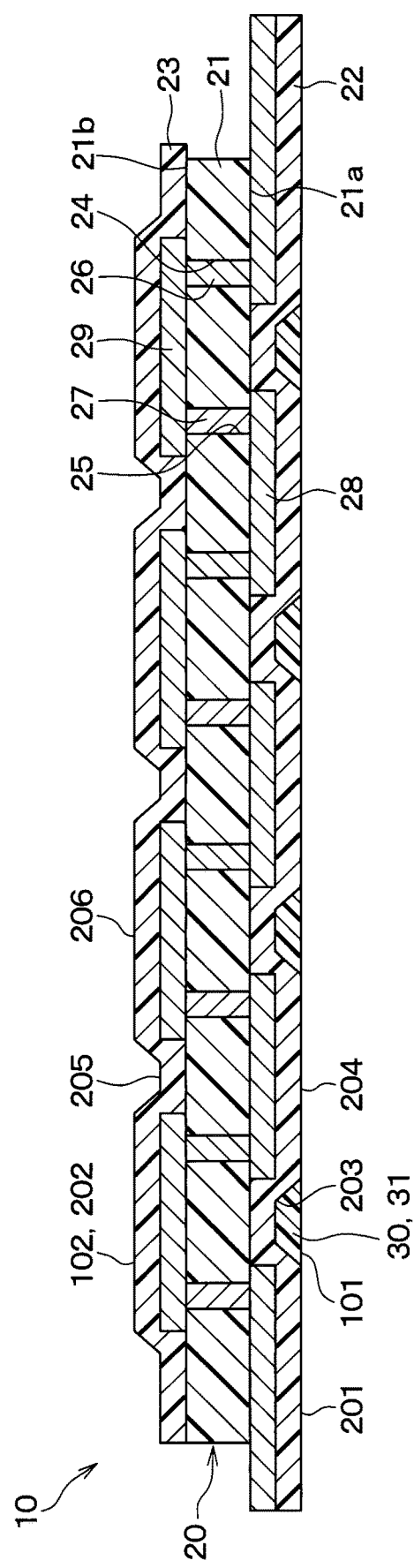
FIG. 8 is a cross-sectional view of a heat flux sensor according to a second embodiment.

As shown in FIG. 8, the heat flux sensor 10 of the present embodiment differs from the heat flux sensor 10 of the first embodiment in that, with the present embodiment, the filling member 31 is formed only on one surface of the main body 20. The filling member 31 corresponds to the filling member 31 of the first embodiment.

Specifically, of the first surface 201 and second surface 202, the filling member 31 is filled in only the plurality of concave portions 203 in the first surface 201. With the present embodiment, the surfaces of the filling member 31 and part of the first surface 201 (the surfaces of the convex portions 204) constitute the outer surface 101 of the heat flux sensor 10 on the first surface 201 side. The second surface 202 constitutes the outer surface 102 of the heat flux sensor 10.

Figure 9:
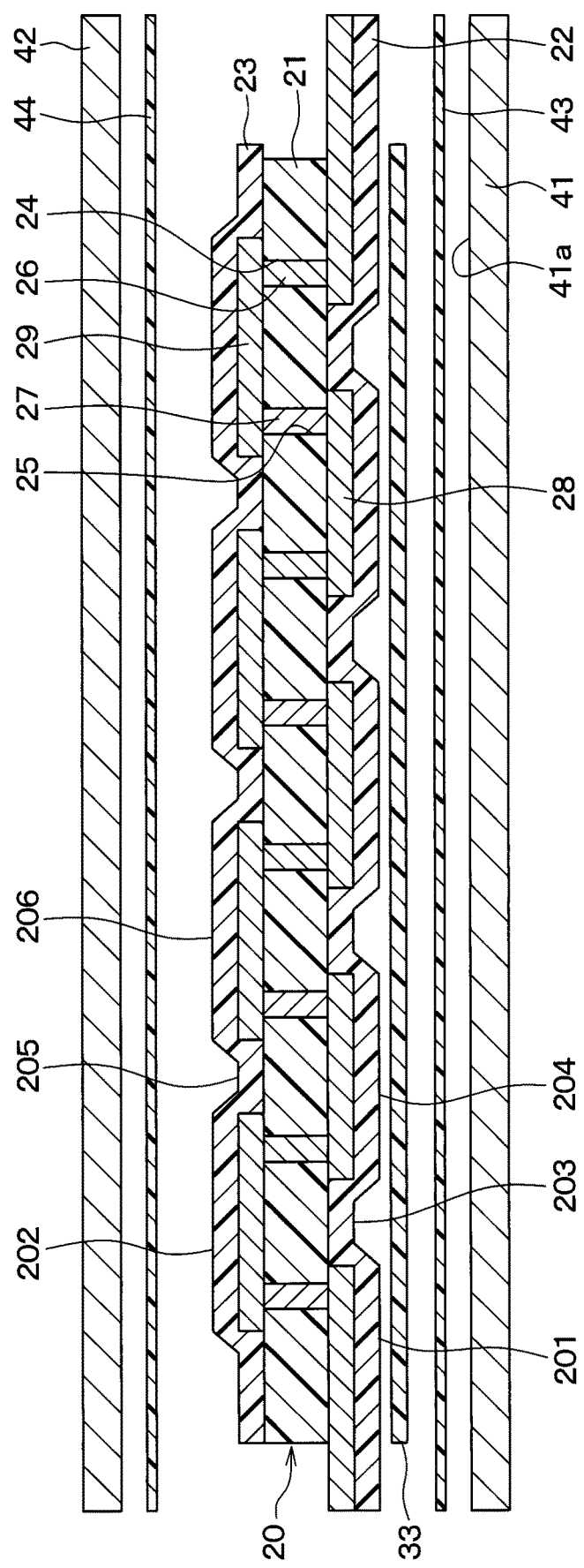
FIG. 9 is a cross-sectional view showing the arrangement of each member in a thermocompression bonding step of the second embodiment.

As shown in FIG. 9, the heat flux sensor 10 of the present embodiment is manufactured with a sheet 33 stacked on the first surface 201 of the main body 20, and the main body 20 and the sheet 33 are subjected to thermocompression in a condition in which no sheet is stacked on the second surface 202.

With the present embodiment also, the outer surface 101 of the heat flux sensor 10 is flattened by means of a filling member 31. For that reason, the same results can be obtained as for the first embodiment.

Third Embodiment

Figure 10:
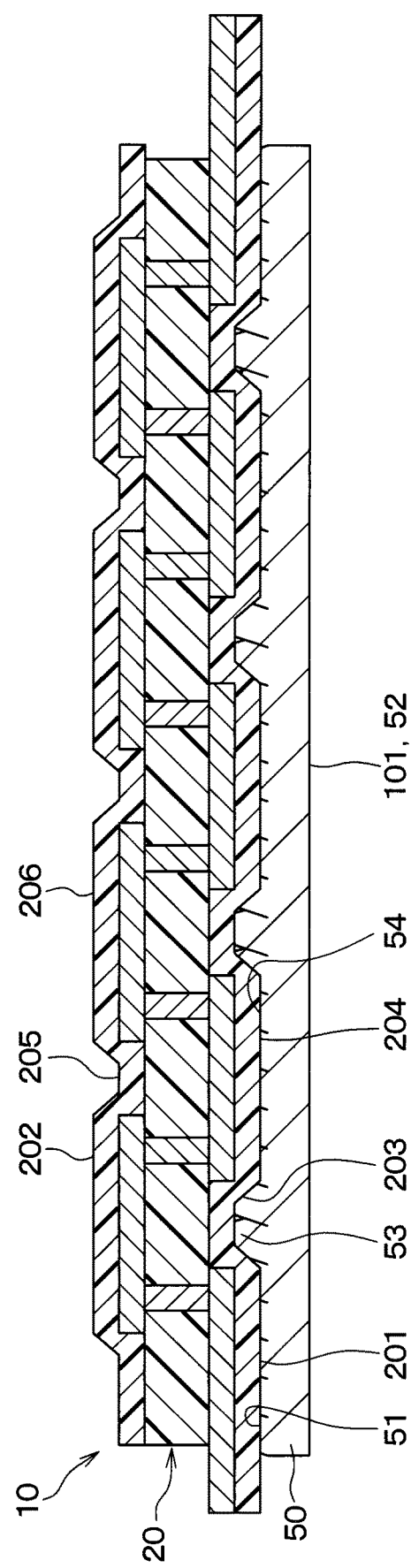
FIG. 10 is a cross-sectional view of a heat flux sensor according to a third embodiment.

As shown in FIG. 10, the heat flux sensor 10 of the present embodiment is provided with a main body 20 and a plate-like member 50. With the present embodiment, the plate-like member 50 constitutes a flattening member, for flattening the outer surface 101 of the heat flux sensor 10.

With the present embodiment, the plate-like member 50 is configured as a plate that is made of a material having a higher thermal conductivity than the resin which forms the main body 20. With the present embodiment, the plate-like member 50 is made of a metal. Copper, zinc, aluminum, stainless steel, etc., could be used as the metal. The thermal conductivity of copper is 398 W/(m·K). The thermal conductivity of aluminum is 236 W/(m·K). The thermal conductivity of stainless steel is 16.7~20.9 W/(m·K).

The plate-like member 50 has one surface 51, and an other surface 52 on the opposite side. The plate-like member 50 is stacked on the first surface 201 of the main body 20, with that one surface 51 of the plate-like member 50 facing the first surface 201. Parts 53 of the plate-like member 50 are filled in the concave portions 203 of the main body 20. Other parts 54 of the plate-like member 50 contact the convex portions 204 of the first surface 201.

The other surface 52 is a flat surface. The degree of flatness of the other surface 52 is greater than that of the first surface 201 of the main body 20. The other surface 52 constitutes the outer surface 101 of the heat flux sensor 10 on the first surface 201 side.

The method of manufacture of the heat flux sensor 10 of the present embodiment will next be described.

Figure 11:
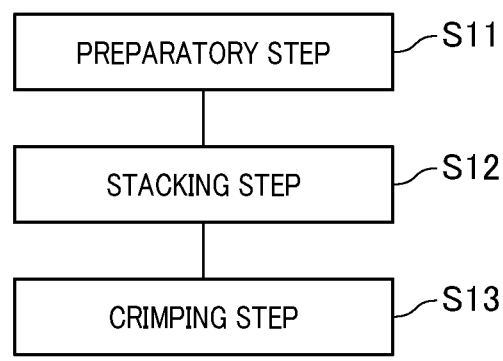
FIG. 11 is a flow diagram showing a manufacturing process of a heat flux sensor according to the third embodiment.

As shown in FIG. 11, a preparation step S11, stacking step S12 and crimping step S13 are executed, in that order.

In the preparation step S11 as shown in FIG. 12, the main body 20 and the plate-like member 50 are prepared.

In the same way as for the first embodiment, the first surface 201 and second surface 202 of the main body 20 have concave portions.

The member 50 is plate-shaped, having one surface 51 and an other surface 52. The surface 51 has an uneven shape, with a plurality of concave portions 55 and a plurality of convex portions 56. The concave and convex portions of the surface 51 are narrower than those of the first surface 201. That is to say, by comparison with the uneven shape of the first surface 201, the density of the plurality of concave portions 55 and plurality of convex portions 56 on the surface 51 is higher. That is, the number of concave portions and convex portions per unit of area is higher. The height of the irregularities of the surface 51 is greater than the height of the irregularities of the first surface 201. The height of the irregularities is the height of the convex portions 56, 204, measured with reference to the bottom of the concave portions 55, 203. The other surface 52 is a flat surface. An example of a plate-like member 50 having such a form would be copper foil that has been roughened on one side.

In the stacking step S12 as shown in FIG. 12, the main body 20 and plate-like member 50 are stacked together. At that time, the surface 51 faces the first surface 201. The plate-like member 50 is disposed on the first surface 201 side of the main body 20.

In the crimping step S13, the plate-like member 50 and the main body 20 are crimped by pressure applied in the stacking direction. At that time, the surface 51 is pressed against the first surface 201. As a result, as shown in FIG. 13, the plurality of convex portions 56 of the surface 51 become deformed, following the uneven shape of the first surface 201. That is to say, part of the plurality of convex portions 56 become embedded in the concave portions 203 of the first surface 201. The other part of the plurality of convex portions 56 contact the convex portions 204 of the first surface 201. In other words, those of the convex portions 56 of the surface 51 which are positioned facing concave portions 203 become embedded in the concave portions 203. The parts 54 of the surface 51 which are positioned facing convex portions 204 become crushed by the convex portions 204. Hence, the parts 54 of the surface 51 which are positioned facing convex portions 204 become considerably more deformed than the parts 53 of the surface 51 which are positioned facing concave portions 203.

The heat flux sensor 10 of the present embodiment is manufactured in this way. It should be noted that in the crimping step S13, there is a danger that warping of the main body 20 may occur due to shrinkage, etc., of the main body 20 after the crimping of the main body 20 and the plate-like member 50. In that regard, it is desirable that in the preparation step S11, the plate-like member 50 is prepared such as to have sufficient thickness to prevent warping.

As shown in FIG. 14, when measuring heat flux using the heat flux sensor 10 of the present embodiment, the other surface 52 of the plate-like member 50 is set in contact with the contact surface M1a of the object under measurement M1. At that time, the degree of flatness of the other surface 52 is higher than the degree of flatness of the first surface 201 of the main body 20. Furthermore, the parts 53 of the plate-like member 50 are filled in the concave portions 203 in the main body 20. As a result, by comparison with the first embodiment, the layer of air that arises between the main body 20 and the object under measurement M1 can be reduced. Alternatively, formation of a layer of air between the main body 20 and the object under measurement M1 can be prevented.

For that reason, as shown in FIG. 14, the way in which heat flows through the heat flux sensor 10 can be made identical to, or close to, that of the flow of heat inside the workpiece M1. Hence, with the present embodiment also, the same effects as for the first embodiment can be obtained.

Furthermore, with the present embodiment, it is not essential for the interiors of the concave portions 203 to be completely filled with the parts 53 of the plate-like member 50. That is to say, it would be permissible for small gaps to exist in the interiors of the concave portions 203, if the parts 53 of the plate-like member 50 are in contact with the internal surfaces of the concave portions 203. The plate-like member 50 is made of a metal and has high thermal conductivity. Hence, even if there are small gaps inside the concave portions 203, the way in which heat flows through the heat flux sensor 10 can be made identical to, or close to, that of the flow of heat through the object to be measured.

With the present embodiment, a plate-like member 50 is used having a height of irregularities of one surface 51 that is greater than the height of irregularities of the first surface 201, but it would be equally possible for the height of the irregularities of one surface 51 to be less than or equal to the height of the irregularities of the first surface 201. However, in order for the parts 53 of the plate-like member 50 to densely fill the concave portions 203, it is preferable that the height of the irregularities of one surface 51 is greater than the height of the irregularities of the first surface 201.

Fourth Embodiment

Figure 15B:
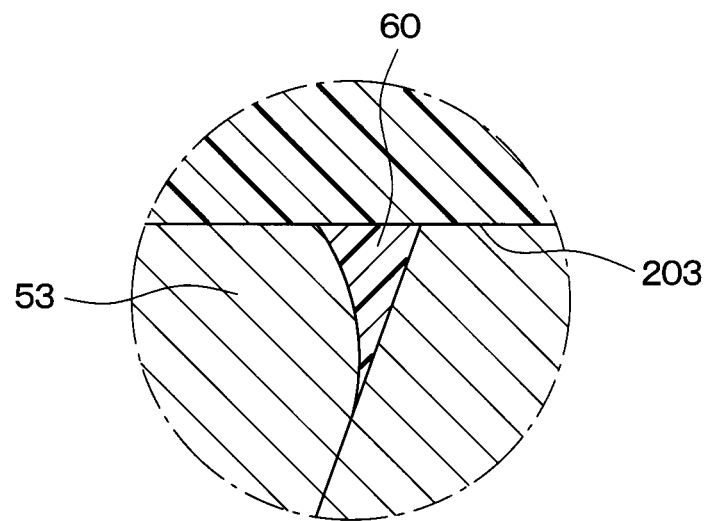
FIG. 15B is an expanded diagram of a region XVB in FIG. 15A.

As shown in FIGS. 15A, 15B, with the heat flux sensor 10 of the present embodiment, filling members 60 are further filled in the concave portions 203 of the main body 20, as compared with the heat flux sensor 10 of the third embodiment. With the present embodiment, the plate-like member 50 and the filling members 60 constitute a flattening member, for flattening the outer surface 101 of the heat flux sensor 10.

The filling members 60 are filled in gaps between the main body 20 and parts 53 of the plate-like member 50. The filling members 60 are of a different material from that of the plate-like member 50, and have a thermal conductivity higher than that of air. With the present embodiment, the filling members 60 are made of a thermoplastic resin. Examples of the thermoplastic resin include polyethylene, polyetherimide, polyimide, etc.

The manufacturing method of the heat flux sensor 10 of the present embodiment is a partial modification of the manufacturing method of the third embodiment. That is, in the preparation step S11, as shown in FIG. 16, the main body 20, the plate-like member 50 and a sheet 61 are prepared. The sheet 61 is a sheet-like filler material, which becomes the filling members 60 after the crimping step S13. The sheet 61 is made of a thermoplastic resin.

In the stacking step S12, the sheet 61 is arranged between the main body 20 and plate-like member 50, as shown in FIG. 16.

In the crimping step S13, pressure is applied to the plate-like member 50 and main body 20, while being heated. The heating temperature is lower than the heat resistant temperature of the thermoplastic resin constituting the main body 20, and is a temperature at which the sheet 61 becomes softened. As a result, the surface 51 becomes deformed, following the irregular shape of the surface 201. Furthermore, the sheet 61 flows. As a result, thermoplastic resin is filled in the gaps that are created by crushing the plurality of convex portions 56. That is, as shown in FIG. 15B, the filling members 60 are filled in the gaps between the parts 53 of the plate-like member 50 and the main body 20. At this time, the filling members 60 are also present in gaps between the main body 20 and the plate-like member 50, other than the gaps in the concave portions 203. However, it is not necessary for the filling members 60 to be present in gaps between the main body 20 and the plate-like member 50 other than the gaps in the concave portions.

With the present embodiment, more accurate measurement can be achieved, by comparison with the case in which filling members 60 are not filled in the gaps between the main body 20 and the plate-like member 50.

In addition, in the crimping step S13, pressure is applied to the sheet 61, which is made of thermoplastic resin. Hence, the main body 20 and the plate-like member 50 can be bonded by thermoplastic resin.

Fifth Embodiment

As shown in FIG. 17, the heat flux sensor 10 of the present embodiment includes a main body 20, a plate-like member 50a, and filling member 70. With the present embodiment, the plate-like member 50a and the filler filling member 70 constitute a flattening member, for flattening the outer surface 101 of the heat flux sensor 10.

The plate-like member 50a is different from the plate-like member 50 of the third embodiment, in that one surface 51 is flat. In other respects, the plate-like member 50a is the same as the plate-like member 50 in the third embodiment. The degree of flatness of the other surface 52 of the plate-like member 50a is higher than the degree of flatness of the first surface 201 of the main body 20. The other surface 52 constitutes the outer surface 101 of the heat flux sensor on the surface 201 side. The plate-like member 50a is stacked on the first surface 201 side of the main body 20 with one surface 51 of the plate-like member 50a facing the first surface 201.

The filling member 70 is filled in the concave portions 203. That is to say, the filling member 70 is filled in spaces that are surrounded by the inner surfaces of the concave portions 203 and one surface 51 of the plate-like member 50a. The filling member 70 is different from the plate-like member 50a. The filling member 70 is made of a filler material having a thermal conductivity which is higher than that of air. In the present embodiment, the filling member 70 is made of a thermoplastic resin. Examples of this thermoplastic resin include polyethylene, polyetherimide, polyimide, etc.

As with the third embodiment, the heat flux sensor 10 of the present embodiment is manufactured by performing a preparation step S11, stacking step S12 and crimping step S13 in that order, as shown in FIG. 17.

Figure 18:
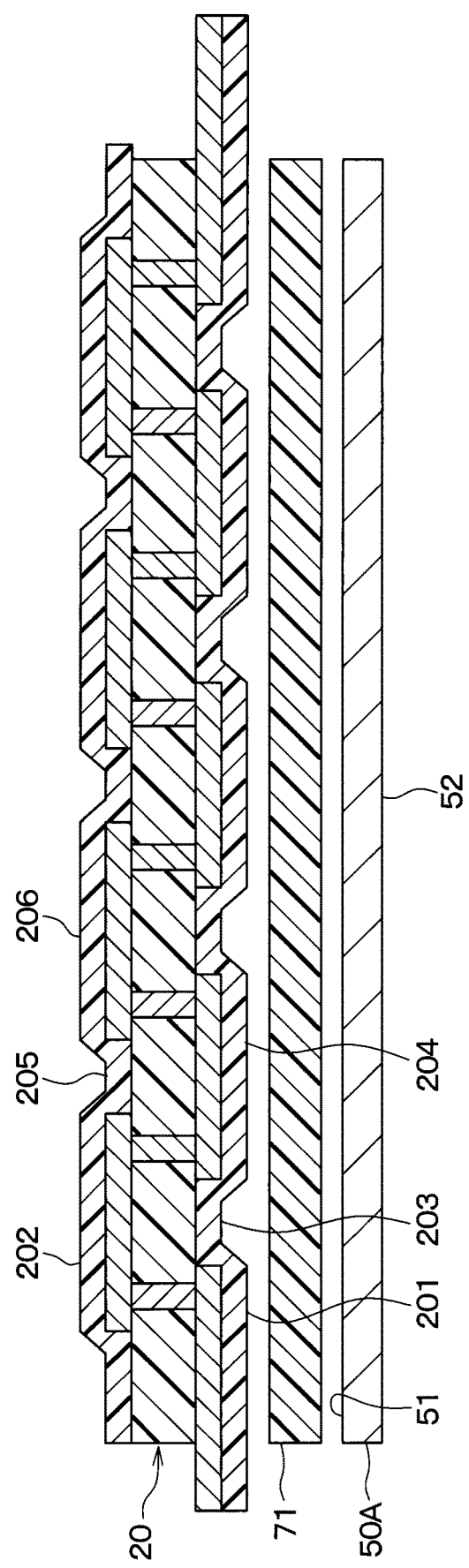
FIG. 18 is a cross-sectional view showing the arrangement of each member in a crimping step S13 of the fifth embodiment.

In the preparation step S11, as shown in FIG. 18, the main body 20, a plate-like member 50a, and a sheet 71 are prepared. The surfaces 51 and 52 of the prepared plate-like member 50a are flat. The prepared sheet 71 is a sheet-like filler material, which becomes the filling member 70 after the crimping step S13. A thermoplastic resin is used as the filler material.

In the stacking step S12 as shown in FIG. 18, a stacked body is formed of the main body 20 and the plate-like member 50a, with the sheet 71 between them.

In the crimping step S13, the stacked body formed of the main body 20 and the sheet 71 is subjected to pressure while being heated. Due to this, the sheet 71 flows. As a result, as shown in FIG. 17, a filling member 70 is formed, filled in the concave portions 203. At this time, there is no filling member 70 between the main body 20 and the plate-like member 50a other than in the concave portions 203. However, it would be equally possible for the filling member 70 to be present between the main body 20 and the plate-like member 50a other than in the concave portions 203.

Figure 19:
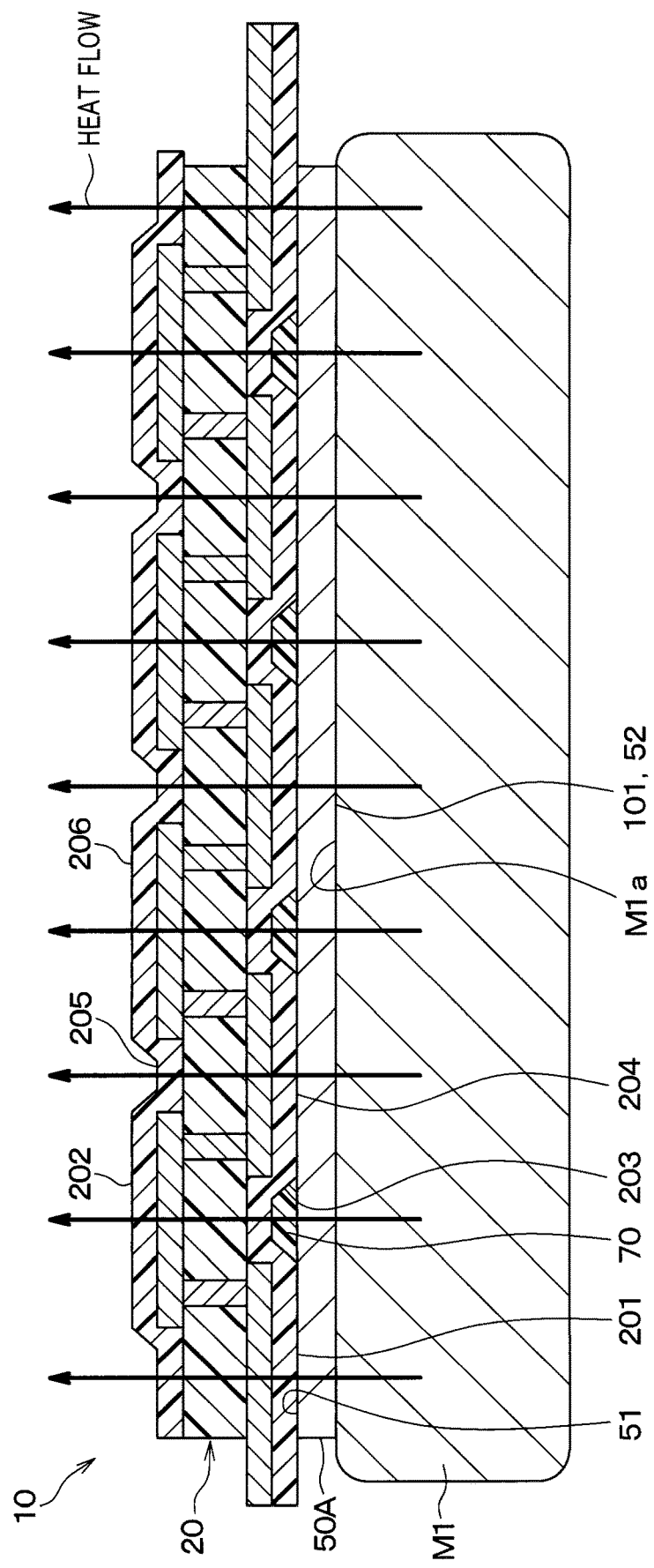
FIG. 19 is a cross-sectional view of a heat flux sensor according to the fifth embodiment, in a condition of being set on an object under measurement, conceptually illustrating the flow of heat from the object under measurement.

As shown in FIG. 19, when measuring heat flux by using the heat flux sensor 10 of the present embodiment, the other surface 52 of the plate-like member 50a is set in contact with a contact surface M1a of the object under measurement M1. The degree of flatness of the other surface 52 is higher than the degree of flatness of the first surface 201 of the main body 20. Furthermore, the filling member 70 is filled in the concave portions 203 of the main body 20. Hence, by comparison with the first embodiment, the layer of air that arises between the main body 20 and the object under measurement M1 can be reduced. Alternatively, formation of the layer of air between the main body 20 and the object under measurement M1 can be prevented.

In this way, as shown in FIG. 19, the way in which heat flows through the heat flux sensor 10 can be made identical to, or close to, that of the flow of heat within the object under measurement M1. Hence, the same effects can be obtained as for the first embodiment even with the present embodiment.

With the present embodiment, one surface 51 of the plate-like member 50a is flat, however, it is not essential for it to be flat.

Sixth Embodiment

Figure 20:
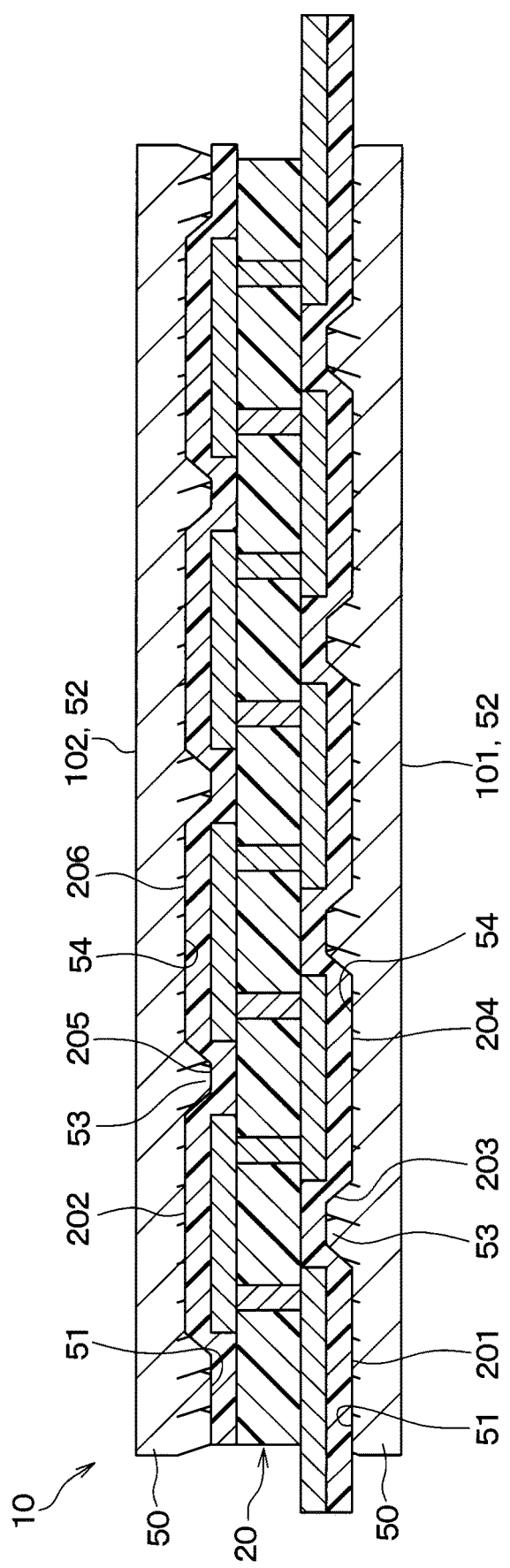
FIG. 20 is a cross-sectional view of a heat flux sensor according to a sixth embodiment.

As shown in FIG. 20, the heat flux sensor 10 of the present embodiment differs from the heat flux sensor 10 of the third embodiment in that both of the first surface 201 and the second surface 202 of the main body 20 have respective plate-like members 50 stacked thereon. Hence, with the present embodiment, the other surfaces 52 of the two plate-like members 50 constitute the outer surfaces 101 and 102 of the heat flux sensor 10.

Figure 21:
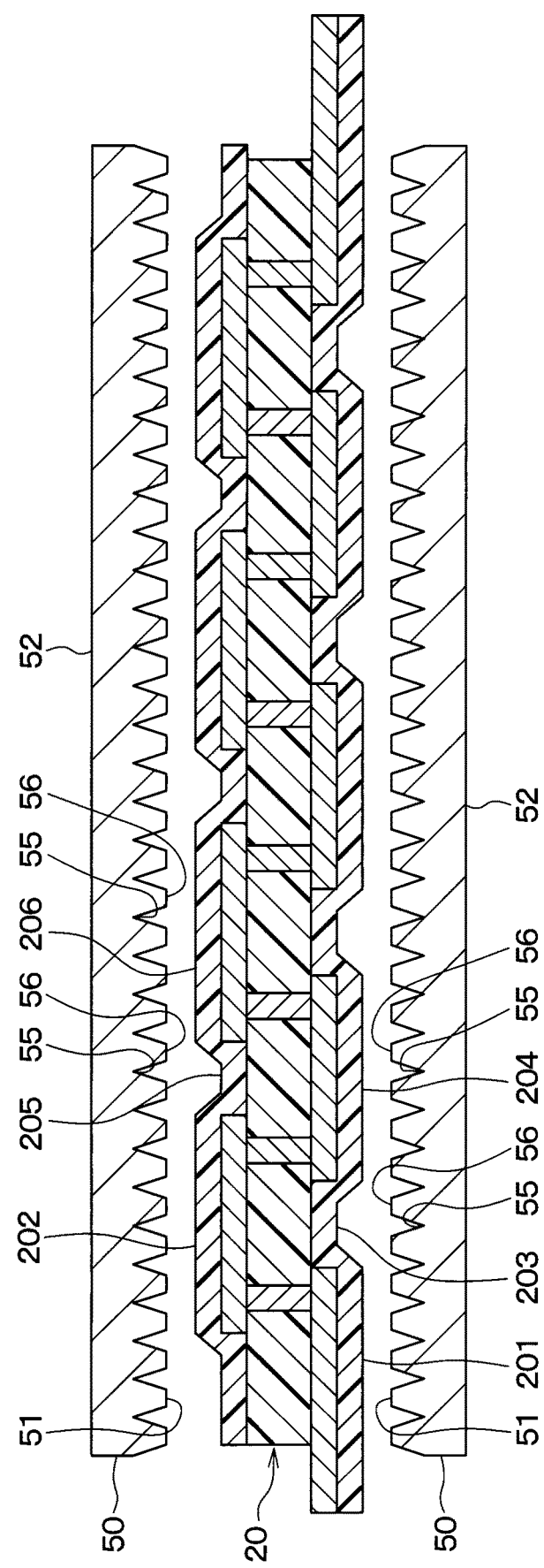
FIG. 21 is a cross-sectional view showing the arrangement of each member in a crimping step S13 of the sixth embodiment.

As shown in FIG. 21, the heat flux sensor 10 of the present embodiment is manufactured by crimping together the main body 20 and the plate-like members 50 in a condition in which plate-like members 50 are stacked on both of the surfaces 201 and 202 of the main body 20. Since the plate-like members 50 are disposed on both of the surfaces 201 and 202 of the main body 20 at that time, warping of the heat flux sensor 10 will not readily occur after manufacture.

As shown in FIG. 22, when measuring heat flux by using the heat flux sensor 10 of the present embodiment, one of the other surfaces 52 of the two plate-like members 50 (with the example shown in the drawing, the outer surface 101) is set in contact with the contact surface M1a of the object under measurement M1. With the present embodiment also, as with the first embodiment, the way in which heat flows through the heat flux sensor 10 can be made the same as, or made close to, the way in which heat flows within the object under measurement M1.

Furthermore, as shown in FIG. 23, when measuring heat flux by using the heat flux sensor 10 of the present embodiment, one of the surfaces 52 of the two plate-like members 50 (which in the example shown in the drawings is the outer surface 101) is set in contact with the contact surface M1a of the object under measurement M1. One of the other surfaces 52 of the two plate-like member 50 (which in the example shown in the drawings is the outer surface 102) is set in contact with the contact surface M2a of a heat dissipation member M2. In this case also, the way in which heat flows through the heat flux sensor 10 can be made identical to, or close to, the way in which heat flows within the object under measurement M1.

In this way, the same effects can be obtained as for the first embodiment even with the present embodiment.

Seventh Embodiment

Figure 24B:
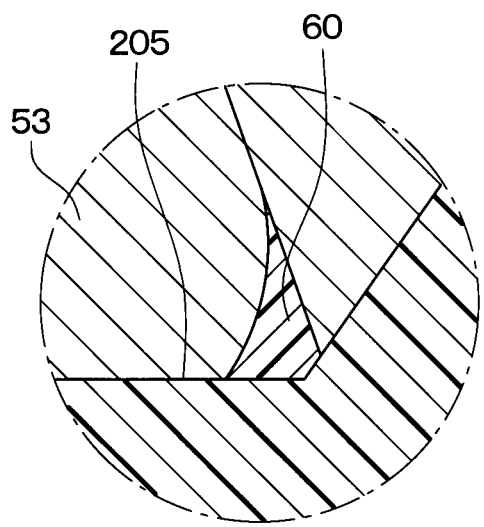
FIG. 24B is an expanded diagram of a region XXIVB in FIG. 24A.

As shown in FIG. 24A, the heat flux sensor 10 of the present embodiment differs from the heat flux sensor 10 of the fourth embodiment in that both of the first surface 201 and the second surface 202 of the main body 20 have respective plate-like members 50 stacked thereon. Hence, with the present embodiment, the respective other surfaces 52 of the two plate-like members 50 constitute the outer surfaces 101 and 102 of the heat flux sensor 10. Furthermore, with the present embodiment as shown in FIG. 24B, filling members 60 are filled in the concave portions 205 on the second surface 202 side also, in the same way as on the first surface 201 side.

As shown in FIG. 25, the heat flux sensor 10 of the present embodiment is manufactured by applying pressure to the main body 20 and the plate-like member 50 in a condition in which a sheet 61 and a plate-like member 50 are stacked on both the first surface 201 and the second surface 202 of the main body 20. Since plate-like members 50 are disposed on both of the surfaces 201 and 202 at that time, warping of the heat flux sensor 10 will not readily occur after manufacture.

The same effects are obtained as for the first embodiment even with the present embodiment.

Eighth Embodiment

As shown in FIG. 26, the heat flux sensor 10 of the present embodiment differs from the heat flux sensor 10 of the fifth embodiment in that both of the first surface 201 and the second surface 202 of the main body 20 have respective plate-like members 50A stacked thereon. Hence, with the present embodiment, the other surfaces 52 of the two plate-like members 50A constitute the outer surfaces 101 and 102 of the heat flux sensor 10. Furthermore, with the present embodiment as shown in FIG. 24B, a filling member 70 is filled in the concave portions 205 on the second surface 202 side also, in the same way as on the first surface 201 side.

Figure 27:
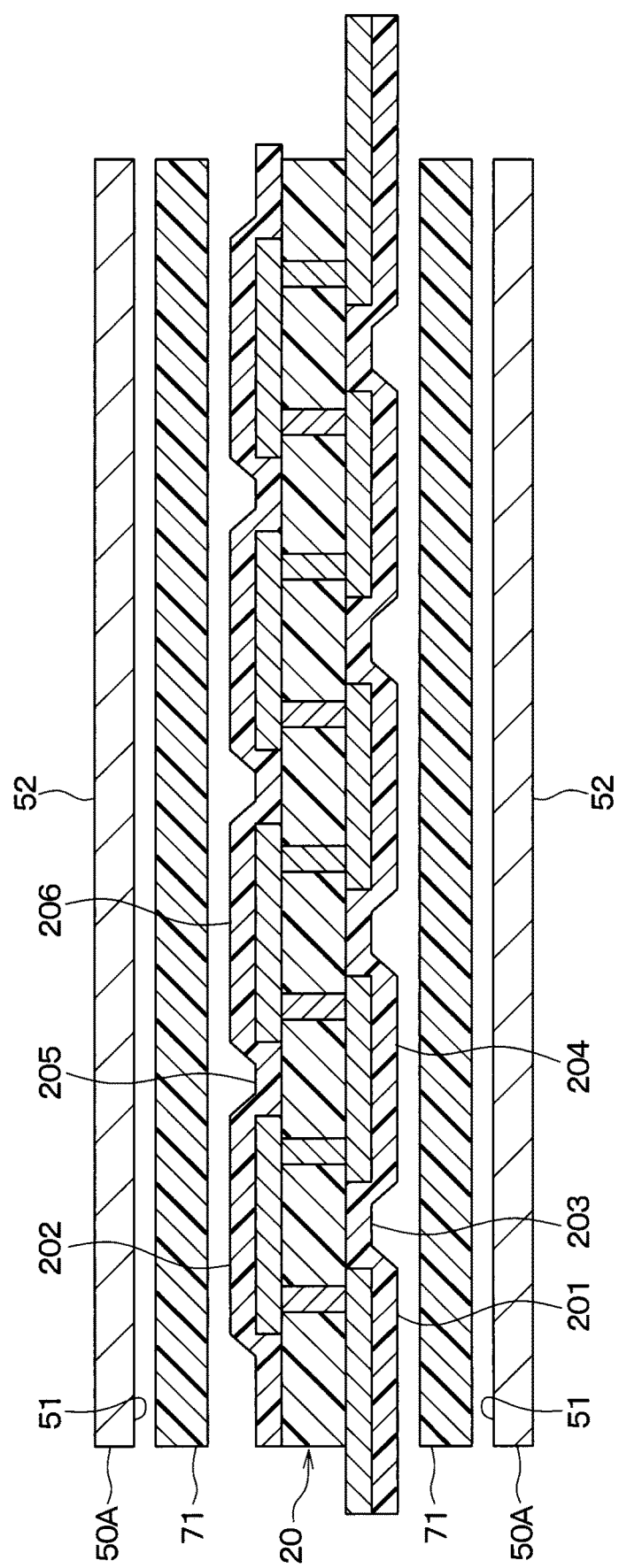
FIG. 27 is a cross-sectional view showing the arrangement of each member in a crimping step S13 of the eighth embodiment.

As shown in FIG. 27, the heat flux sensor 10 of the present embodiment is manufactured by applying pressure to the main body 20 and the plate-like members 50 while heating, in a condition in which a sheet 71 and a plate-like member 50A are stacked on the first surface 201 and on the second surface 202 on both sides of the main body 20. Since the plate-like members 50A are disposed on both of the surfaces 201 and 202 at that time, warping of the heat flux sensor 10 will not readily occur after manufacture.

Figure 28:
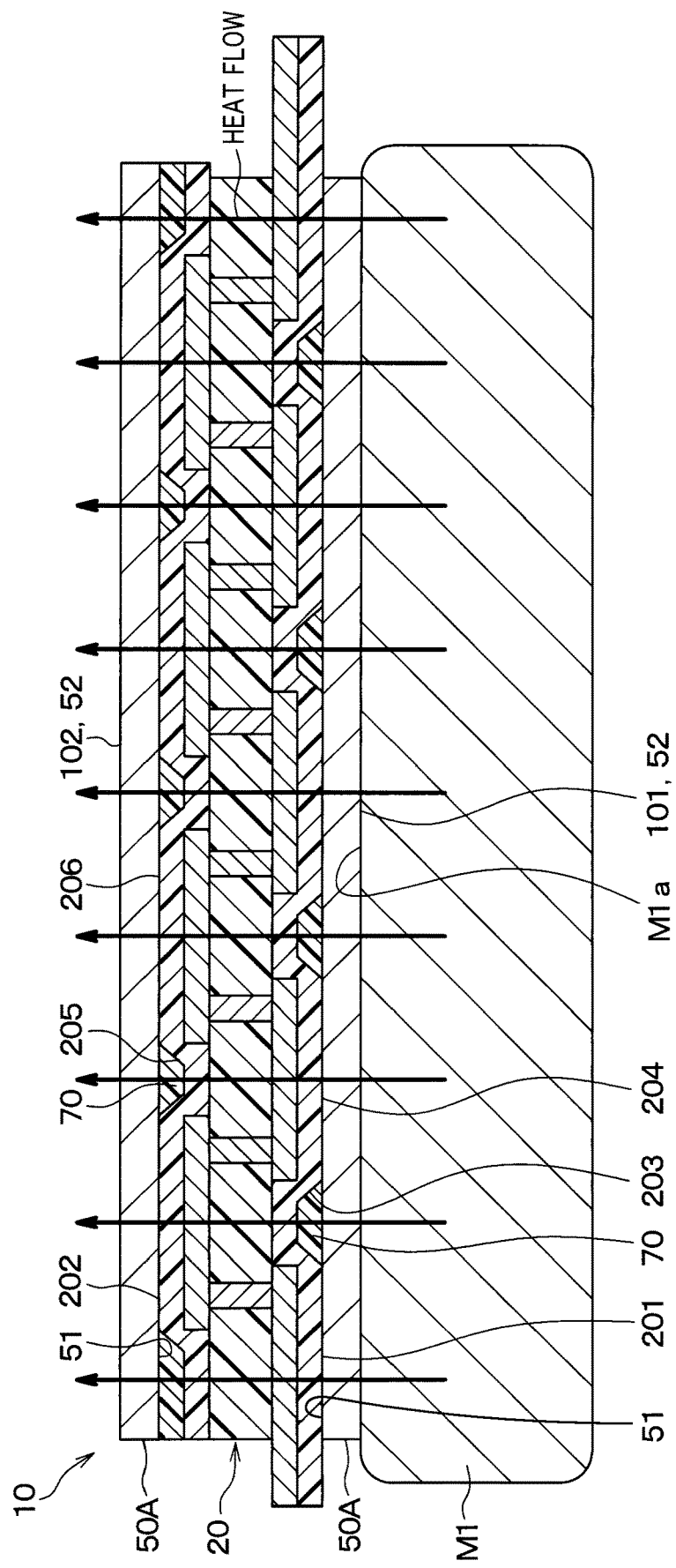
FIG. 28 is a cross-sectional view of a heat flux sensor according to the eighth embodiment, in a condition of being set on an object under measurement, conceptually illustrating the flow of heat from the object under measurement.

As shown in FIG. 28, when measuring heat flux by using the heat flux sensor 10 of the present embodiment, the other surface 52 of one of the two plate-like members 50 (with the example shown in the drawing, the outer surface 101) is set in contact with the contact surface M1a of the object under measurement M1. With the present embodiment also, the way in which heat flows through the heat flux sensor 10 can be made the same as, or close to, the way in which heat flows within the object under measurement M1.

Figure 29:
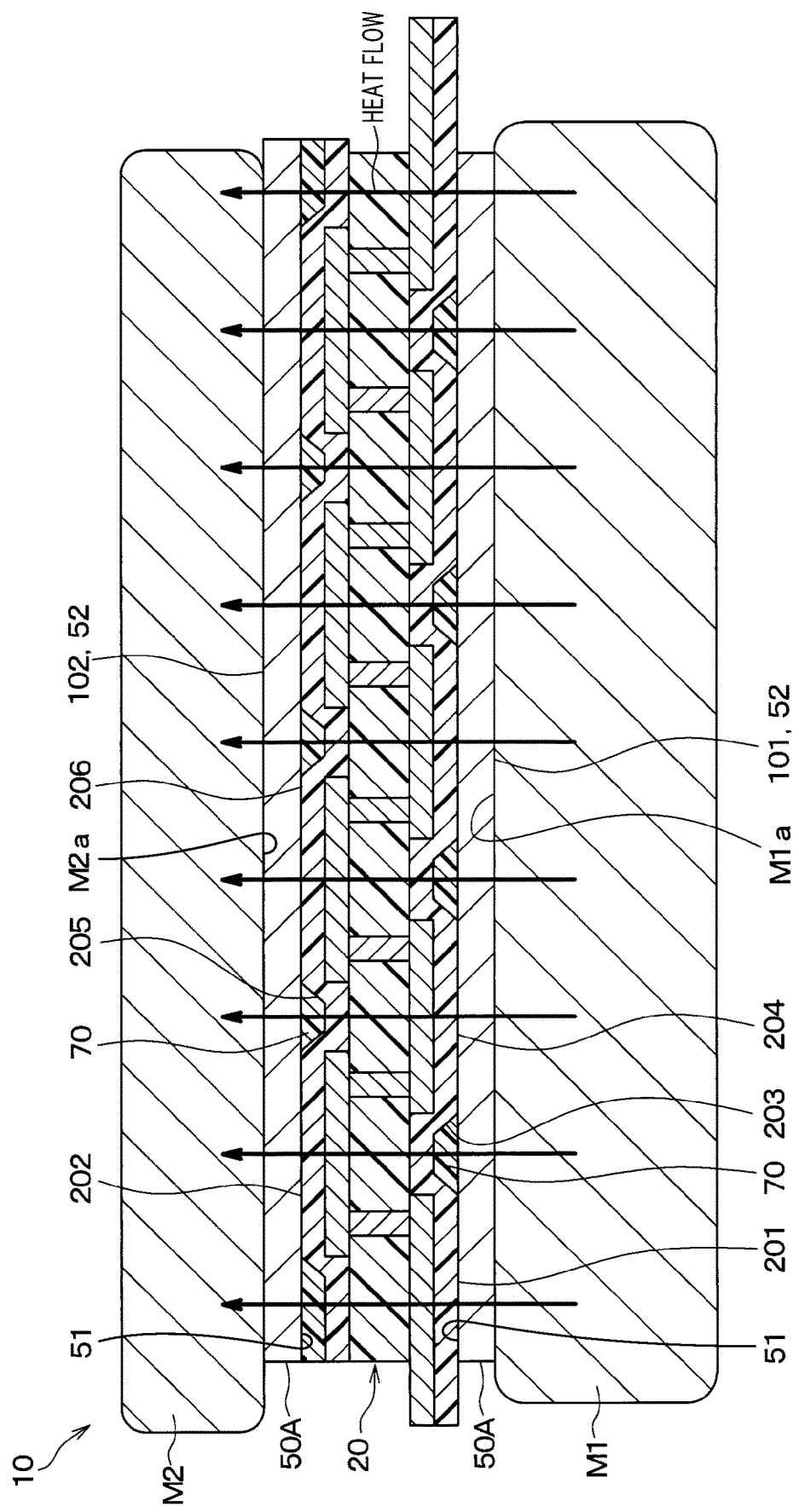
FIG. 29 is a cross-sectional view of a heat flux sensor according to the eighth embodiment, in a condition of being set on an object under measurement, conceptually illustrating the flow of heat from the object under measurement.

Furthermore, as shown in FIG. 29, when measuring heat flux by using the heat flux sensor 10 of the present embodiment, the other surface 52 of one of the two plate-like members 50 (with the example shown in the drawing, the outer surface 101) is set in contact with the contact surface M1a of the object under measurement M1. The other surface 52 of the other one of the two plate-like members 50 (with the example shown in the drawing, the outer surface 102) is set in contact with the contact surface M2a of a heat dissipation member M2. At that time also, the way in which heat flows through the heat flux sensor 10 can be made the same as, or close to, the way in which heat flows within the object under measurement M1. Hence, the same effects are obtained as for the first embodiment even with the present embodiment.

Ninth Embodiment

As shown in FIG. 30, the heat flux sensor 10 of the present embodiment differs from the heat flux sensor 10 of the first embodiment with respect to the material of the outermost layers of the main body 20. Furthermore, the heat flux sensor 10 of the present embodiment differs from the heat flux sensor 10 of the first embodiment in not being provided with an insulating base member 21.

The outermost layers of the main body 20 consists of a first protection member 22A and a second protection member 23A. The first protection member 22A and second protection member 23A correspond to the first and second protection members 22, 23 of the main body 20 of the first embodiment. Both of the first and second protection members 22A, 23A are formed as ceramic plates. The material constituting the ceramic plates could for example be alumina, aluminum nitride, silicon carbide, or the like. The thermal conductivity of alumina is 32 W/(m·K). The thermal conductivity of aluminum nitride is 150 W/(m·K). The thermal conductivity of silicon carbide is 200 W/(m·K). Hence, the thermal conductivity of these materials is higher than the thermal conductivity of air.

The first thermoelectric elements 26 and second thermoelectric elements 27 are rod-shaped. The first and second thermoelectric elements 26, 27 are supported in a condition of being enclosed between the first and second protection members 22A, 23A. The first thermoelectric elements 26 are P-type semiconductor bodies, made of BiTe alloy. The second thermoelectric elements 27 are N-type semiconductor bodies, made of NiCr alloy. The thermal conductivity of a P-type semiconductor body made of BiTe alloy is 1.5 W/(m·K). The thermal conductivity of an N-type semiconductor body made of NiCr alloy is 15 W/(m·K).

The first and second conductive patterns 28, 29 are formed of copper foil. The thermal conductivity of copper foil is 398 W/(m·K).

In the same way as for the first embodiment, the surface of the first protection member 22A on the opposite side from the first conductor patterns 28 constitutes the first surface 201 of the main body 20 of the present embodiment. The first surface 201 has an uneven shape, with a plurality of concave portions 203 and a plurality of convex portions 204. The surface of the second protection member 23A on the opposite side from the second conductor patterns 29 constitutes the second surface 202 of the main body 20. The second surface 202 has an uneven shape, with a plurality of concave portions 205 and a plurality of convex portions 206.

Furthermore, in the same way as for the first embodiment, the heat flux sensor 10 is provided with filling members 30. The filling members 30 are a first filling member 31 on the first surface 201 side, and second filling member 32 on the second surface 202 side. The first filling member 31 is filled in all of the plurality of concave portions 203 on the first surface 201. The second filling member 32 is filled in all of the plurality of concave portions 205 on the second surface 202.

The outer surface 101 of the heat flux sensor 10 is flattened by the first filling member 31. The outer surface 102 of the heat flux sensor 10 is flattened by the second filling member 32. With the present embodiment, the first filling member 31 constitutes a flattening member for flattening the outer surface 101 of the heat flux sensor 10. The second filling member 32 constitutes a flattening member for flattening the outer surface 102 of the heat flux sensor 10. With the present embodiment, the surfaces of the first filling member 31 and part of the first surface 201 (the surfaces of the convex portions 204) constitute the outer surface 101 of the heat flux sensor 10 on the first surface 201 side. The degree of flatness of the outer surface 101 is higher than the degree of flatness of the first surface 201 of the main body 20. Similarly, the surface of the second filling member 32 and part of the second surface 202 (the surfaces of the convex portions 206) constitute the outer surface 102 of the heat flux sensor 10 on the second surface 202 side. The degree of flatness of the outer surface 102 is higher than the degree of flatness of the first surface 202 of the main body 20.

As with the first embodiment, the manufacture of the heat flux sensor 10 of the present embodiment is executed by a preparation step S1, a stacking step S2, and a thermocompression bonding step S3, in that order. However, this main body 20 is manufactured in the following way.

As shown in FIG. 31A, first thermoelectric elements 26, second thermoelectric elements 27, a first protection member 22A and a second protection member 23A are prepared.

The prepared first thermoelectric elements 26 and second thermoelectric elements 27 are molded into a prescribed shape. For example, the first thermoelectric elements 26 and second thermoelectric elements 27 may be molded by sintering metal powder. The first and second protection members 23A, 23B are ceramic plates.

The first conductor patterns 28 are formed on the surface of the prepared first protection member 22A that is on the side of the first thermoelectric elements 26 and second thermoelectric elements 27. The surface 201 of the first protection member 22A that is on the opposite side from the first thermoelectric elements 26 and second thermoelectric elements 27 has an uneven shape, with a plurality of concave portions 203 and a plurality of convex portions 204. The uneven shape of the first surface 201 of the prepared first protection member 22A becomes the uneven shape of the first surface 201 of the main body 20.

The second conductor patterns 29 are formed on the surface of the second protection member 23A that is on the side of the first thermoelectric elements 26 and second thermoelectric elements 27. The surface 202 of the second protection member 23A that is on the opposite side from the first thermoelectric elements 26 and second thermoelectric elements 27 has an uneven shape, with a plurality of concave portions 205 and a plurality of convex portions 206. The uneven shape of the second surface 202 of the prepared second protection member 23A becomes the uneven shape of the second surface 202 of the main body 20.

Next, as shown in FIG. 31B, the first thermoelectric elements 26 and second thermoelectric elements 27, the first protection member 22A and the second protection member 23A are stacked together to form a stacked body. Thereafter, pressure is applied to the stacked body in the stacking direction. In this way, the first and second thermoelectric elements 26, 27, and the first and second conductor patterns are crimped.

In the thermocompression bonding step S3 as shown in FIG. 32, in the same way as for the first embodiment, a stacked body 220 made up of the main body 20 and two sheets 22 and 34 is subjected to pressure while being heated. Hence, as shown in FIG. 30, a first filling member 31 that is filled in the concave portions 203 in the first surface 201 and second filling member 32 that is filled in the concave portions 205 in the second surface 202 are formed. As a result of this, the outer surfaces 101, 102 of the heat flux sensor 10 are flattened.

In this way, the heat flux sensor 10 of the present embodiment is manufactured.

The heat flux sensor 10 of the present embodiment and the heat flux sensor K10 of the comparison example 2 shown in FIG. 33 will be compared. The heat flux sensor K10 differs from the heat flux sensor 10 of the present embodiment in that the heat flux sensor K10 is not provided with the first and second filling members 31 and 32. That is to say, of the main body 20 and the filling members 30, the heat flux sensor K10 is provided only with the main body 20.

As shown in FIG. 33, in measuring the heat flux, the first surface 201 of the heat flux sensor K10 is set in contact with the contact surface M1a of the object under measurement M1. At that time, a layer of air A2 exists between the heat flux sensor 10 and the object under measurement M1, due to the concave portions 203. The thermal conductivity of air is 0.0241 W/(m·K) approximately, which is much lower than that of the materials constituting the main body 20. Hence, heat conduction is obstructed by air. As a result, when heat flux from the object under measurement M1 flows through the heat flux sensor K10, the heat flows such as to avoid the air layer A2. That is to say, it is difficult for heat to flow through those of the plurality of first thermoelectric elements 26 and the plurality of second thermoelectric elements 27 that are close to the air layer A2. As a result, the way in which heat flows through the heat flux sensor K10 is different from the way in which heat flows inside the object under measurement M1. Hence, the heat flux from the object under measurement M1 cannot be accurately measured.

In contrast to this, in the case of the heat flux sensor 10 of the present embodiment, the outer surface 101 on the first surface 201 side of the heat flux sensor 10 is flattened by the first filling member 31. As shown in FIG. 34, the outer surface 101 of the heat flux sensor 10 is set in contact with the contact surface M1a of the object under measurement M1. At that time, by comparison with the prior art example 1, the air layer A2 that arises between the heat flux sensor 10 and the object under measurement M1 can be made small. Alternatively, a layer of air can be prevented from arising. As a result, as shown by the arrows in FIG. 6, the manner in which heat flows through the heat flux sensor 10 can be made close to that of the flow of heat within the object under measurement M1. For that reason, the same results as for the first embodiment can be obtained even with the present embodiment.

Tenth Embodiment

Figure 35:
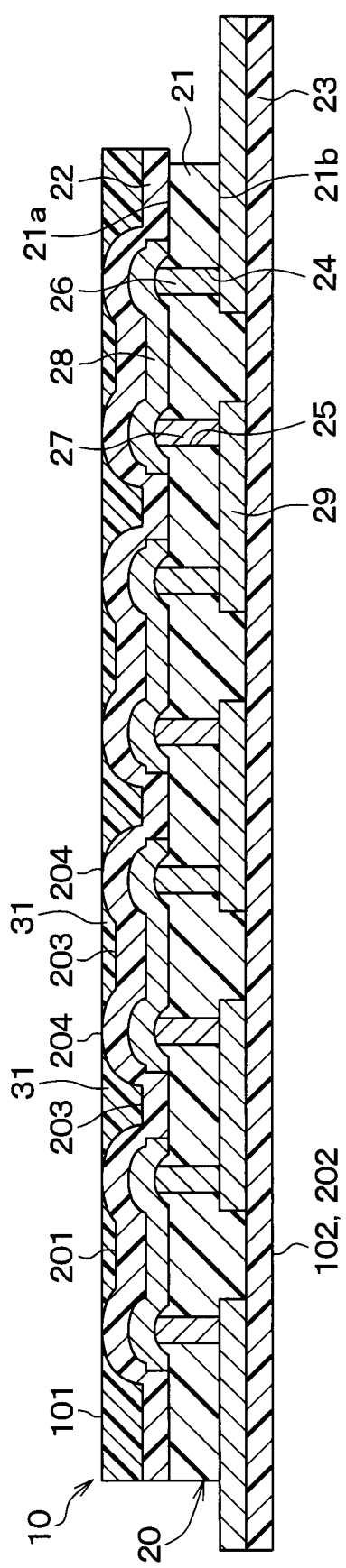
FIG. 35 is a cross-sectional view of a heat flux sensor according to a tenth embodiment.

As shown in FIG. 35, the heat flux sensor 10 of the present embodiment differs from that of the first embodiment in that, with the heat flux sensor 10 of the present embodiment, only one of the surfaces of the main body 20 has an uneven shape, and in that the first filling member 31 is only formed on one surface of the main body 20. In other words, the heat flux sensor 10 of the present embodiment differs from that of the first embodiment in that, with the heat flux sensor 10 of the present embodiment, the second surface 202 of the main body 20 is changed to having a flat shape.

That is to say, the first surface 201 of the main body 20 has an uneven shape, with a plurality of concave portions 203 and a plurality of convex portions 204. With the present embodiment there are two types of concave portions 203, consisting of concave portions 203 that are located where there are first conductor patterns 28, and concave portions 203 that are located where there are no first conductor patterns 28. The concave portions 203 that are located where there are no first conductor patterns 28 are more deeply recessed than the concave portions 203 that are located where there are first conductor patterns 28. The second surface 202 of the main body 20 is a flat surface. The degree of flatness of the second surface 202 is higher than the degree of flatness of the first surface 201. It should be noted that FIG. 35 differs from FIG. 1 in that the first surface 201 is the upper surface of the main body 20.

The filling member 31 is filled in the plurality of concave portions 203. The filling member 31 corresponds to the filling member 31 of the first embodiment. The surface of the 31 and a part of the first surface 201 (the surfaces of the convex portions 204) constitute the outer surface 101 of the heat flux sensor 10. The degree of flatness of the outer surface 101 is greater than the degree of flatness of the first surface 201 of the main body 20. Furthermore, the second surface 202 constitutes the outer surface 102 of the heat flux sensor 10.

Next, the method of manufacture of the heat flux sensor 10 of the present embodiment will be described.

Firstly, the method of manufacture of the main body 20 will be described.

Figure 36A:
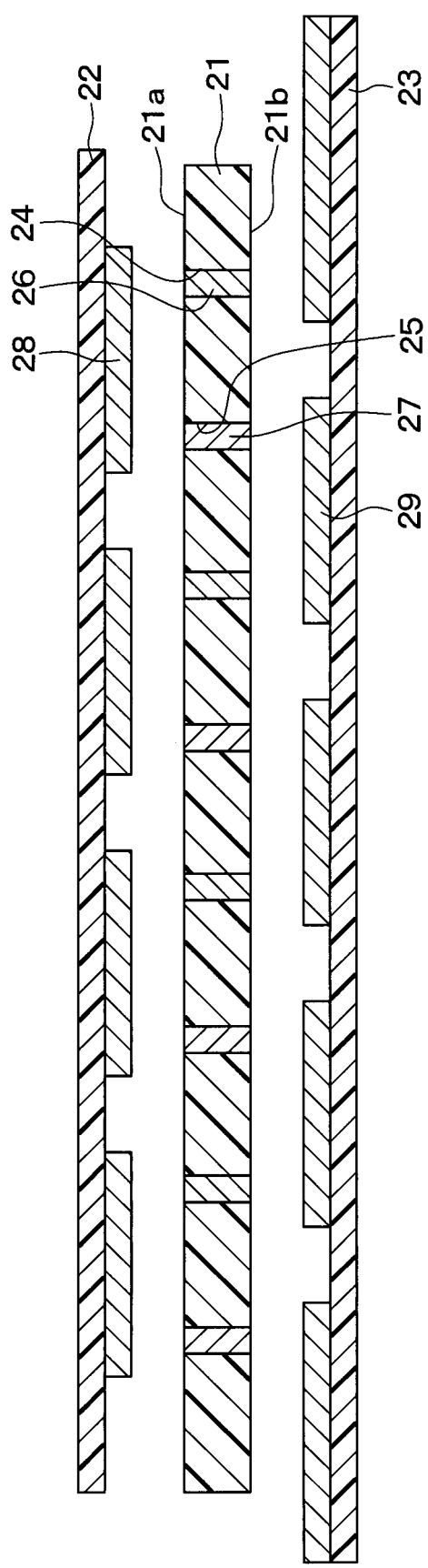
FIG. 36A is a cross-sectional view illustrating a manufacturing step of a main body according to the tenth embodiment.

As shown in FIG. 36A, an insulating base member 21, a first protection member 22 and a second protection member 23 are prepared. This is the same as is shown in FIG. 4A.

Figure 36B:
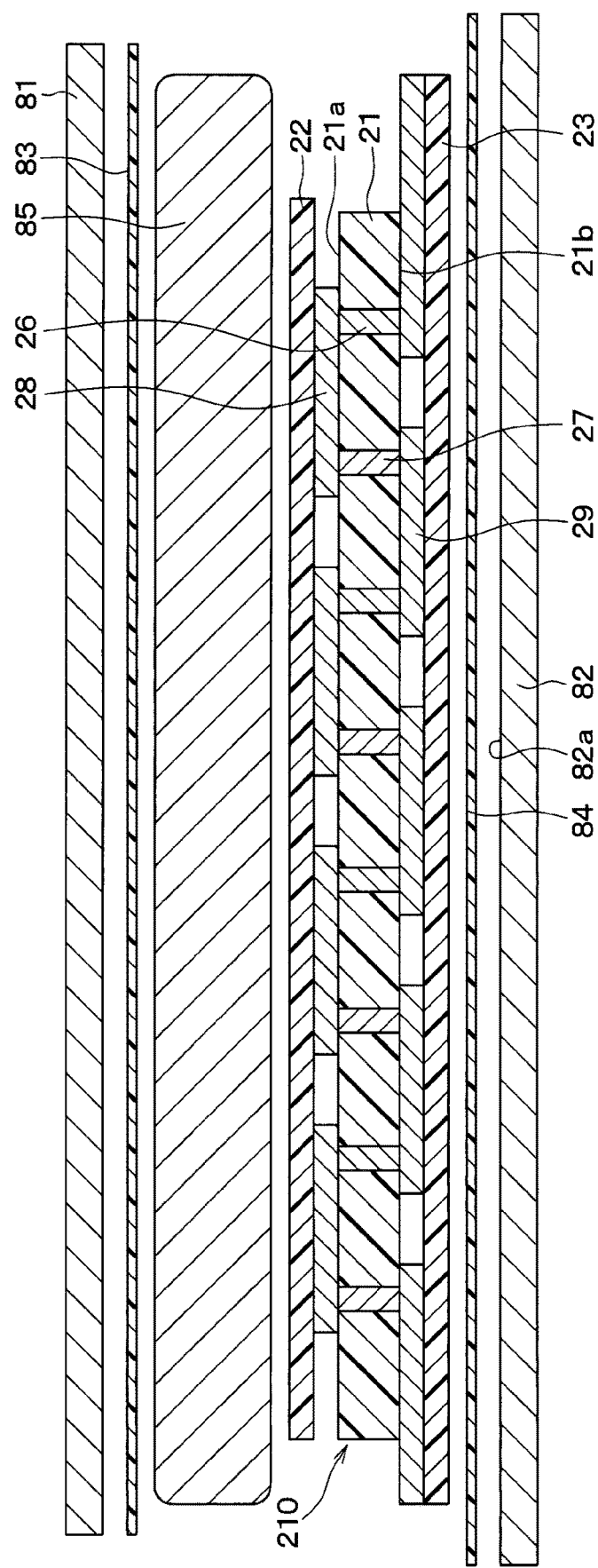
FIG. 36B is a cross-sectional view that is a continuation of FIG. 36A, showing the arrangement of each member when pressure is being applied.

Next, as shown in FIG. 36B, a stacked body 210 is formed. The stacked body 210 is the same as is shown in FIG. 4B. However, FIG. 36B differs from FIG. 4B in that the first protection member 22 is disposed on the upper side of the insulating base member 21, and the second protection member 23 is disposed on the lower side of the insulating base member 21.

Figure 36C:
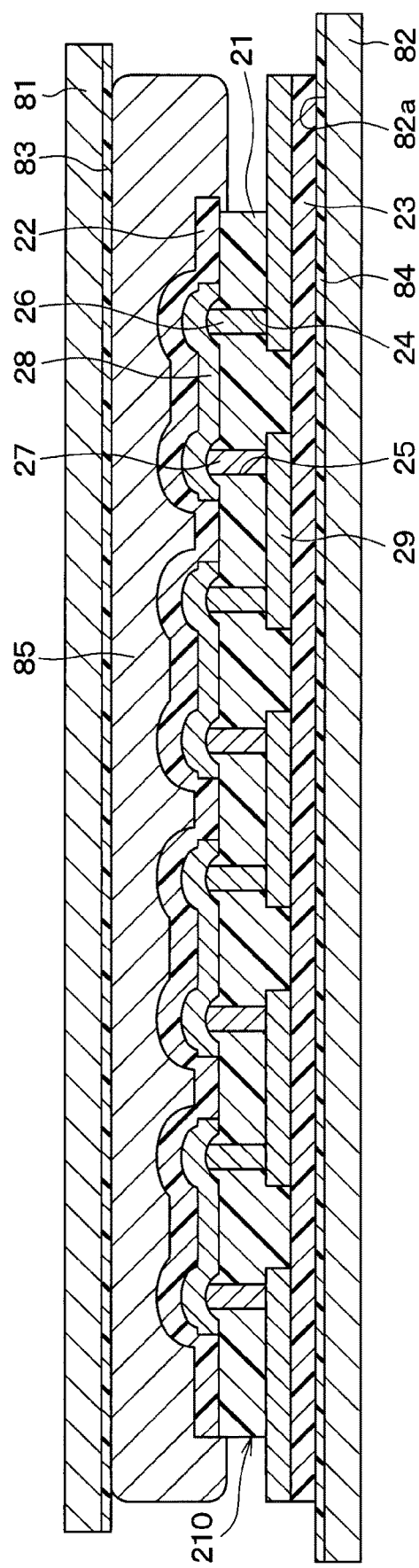
FIG. 36C is a cross-sectional view that is a continuation of FIG. 36B, showing the condition when pressure is being applied.

Next, as shown in FIG. 36C, the stacked body 210 is subjected to pressure in the stacking direction of the stacked body 210 while being heated. Specifically, as shown in FIGS. 36B, 36C, this application of pressure is executed using release films 83, 84, in the same way as for the first embodiment. With the present embodiment, a buffer member 85 is disposed between the stacked body 210 and a release film 83 on only one side of the stacked body 210, specifically the first protection member 22 side.

As shown in FIG. 36C, the first protection member 22 is deformed, following the unevenness condition of the first conductor patterns 28 and the insulating base member 21.

Furthermore, the pressing plate 82 has a flat surface 82a. The second protection member 23 is subjected to pressure by this flat surface 82a. The surface of the second protection member 23 is thereby made flat.

Figure 36D:
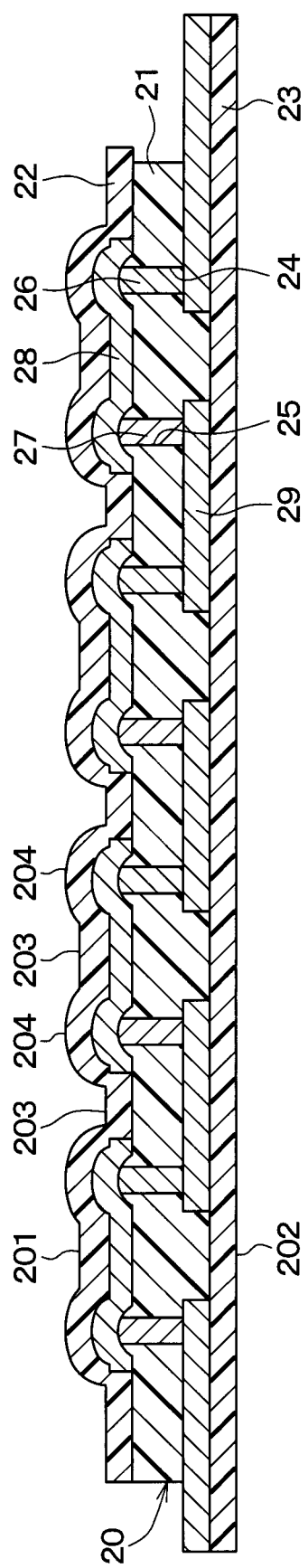
FIG. 36D is a cross-sectional view of a main body, after the manufacturing step of FIG. 36C for the main body.

Thereafter, the release films are peeled off. In this way, as shown in FIG. 36D, the main body 20 is manufactured with the first surface 201 having an uneven shape and the second surface 202 having a flat shape.

Figure 37:
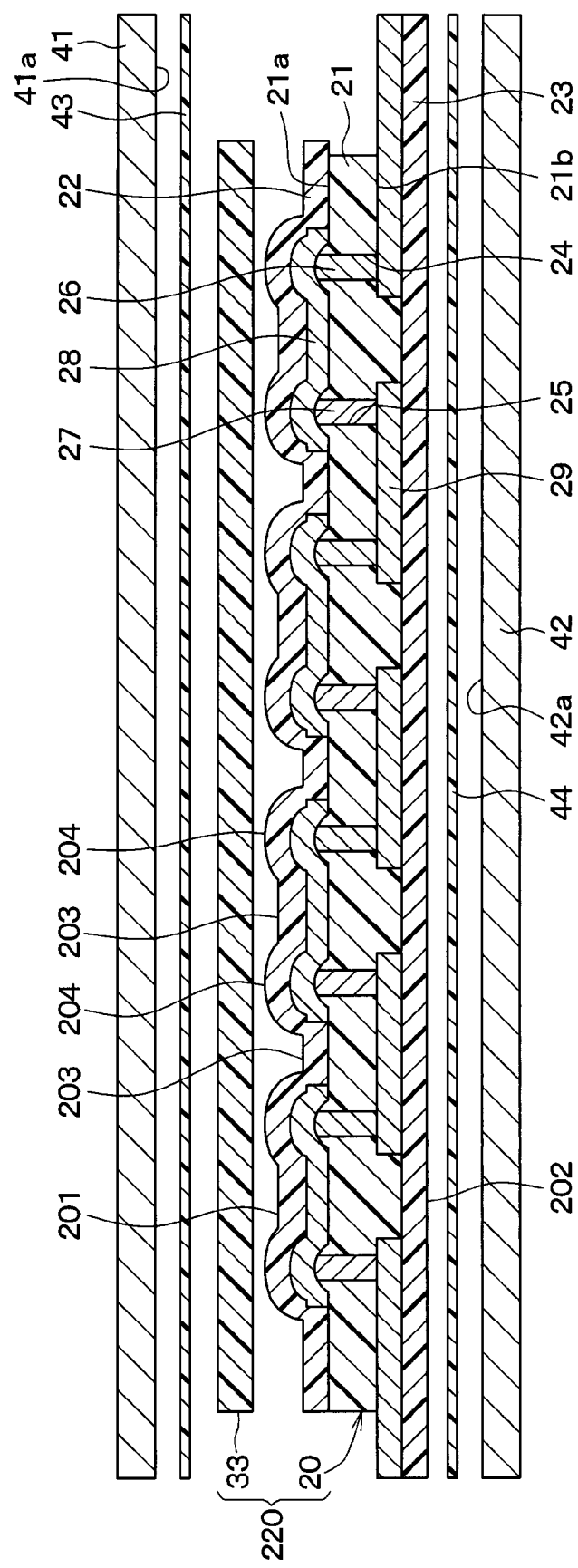
FIG. 37 is a cross-sectional view showing the arrangement of each member in a thermocompression step of the tenth embodiment.

Next, as shown in FIG. 37, in the thermocompression bonding step S3, a stacked body 220 is formed from the main body 20 and a single sheet 33, in a condition in which the sheet 33 is stacked on the first surface 201 of the main body 20, with no sheet being stacked on the second surface 202. The heat flux sensor 10 of the present embodiment is manufactured by subjecting this stacked body 220 to thermocompression. The other processes are the same as for the first embodiment.

Figure 38:
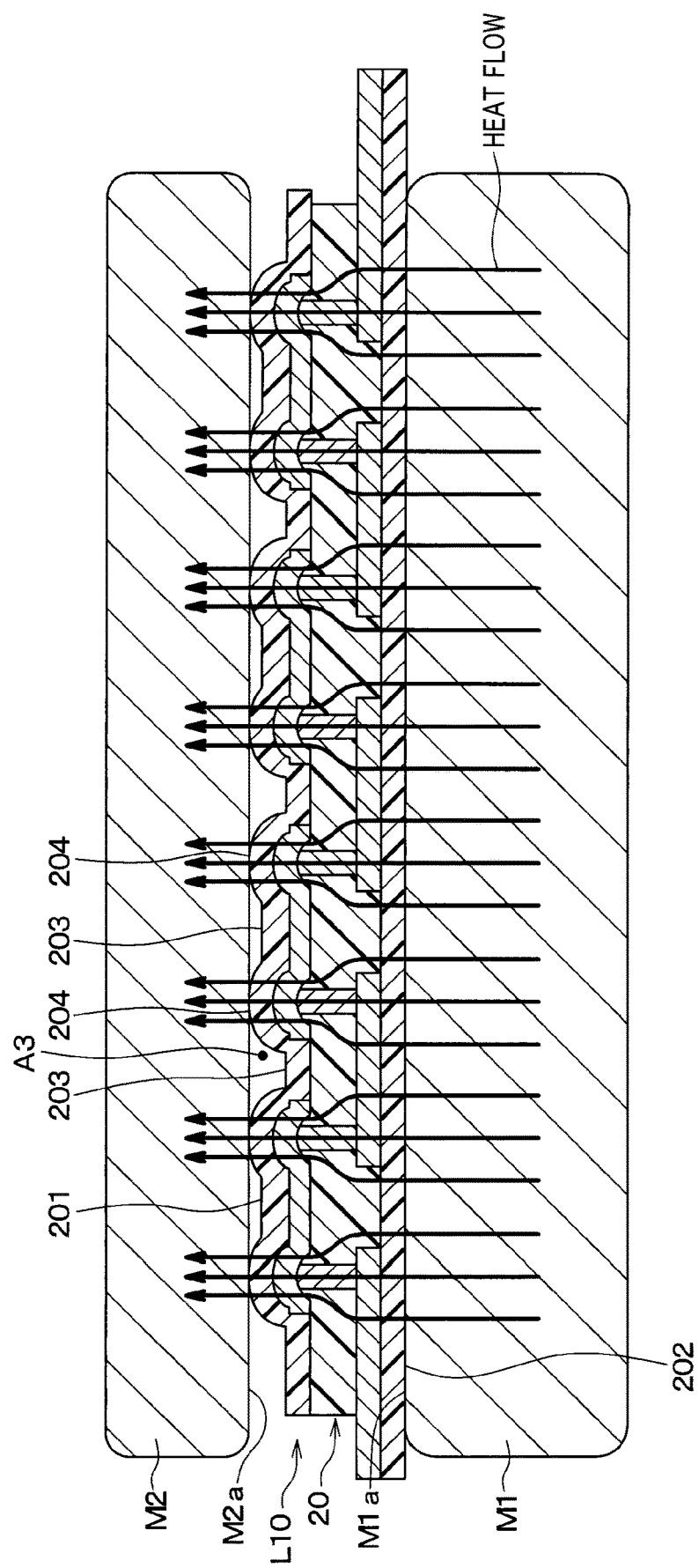
FIG. 38 is a cross-sectional view of a comparison example 3 of a heat flux sensor, in a condition of being set on an object under measurement, conceptually illustrating the flow of heat from the object under measurement.

The heat flux sensor 10 of the present embodiment will be compared with the heat flux sensor L10 of the prior art example 3 shown in FIG. 38. The heat flux sensor L10 differs from the heat flux sensor 10 of the present embodiment in that the heat flux sensor L10 is not provided with the filling member 31. That is to say, of the main body 20 and the filling member 31, the heat flux sensor L10 is provided only with the main body 20.

As shown in FIG. 38, in measuring heat flux, the second surface 202 of the heat flux sensor 10 is set in contact with the contact surface M1a of the object under measurement M1. Furthermore, the first surface 201 of the heat flux sensor L10 is set in contact with the contact surface M2a of a heat dissipation member M2. In this way, the heat flux between the object under measurement M1 and the heat dissipation member M2 is measured.

At that time, the heat flux sensor L10 has a plurality of concave portions 203 in the first surface 201. Due to these concave portions 203, a layer of air A3 exists between the heat flux sensor L10 and the heat dissipation member M2. For that reason, when heat flows from the object under measurement M1 to the heat dissipation member M2, the heat flows such as to avoid the layer of air A3. That is to say, the way in which heat flows through the heat flux sensor L10 is different from the way in which heat flows in the interior of the object under measurement M1. Hence, the heat flux from the object under measurement M1 cannot be accurately measured.

Figure 39:
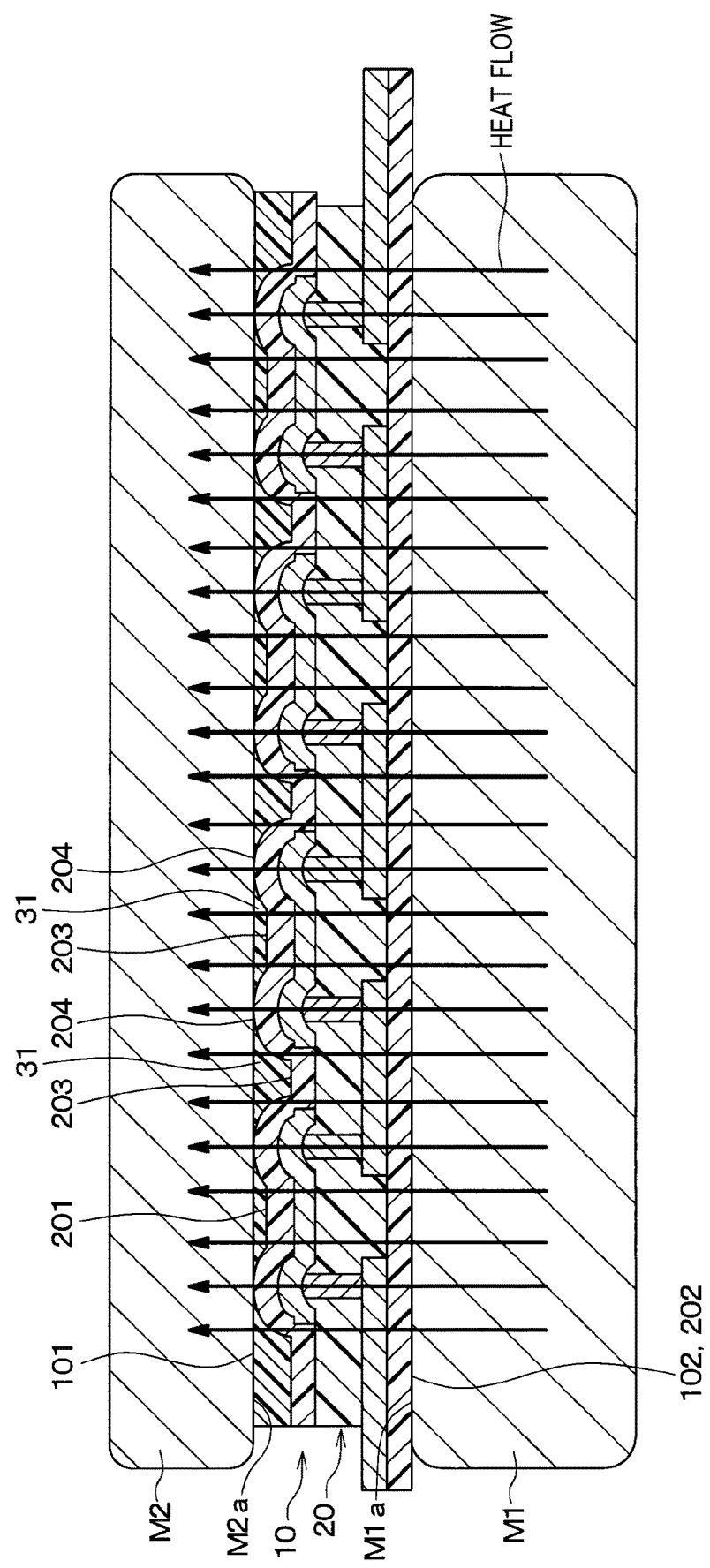
FIG. 39 is a cross-sectional view of a heat flux sensor according to the tenth embodiment, in a condition of being set on an object under measurement, conceptually illustrating the flow of heat from the object under measurement.

In contrast to this, with the heat flux sensor 10 of the present embodiment, the outer surface 101 of the heat flux sensor 10 is flattened on the first surface 201 side, by the filling member 31. As shown in FIG. 39, in measuring heat flux, the outer surface 102 of the heat flux sensor 10 is set in contact with the contact surface M1a of the object under measurement M1. Furthermore, the outer surface 101 of the heat flux sensor 10 is set in contact with the contact surface M2a of the heat dissipation member M2. At that time, by comparison with the third embodiment, the layer of air A3 between the heat flux sensor 10 and the heat dissipation member M2 can be made small. Alternatively, formation of a layer of air between the heat flux sensor 10 and the heat dissipation member M2 can be prevented. As a result, as shown by the arrows in FIG. 39, the way in which heat flows through the heat flux sensor 10 can be made identical to, or close to, that of the flow of heat within the object under measurement M1. Hence, with the present embodiment also, similar effects to those of the first embodiment can be obtained.

It should be noted that the following changes could be made to the measurement of heat flux. That is to say, it would be equally possible for an outer surface 101 that has been flattened by the filling member 31 to be set in contact with the contact surface M1a of the object under measurement M1. Furthermore, it would be equally possible for the outer surface 102 to be set in contact with the contact surface M2a of the heat dissipation member M2.

Eleventh Embodiment

The embodiment differs from the tenth embodiment with respect to the method of manufacture of the heat flux sensor 10.

Figure 40:
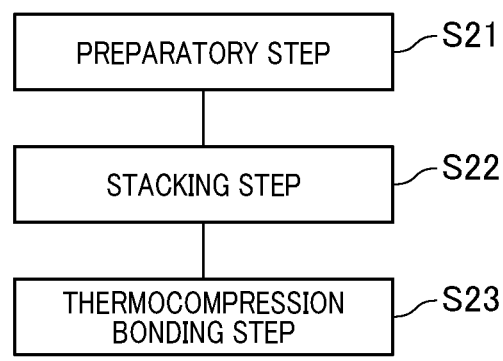
FIG. 40 is a flow diagram of a method of manufacture of a heat flux sensor according to an eleventh embodiment.

With the method of manufacture of the present embodiment, as shown in FIG. 40, a preparation step S21, a stacking step S22 and a thermocompression bonding step S23 are executed in that order.

Figure 41:
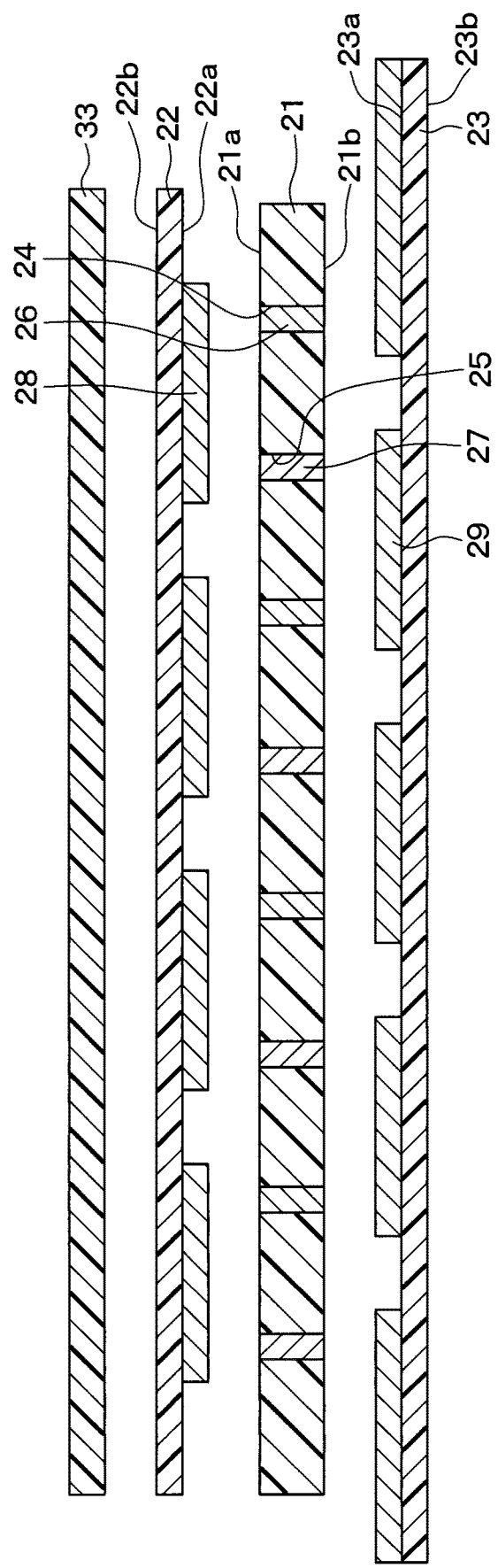
FIG. 41 is a cross-sectional view showing the method of manufacture of a heat flux sensor according to the eleventh embodiment.

In the preparation step S21, as shown in FIG. 41, an insulating base member 21, a first protection member 22 and a second protection member 23 are prepared. This is the same as is shown in FIG. 4A, in describing the first embodiment. FIG. 41 differs from FIG. 4A in that the first protection member 22 is disposed on the upper side of the insulating base member 21.

The insulating base member 21, first protection member 22 and second protection member 23 are film-like, or sheet-like. In the present specification, both film-like and sheet-like signify a thin condition. Film type, or sheet-like, does not signify a difference in thickness.

The insulating base member 21 has a surface 21a and an other surface 21b. The surface 21a is the upper surface of the insulating base member 21, as seen in FIG. 41. The surface 21b is the lower surface of the insulating base member 21, as seen in FIG. 41. The surface 21a of the insulating base member 21 corresponds to a first surface of the insulating base member 21. The other surface 21b of the insulating base member 21 corresponds to a second surface of the insulating base member 21.

In the interior of the insulating base member 21, respective ones of a plurality of first thermoelectric elements 26 are disposed in alternation with respective ones of a plurality of second thermoelectric elements 27. The plurality of first thermoelectric elements 26 are embedded in respective ones of a plurality of first via holes 24, which penetrate in the thickness direction of the insulating base member 21. The plurality of second thermoelectric elements 27 are embedded in respective ones of a plurality of second via holes 25, which penetrate in the thickness direction of the insulating base member 21.

The first protection member 22 has a front surface 22a, and a rear surface 22b on the opposite side from the front surface 22a. A plurality of first conductor patterns 28 are formed on the front surface 22a of the first protection member 22. The second protection member 23 has a front surface 23a, and a rear surface 23b on the opposite side from the front surface 23a. A plurality of second conductor patterns 29 are formed on the front surface 23a of the second protection member 23a.

Furthermore, a sheet 33 is prepared. This is the same as for the tenth embodiment. It should be noted that it would be equally possible to use, as the filler material constituting the sheet 33, a material which can flow when subjected to the temperature and pressure produced in forming the main body 20 of the heat flux sensor 10. More specifically, the filler material constituting the sheet 33 can be a material which has a lower softening point than the materials that constitute the insulating base member 21, the first protection member 22 and the second protection member 23.

Figure 42:
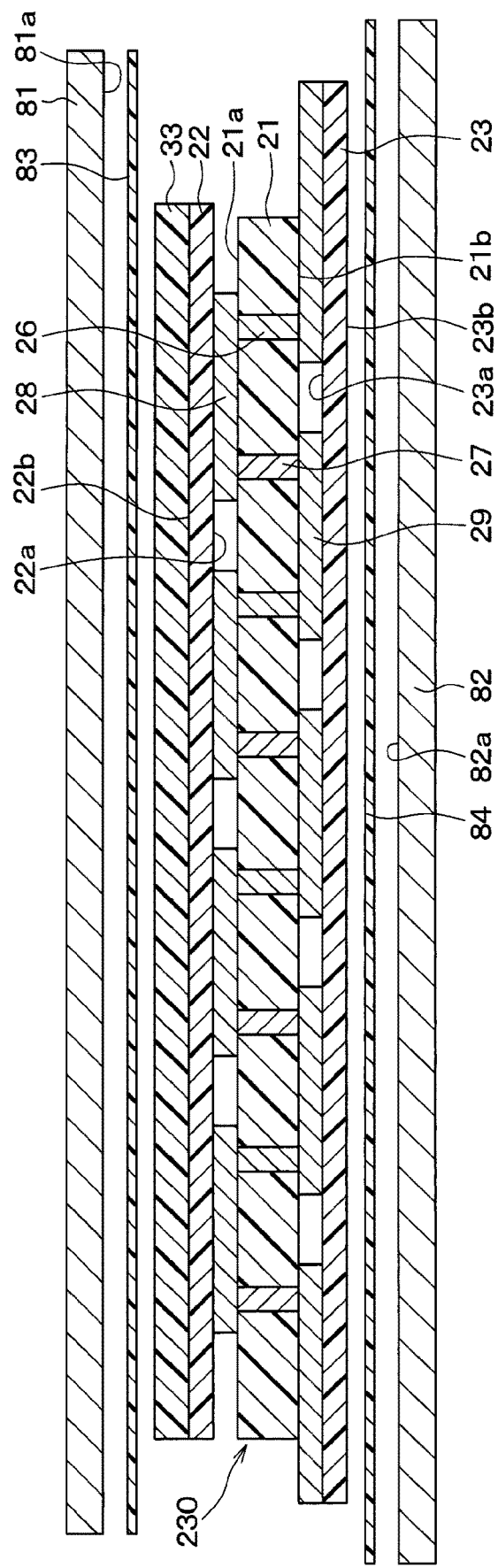
FIG. 42 is a cross-sectional view that is a continuation of FIG. 41, showing the arrangement of each member when pressure is being applied.

In the stacking step S22, as shown in FIG. 42, the insulating base member 21, the first protection member 22 and the second protection member 23 and sheet 33 are stacked to form a stacked body 230.

Specifically, the first protection member 22 is stacked on the surface 21a side of the insulating base member 21. At that time, the front surface 22a of the first protection member 22 faces the insulating base member 21. As a result, the first protection member 22 becomes disposed on the surface 21a side of the insulating base member 21. The plurality of first conductor patterns 28 are disposed between the insulating base member 21 and the first protection member 22. Each of the plurality of first conductor patterns 28 is set in a condition of contact with a first thermoelectric element 26 and a second thermoelectric element 27 that are mutually adjacent, among the plurality of first thermoelectric elements 26 and second thermoelectric elements 27.

The sheet 33 is stacked on the rear surface 22b of the first protection member 22. As a result, the sheet 33 is disposed in a condition of being on the opposite side from the insulating base member 21 side of the first protection member 22.

The second protection member 23 is stacked on the side of the other surface 21b of the insulating base member 21. At that time, the front surface 23a of the second protection member 23 faces the insulating base member 21. As a result, the second protection member 23 is set in a condition of being disposed on the surface 21b side of the insulating base member 21. The plurality of second conductor patterns 29 are set in a condition of being disposed between the insulating base member 21 and the second protection member 23. Each of the plurality of second conductor patterns 29 is set in a condition of contact with a first thermoelectric element 26 and a second thermoelectric element 27 that are mutually adjacent, among the plurality of first thermoelectric elements 26 and second thermoelectric elements 27.

In the thermocompression bonding step S23, as shown in FIG. 42, a pair of pair of pressing plates 81, 82 are used. The stacked body 230 is sandwiched between the pair of pair of pressing plates 81, 82. The pressing plate 81 on the sheet 33 side has a flat surface 81a. The flat surface 81a is pressed against the sheet 33. Hence, the pressing plate 81 on the first sheet 33 side is a pressing member that is pressed against the sheet 33. The pressing plate 82 on the second protection member 23 side has a flat surface 82a. The flat surface 82a is pressed against the second protection member 23. Hence, the pressing plate 82 on the second protection member 23 side is a pressing member that is pressed against the second protection member 23. The release films 83, 84 are respectively disposed between the stacked body 230 and the pair of pressing plates 81, 82.

Figure 43:
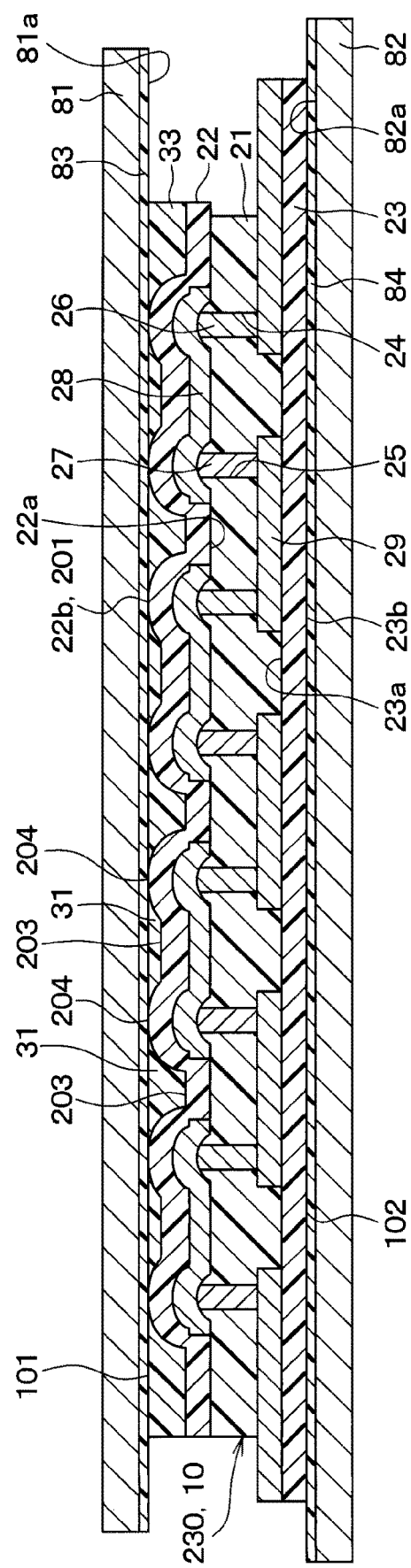
FIG. 43 is a cross-sectional view that is a continuation of FIG. 42, showing the condition when pressure is being applied.

In this condition, as shown in FIG. 43, the stacked body 230 is subjected to pressure in the stacking direction while being heated. The heating temperature is lower than the softening points of the insulating base member 21, first protection member 22 and second protection member 23 respectively, and is higher than the softening point of the sheet 33. As a result, the insulating base member 21, first protection member 22 and second protection member 23 are integrated.

Figure 44:
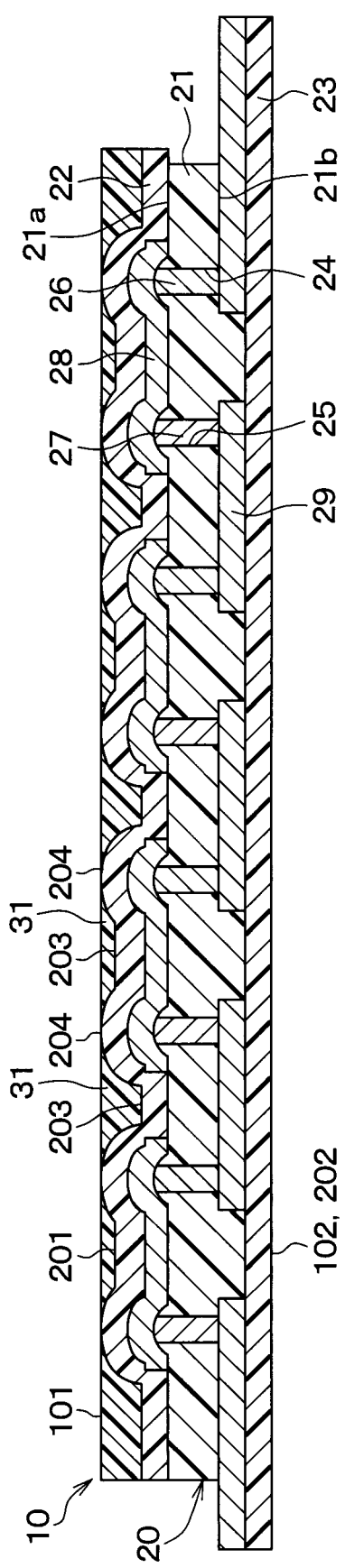
FIG. 44 is a cross-sectional view of a heat flux sensor, after the manufacturing step of FIG. 43.

Thereafter, the release films 83, 84, etc., are peeled off. The heat flux sensor 10 shown in FIG. 44 is manufactured in this way. The heat flux sensor 10 shown in FIG. 44 has the same configuration as the heat flux sensor 10 of the tenth embodiment.

In the thermocompression bonding step S23 the sheet 33 becomes softened, and flows. As a result of this flowing, the first sheet 33 functions as a buffer member. Hence, the first protection member 22 becomes deformed, following the uneven shape of the first conductor patterns 28 and the insulating base member 21. The rear surface 22b of the first protection member 22 has an uneven shape, with a plurality of concave portions 203 and a plurality of convex portions 204. The rear surface 22b of the first protection member 22 is on the opposite side from the insulating base member 21 side of the first protection member 22. The rear surface 22b of the first protection member 22 constitutes the first surface 201 of the main body 20, shown in FIG. 44. The respective concave portions 203 are formed at positions opposite those parts of the insulating base member 21 where there are no first thermoelectric elements 26 or second thermoelectric elements 27.

Furthermore, as a result of the flowing of the sheet 33, the filling member 31 is filled in the plurality of concave portions 203. At that time, the filling member 31 is formed in the concave portions 203 of the first protection member 22, and not on the peak parts of the convex portions 204.

Furthermore, the flat surface 81a on the sheet 33 side of the pressing plate 81 is pressed against the first sheet 33. As a result of this, the outer surface 101 of the heat flux sensor 10, constituted by the surface of the filling member 31 and the rear surface 22b of the surface 22 becomes flattened. Alternatively stated, the degree of flatness of the outer surface 101 of the heat flux sensor 10 that is constituted by the surface of the filling member 31 and the rear surface 22b of the first protection member 22 is higher than the degree of flatness of the rear surface 22b of the first protection member 22.

Furthermore, the flat surface 82a of the pressing plate 82 on the second protection member 23 side is pressed against the second protection member 23. Due to this, the rear surface 23b of the second protection member 23 attains a flat shape. That is to say, the outer surface 102 of the heat flux sensor 10, constituted by the rear surface 23b of the second protection member 23, is flattened.

In this way with the present embodiment, the insulating base member 21, the first protection member 22, the second protection member 23 and the sheet 33 are subjected to compression and heating as a batch. As a result, a heat flux sensor 10 having the same configuration as the heat flux sensor 10 of the tenth embodiment can also be manufactured.

With the present embodiment, the forming of the main body 20 and flattening by the filling member 31 can be performed by a single thermocompression process. With the present embodiment, the sheet 33 functions as a buffer member. Hence, thermocompression can be performed in the thermocompression bonding step S23 without using a buffer member.

Twelfth Embodiment

With the present embodiment, the heat flux sensor 10 of the first embodiment can be manufactured by means of the method of manufacture of the heat flux sensor 10 of the eleventh embodiment. With the present embodiment, the method of manufacture of the heat flux sensor 10 of the eleventh embodiment is changed as follows.

Figure 45:
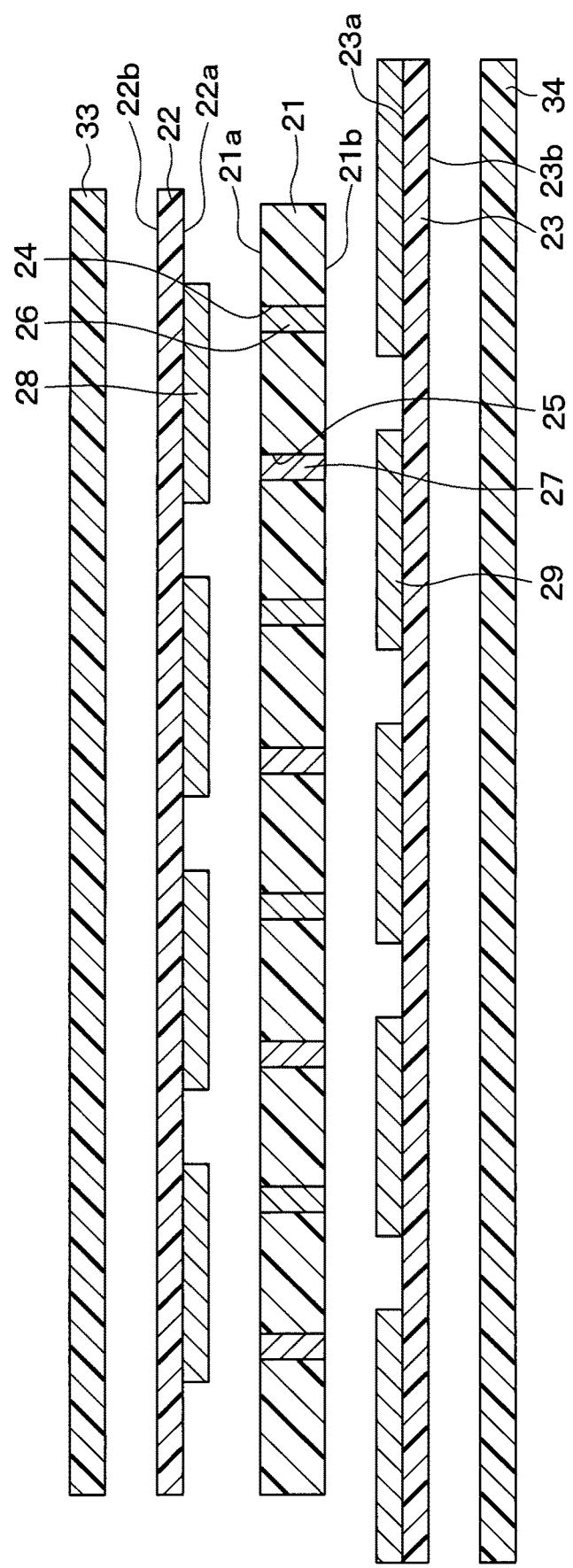
FIG. 45 is a cross-sectional view showing the method of manufacture of a heat flux sensor according to a twelfth embodiment.

In the preparation step S21, as shown in FIG. 45, the insulating base member 21, the first protection member 22, the second protection member 23 and the first sheet 33 are prepared. In addition, a second sheet 34 is prepared. The first sheet 33 corresponds to the first sheet 33 of the eleventh embodiment. The second sheet 34 is a film-like material which becomes second filling member 32 after the thermocompression bonding step S23. In the same way as for the first sheet 33, a material which can flow when subjected to the temperature and pressure of forming of the main body 20 of the heat flux sensor 10 is used as the film-like material which constitutes the second sheet 34.

Figure 46:
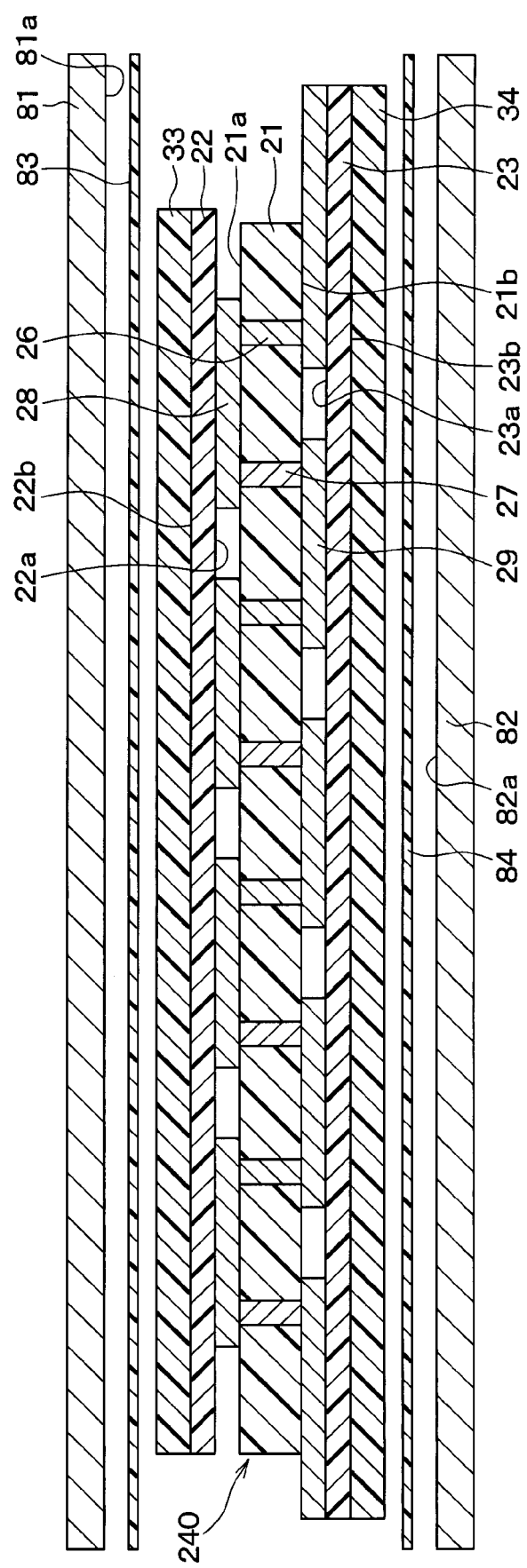
FIG. 46 is a cross-sectional view that is a continuation of FIG. 45, showing the arrangement of each member when pressure is being applied.

In the stacking step S22 as shown in FIG. 46, the insulating base member 21, the first protection member 22, the second protection member 23, the first sheet 33 and the second sheet 34 are stacked to form a stacked body 240. The insulating base member 21, the first protection member 22, the second protection member 23 and the first sheet 33 are stacked in the same way as for the stacked body 230 of the eleventh embodiment. In addition, the second sheet 34 is stacked on the rear surface 23b side of the second protection member 23. In this way, the second sheet 34 is set in a condition of being disposed on the side opposite to the insulating base member 21 side of the second protection member 23. Release films 83, 84 are disposed between the stacked body 240 and the pair of pair of pressing plates 81, 82 respectively.

Figure 47:
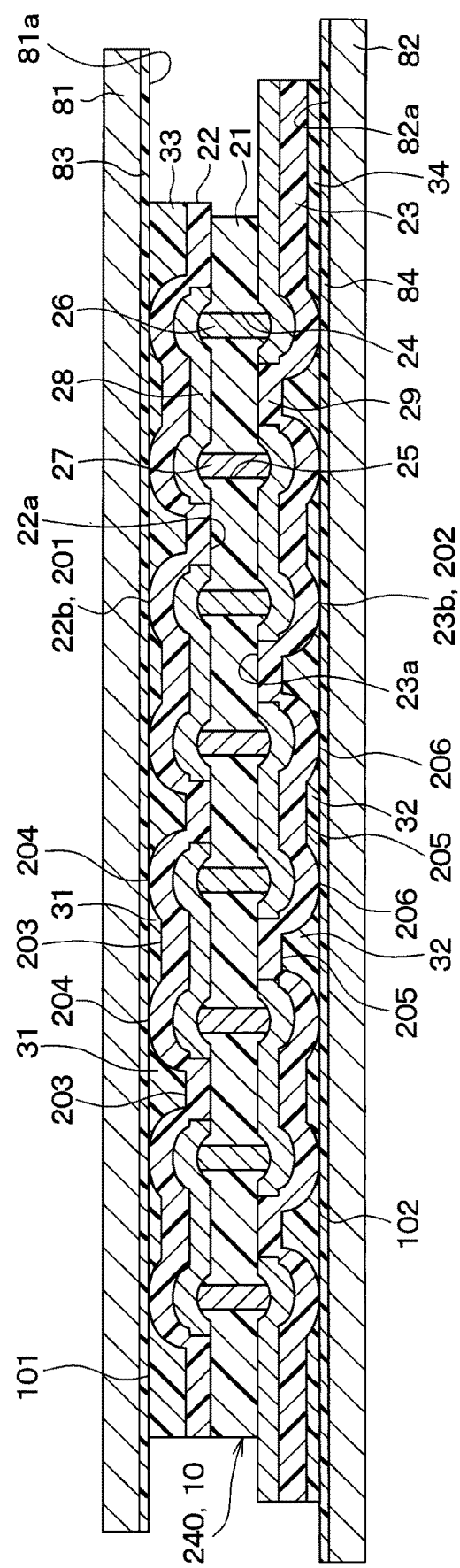
FIG. 47 is a cross-sectional view that is a continuation of FIG. 46, showing the condition when pressure is being applied.

In the thermocompression bonding step S23 as shown in FIG. 46, the pair of pressing plates 81, 82 sandwich the stacked body 240. As shown in FIG. 47, the stacked body 240 is subjected to pressure in the stacking direction of the stacked body 240 while being heated. As a result, the insulating base member 21, first protection member 22 and second protection member 23 become integrated.

Thereafter, the release films 83, 84 are peeled off. In this way, the heat flux sensor 10 shown in FIG. 48 is manufactured.

In the thermocompression bonding step S23, in the same way as for the eleventh embodiment, the first sheet 33 becomes softened and flows. Hence, as shown in FIG. 47, the outer surface 101 of the heat flux sensor 10, that is formed by the surface of the filling member 31 and the rear surface 22b of the first protection member 22, is flattened.

Furthermore, with the present embodiment, the second sheet 34 becomes softened and flows. As a result, the second sheet 34 functions as a buffer member. Hence, the second protection member 23 becomes deformed, following the irregular shapes of the second conductor patterns 29 and the insulating base member 21. The rear surface 23b of the second protection member 23 has an uneven shape, with a plurality of concave portions 205 and a plurality of convex portions 206. The rear surface 23b of the second protection member 23 is on the opposite side of the insulating base member 21 from the second protection member 23. The rear surface 23b of the second protection member 23 constitutes a second surface 202 of the main body 20, as shown in FIG. 48. The concave portions 205 are respectively formed at positions opposite parts of the second protection member 23 where there are no first thermoelectric elements 26 or second thermoelectric elements 27 in the insulating base member 21.

Furthermore, due to flowing of the second sheet 34, filling each of the concave portions 205, a second filling member 32 is formed. At that time, the second filling member 32 is not formed within the concave portions 205, excluding the peak parts of the convex portions 206, on the rear surface 23b of the main body 20.

Furthermore, the flat surface 82a of the pressing plate 82 is pressed against the second sheet 34 on the second sheet 34 side. As a result, the first surface 201 of the heat flux sensor 10 that is formed by the surface of the second filling member 32 and the rear surface 23b of the second protection member 23 becomes flattened. In other words, the degree of flatness of the outer surface 102 of the heat flux sensor 10, formed by the surface of the second filling member 32 and by the rear surface 23b of the second protection member 23 is higher than the degree of flatness of the rear surface 23b of the second protection member 23.

Other Embodiments (1) With the first and second embodiments, filling members 30 are filled in all of the concave portions 203 of the first surface 201, however, the disclosure is not limited to this. It suffices that filling members 30 are filled in at least one of the concave portions 203. In that case, the same effects can be obtained as for the first embodiment.

(2) With the first embodiment, the filling member 31 is formed within the concave portions 203 of the first surface 201, other than at the surfaces of the convex portions 204, however, the disclosure is not limited to this. It would be equally possible for the filling member 31 to be formed on the surfaces of the convex portions 204. That is to say, it would be equally possible to form the filling member 31 over the entire first surface 201. In that case, the entire outer surface 101 of the heat flux sensor 10 would be constituted by the surface of the filling member 31. This is similarly true for the second and the tenth embodiments.

(3) With the first, second and ninth embodiments, the filling members 30 are made of thermoplastic resin, however, the disclosure is not limited to this. It would be equally possible for the filling members 30 to be made of another material, having a higher thermal conductivity than air. It would be equally possible for the filling members 30 to be made of a resin other than thermoplastic resin. Examples of such other types of resin include a thermosetting resin such as epoxy resin, etc. In that case a B-stage type of thermosetting resin would be used to make the first sheet 33, described for the first embodiment. In this way, the filling members 30 can be formed. It should be noted that an A-stage type of thermosetting resin could be filled in the concave portions 203, by screen printing. Thereafter, the thermosetting resin would be hardened. It would be equally possible to form the filling members 30 in this way.

Furthermore, the filling members 30 are not limited to being made only of a resin. It would be equally possible for the filling members 30 to be made of a plurality of materials consisting of a resin and a material other than resin. The material other than resin preferably has a thermal conductivity that is higher than the thermal conductivity of resin. Examples of such a material are carbon powder, carbon fiber, etc. Furthermore, it would be equally possible for the filling members 30 to be made of a material other than resin. An example of such a material is metal paste consisting of a metal powder made into a paste. In the case of the filling members 60 of the fourth embodiment and the filling member 70 of the fifth embodiment also, in the same way as for the filling members 30, the material constituting the filling members is not limited.

(4) With the third and fourth embodiments, the plate-like member 50 is made of a metal, however, the disclosure is not limited to this. It would be equally possible for the plate-like member 50 to be made of a plurality of materials, consisting of a metal and a material other than metal.

(5) With the fourth embodiment, the filling members 60 are made of a thermoplastic resin, however, the disclosure is not limited to this. It would be equally possible for the filling members 60 to be made of a resin other than thermoplastic resin. Examples of such other resins are a thermosetting resin such as epoxy resin, etc. In that case, a B-stage type of thermosetting resin could be used to make the sheet 61, described for the fourth embodiment. In this way, the filling members 60 can be formed. In that case also, the main body 20 and the plate-like member 50 can be made to adhere by means of the filling members 60. Furthermore, the filling members 60 are not limited to the case of being made only of a resin. It would be equally possible for the filling members 60 to be made of a composite material consisting of a resin and a material other than resin. Preferable, a material having a higher thermal conductivity than the thermal conductivity of resin would be used as the material other than resin.

(6) With the fifth embodiment, the plate-like member 50 is made of a metal, however, the disclosure is not limited to this. It would be equally possible for the plate-like member 50a to be made of a composite material made of a metal and a material other than metal. Furthermore, it would be equally possible for the plate-like member 50a to be made of metal and ceramic, etc.

(7) With the fifth embodiment, the filling member 70 is made of thermoplastic resin, however, the disclosure is not limited to this. It would be equally possible for the filling member 60 to be made of a resin other than thermoplastic resin. Examples of such other resins are a thermosetting resin such as epoxy resin, etc. In that case, a B-stage type of thermosetting resin could be used to make the sheet 71, described for the fifth embodiment. In this way, the filling member 70 can be formed. Furthermore, the filling member 70 is not limited to the case of being made of only resin. It would be equally possible for the filling member 70 to be made of a composite material made of a resin and a material other than resin. Preferably, a material having a higher thermal conductivity than the thermal conductivity of a resin would be used as the material other than resin.

(8) With the third, fourth and fifth embodiments, the second surface 202 of the main body 20 has an uneven shape, however, it would be equally possible for the second surface 202 to have a flat shape, as with the tenth embodiment.

(9) With the eleventh and twelfth embodiments, in the preparation step S21, a plurality of first conductor patterns 28 are formed on the front surface 22a of the prepared first protection member 22. A plurality of second conductor patterns 29 are formed on the front surface 23a of the prepared second protection member 23. However, it would be equally possible for one or both of the plurality of first conductor patterns 28 and plurality of second conductor patterns 29 to be formed on the prepared insulating base member 21.

In these cases also, in the stacking step S22, the first protection member 22 would be set in a condition of being disposed on the surface 21a side of the insulating base member 21. As a result, the plurality of first conductor patterns 28 can be set in a condition of being disposed between the insulating base member 21 and the first protection member 22. The second protection member 23 is set in a condition of being disposed on the surface 21b side of the insulating base member 21. The plurality of second conductor patterns 29 can thereby be set in a condition of being disposed between the insulating base member 21 and the second protection member 23.

(10) The present disclosure is not limited to the above embodiments, and various modifications that are within the scope of the claims, and modifications that are within an equivalent scope, would be possible. Furthermore, with the above embodiments, other than for embodiments which are mutually unrelated or for which combinations of the embodiments are clearly impossible, the embodiments could be appropriately combined. Furthermore, with the above embodiments, constituent elements of an embodiment are not necessarily indispensable, other than in cases when the elements are explicitly stated to be particularly essential, and in cases when the elements can be considered to be obviously necessary in principle. Furthermore, with the above embodiments, in cases when a number such as a number of items, a numeric value, a quantity, range, etc., of constituent elements of the embodiment is mentioned, the embodiment is not limited to that specific number, unless it is stated particularly explicitly that the embodiment is limited to the specific number, or the embodiment is limited in principle to the specific number. Furthermore, with the above embodiments, when a material, shape, position relationship, etc. of constituent elements of the embodiment is referred to, the embodiment is not limited to that material, shape, position relationship, etc., other than in cases when it is specifically made clear that the embodiment is limited to that material, shape, position relationship, etc.

(Summary)

From a first aspect, shown in part or all of the above embodiments, a heat flux sensor has a main body and a flattening member. The flattening member is filled in at least one of a plurality of concave portions. The flattening member constitutes part of an outer surface. The degree of flatness of the outer surface is higher than the degree of flatness of the first surface.

Furthermore, according to a second aspect, a surface of the flattening member and a part of the first surface constitute the outer surface. Such a specific configuration may be utilized.

Furthermore, according to a third aspect, the flattening member is made at least of a resin. Such a specific configuration may be utilized.

Furthermore, according to a fourth aspect, the main body is made at least of a resin. The flattening member is made of a material having a higher thermal conductivity than resin, and has a plate-like member that is of plate form. The plate-like member has one surface and an other surface on the opposite side from the first surface. The one surface is stacked on the first surface of the main body, facing the first surface. Parts of the plate-like member are filled in the concave portions. The other surface constitutes an outer surface. Such a specific configuration may be utilized.

Furthermore, according to a fifth aspect, the flattening member moreover has filling members. The filling members are filled in gaps between parts of the plate-like member and the main body, in the interiors of concave portions, with the filling members being made of a material having a higher thermal conductivity than air. In this way, by comparison with the case in which filling by the filling members is not performed, heat flux can be more accurately measured.

Furthermore, according to a sixth aspect, the main body is made at least of a resin. The flattening member is made of a material having a higher thermal conductivity than resin, and has a plate-like member that is of plate form, and filling members made of a material different from that of the plate-like member. The plate-like member has one surface and an other surface on the opposite side from the first surface. One surface is stacked on the first surface of the main body, facing the first surface. Parts of the plate-like member are filled in the concave portions. The other surface constitutes an outer surface. Such a specific configuration may be utilized.

Furthermore, according to a seventh aspect, the plate-like member is made at least of a metal. Such a specific configuration may be utilized.

Furthermore, according to an eighth aspect, a method of manufacture of a heat flux sensor, provided with a main body which detects heat flux, has the following constituent elements. The body has a first surface and a second surface on the opposite side from the first surface, the first surface having an uneven shape with a plurality of concave portions and a plurality of convex portions. The method of manufacture of the heat flux sensor comprises preparing the main body and a filling member, and pressing a pressing member against the filler material, in a condition in which the filler material is disposed on the first surface side of the main body. In pressing against the filler material, a member having a flat surface with a degree of flatness that is higher than the degree of flatness of the first surface is used as the pressing member, with the flat surface being pressed against the filler material. In this way, at least one of the plurality of concave portions is filled, and filling members made of the filler material are formed. The degree of flatness of an outer surface of the heat flux sensor, that consists at least of surfaces of the filling members, is made higher than the degree of flatness of the first surface. A heat flux sensor according to the first aspect can be manufactured in this way.

Furthermore, according to a ninth aspect, in the preparation, a filler material consisting of a sheet-like material made at least of a resin is prepared. In the pressing, the filler material is made to fill the concave portions by means of being heated and caused to flow. The manufacturing may be performed in this specific way.

Furthermore, according to a tenth aspect, a method of manufacture of a heat flux sensor, provided with a main body which detects heat flux, has the following constituent elements. The body has a first surface, and a second surface on the opposite side from the first surface, the first surface having an uneven shape with a plurality of concave portions and a plurality of convex portions. The method of manufacture of the heat flux sensor comprises preparing the main body and a plate-like member having one surface and an other surface on the opposite side. This method of manufacture further includes stacking the plate-like member on the first surface side of the main body with one surface facing the first surface side, to form a stacked body, and applying pressure to the stacked body in the stacking direction of the stacked body. In the preparation, a member having one surface with an uneven shape, with a plurality of concave portions and a plurality of convex portions, is prepared as the plate-like member. The density of the plurality of concave portions and plurality of convex portions on the one surface of the plate-like member is higher than the density on the first surface. The degree of flatness of the other surface of this plate-like member is higher than the degree of flatness of the first surface. In the pressing, a part of the plate-like member is filled in at least one of the plurality of concave portions of the first surface, by means of deformation of the plurality of convex portions on the one surface such as to follow the uneven shape of the first surface.

A heat flux sensor according to the fourth aspect can be manufactured in this way.

Furthermore, according to an eleventh aspect, in the preparation, a sheet-like filler material which is made at least of a resin is prepared. In the forming of the stacked body, the stacked body is formed in a condition in which the filler material is disposed between a part of the plate-like member and the main body. In effecting the pressing, the filler material is heated and caused to flow, thereby filling gaps between the part of the plate-like member and the main body, within the concave portions, and forming filling members made of the filler material.

The filling members are preferably formed in this way. As a result, heat flux can be measured more accurately than when filling by the filling members is not performed. Furthermore, the main body and the plate-like member can be made to adhere together, by means of the filling members.

Furthermore, according to a twelfth aspect, a method of manufacture of a heat flux sensor, provided with a main body which detects heat flux, has the following constituent elements. The body has a first surface, and a second surface on the opposite side from the first surface, the first surface having an uneven shape with a plurality of concave portions and a plurality of convex portions. The method of manufacture of the heat flux sensor comprises preparing the main body and a plate-like member having one surface and an other surface on the opposite side, and a filler material that is different from the material of the plate-like member. This method of manufacture further comprises stacking the plate-like member on the first surface side of the main body, with the one face opposite the first surface side, to form a stacked body, and applying pressure to the stacked body in the stacking direction of the stacked body while applying heat. The method of manufacture of the sensor comprises preparing the main body, the plate-like member having one surface and an other surface on the opposite side, and the filler material that is different from the material of the plate-like member. Furthermore, the method of manufacture comprises stacking the plate-like member on the first surface side of the main body with one surface facing the first surface side, to form a stacked body, and applying pressure to the stacked body in the stacking direction of the stacked body while applying heat. In the preparation, a plate-like member is prepared which has a higher degree of flatness than the degree of flatness of the first surface. In the forming of the stacked body, the stacked body is formed in a condition in which the filler material is disposed between the plate-like member and the main body. In applying the pressure, at least one of the plurality of concave portions is filled, forming a plate-like member that is made of the filler material.

A heat flux sensor according to the sixth aspect can be manufactured in this way.

What is claimed is:

1. A heat flux sensor that detects heat flux comprising:
a main body that detects heat flux, having a first surface on a first surface side of the main body and a second surface on an opposite side of the main body from the first surface side, the first surface having an uneven shape with a plurality of concave portions and a plurality of convex portions; and
a flattening member disposed on the first surface side of the main body, made of a material having a higher thermal conductivity than air, for flattening an outer surface of the main body on the first surface side; wherein
the flattening member fills in at least one of the plurality of concave portions;
a surface of the flattening member constitutes at least part of the outer surface; and
a degree of flatness of the outer surface is higher than a degree of flatness of the first surface;
the main body is made at least of a resin;
the flattening member is made of a material having higher thermal conductivity than the resin and has a plate-like member of plate-like form;
the plate-like member has one surface and an other surface on an opposite side of the plate-like member from the one surface, and the one surface is stacked on the first surface side of the main body facing the first surface;
parts of the plate-like member fill in the concave portions; and
the other surface of the plate-like member constitutes the outer surface.

2. The heat flux sensor according to claim 1, wherein the flattening member further has filling members that are made of a material having higher thermal conductivity than air, with the filling members being filled in gaps between the parts of the plate-like member and the main body, in the interiors of the concave portions.

3. The heat flux sensor according to claim 1, wherein the flattening member further has filling members that are made of a filling material having higher thermal conductivity than air, with the filling members being filled in gaps between the parts of the plate-like member and the main body, in the interiors of the concave portions.

4. The heat flux sensor according to claim 1, wherein the plate-like member is made at least of a metal.

5. A method of manufacturing a heat flux sensor that comprises a main body which detects heat flux, with the main body having a first surface on a first surface side of the main body and a second surface on an opposite side of the main body from the first surface side, and the first surface having an uneven shape with a plurality of concave portions and a plurality of convex portions; and
  a flattening member disposed on the first surface side of the main body, made of a material having a higher thermal conductivity than air, for flattening an outer surface of the main body on the first surface side, a surface of the flattening member constitutes at least part of the outer surface, the flattening member fills in at least one of the plurality of concave portions; wherein
the method of manufacturing includes:
preparing the main body, a plate-like member that is plate-shaped and has one surface and an other surface on an opposite side of the plate-like member from the one surface, and a filler material that has a higher thermal conductivity than air the main body,
forming a stacked body by stacking the plate-like member on the first surface side of the main body with the one surface facing the first surface and disposed between the plate-like member and the first surface side of the main body, the other surface of the plate-like member constitutes the outer surface of the main body, and
applying pressure to the stacked body in a stacking direction of the stacked body to deform the one surface of the plate-like member to follow the uneven shape of the first surface such that a part of the plate-like member fills in at least one of the plurality of concave portions of the first surface and the filler material fills in gaps between the part of the plate-like member and the main body within the at least one of the plurality of concave portions of the first surface.

6. The method of manufacturing the heat flux sensor according to claim 5, wherein
in the preparing step, the filler material is prepared in a sheet-like form, made at least of a resin, and
in the applying pressure step, the filler material is filled in the at least one of the plurality of concave portions by being heated, causing the filler material to flow.

7. The method of manufacturing the heat flux sensor according to claim 5, wherein a degree of flatness of the other surface of the plate-like member is higher than a degree of flatness of the first surface.

8. A method of manufacturing a heat flux sensor that comprises a main body which detects heat flux, the main body having a first surface on a first surface side of the main body and a second surface on an opposite side of the main body from the first surface side, the first surface having an uneven shape with a plurality of concave portions and a plurality of convex portions; wherein
the method of manufacturing includes:
preparing the main body, made at least of a resin, and a plate-like member that is plate-shaped and has one surface and an other surface on an opposite side of the plate-like member from the one surface, and is made of a material having higher thermal conductivity than the resin which the main body is made of,
formation of a stacked body by stacking the plate-like member on the first surface side of the main body, with the one surface facing the first surface, and
application of pressure to the stacked body in a stacking direction of the stacked body; wherein
in the preparation, the plate-like member is prepared as a member on which the one surface has an uneven shape with a plurality of concave portions and a plurality of convex portions, with a density of the plurality of concave portions and the plurality of convex portions of the one surface being higher than a density of the plurality of concave portions and the plurality of convex portions on the first surface, and with a degree of flatness of the other surface of the plate-like member being higher than a degree of flatness of the first surface; and
in the application of pressure, by deforming the plurality of convex portions of the one surface such as to follow the uneven shape of the first surface, a part of the plate-like member is filled in at least one of the plurality of concave portions of the first surface.

9. The method of manufacturing the heat flux sensor according to claim 8, wherein the preparation step further comprises: preparing a sheet-like filler material that is made at least of a filling resin, and forming the stacked body in a condition in which the filler material is disposed between the main body and the plate-like member; wherein in the application of pressure, by heating the filler material and causing it to flow, the filler material is filled in gaps between the part of the plate-like member and the main body in the interiors of the concave portions, forming filling members that are made of the filler material.

10. A method of manufacturing a heat flux sensor that comprises a main body which detects heat flux, the main body having a first surface on a first surface side of the main body and a second surface on an opposite side of the main body from the first surface side, the first surface having an uneven shape with a plurality of concave portions and a plurality of convex portions
  a flattening member disposed on the first surface side of the main body, made of a material having a higher thermal conductivity than air, for flattening an outer surface of the main body on the first surface side, a surface of the flattening member constitutes at least part of the outer surface; the flattening member fills in at least one of the plurality of concave portions; wherein
the method of manufacturing includes: preparation of the main body made at least of a resin, a plate-like member that is plate-shaped and has one surface and an other surface on an opposite side of the plate-like member from the one surface and is made of a material having a higher thermal conductivity than the resin of the main body, and a filler material which is different from the material of the plate-like member and has a higher thermal conductivity than air,
formation of a stacked body by stacking the plate-like member on the first surface side of the main body, with the one surface facing the first surface of the main body and the other surface of the plate-like member constitutes the outer surface of the main body; and
application of pressure to the stacked body in a stacking direction of the stacked body, while applying heat; wherein
in the preparation, the plate-like member is prepared with the other surface having a higher degree of flatness than that of the first surface of the main body,
in the formation of the stacked body, the filler material is disposed between the main body and the plate-like member, and
in the application of pressure, the one surface of the plate-like member is deformed to follow the uneven shape of the first surface such that a part of the plate-like member fills in at least one of the plurality of concave portions of the first surface and the filler material fills in gaps between the part of the plate-like member and the main body within the at least one of the plurality of concave portions of the first surface, forming a filling member that is made of the filler material.

11. A method of manufacturing a heat flux sensor including:
- preparing a sheet-like insulating base member, a sheet-like first protection member, a sheet-like second protection member, and a flattening member having a plate-like member of plate-like form and a sheet-like filler material,
- forming a stacked body by stacking the insulating base member, the first protection member, the second protection member, the plate-like member, and the filler material, the insulating base member, the first protection member, and the second protection member being made at least of a resin, and
- integrating the insulating base member, the first protection member and the second protection member, by applying pressure while heating; wherein
- in the preparing step, the insulating base member is prepared as a member having one surface on a one surface side and an other surface on an opposite side of the insulating base member from the one surface side, and containing internally a plurality of first thermoelectric elements and a plurality of second thermoelectric elements, disposed respectively in mutual alternation, and the filler material-has a higher thermal conductivity than air;
- in the forming of the stacked body step, the first protection member is disposed on the one surface side of the insulating base member and the second protection member is disposed on the opposite side of the insulating base member from the one surface side,
- a plurality of first conductor patterns are disposed between the insulating base member and the first protection member, with each of the plurality of first conductor patterns being set in contact with a first thermoelectric element and a second thermoelectric element that are mutually adjacent, among the plurality of first thermoelectric elements and second thermoelectric elements,
- the flattening member having the plate-like member is disposed on a side of the first protection member that is opposite from the insulating base member, the flattening member being made of a material having a higher thermal conductivity than air and a higher thermal conductivity than the resin,
- a plurality of second conductor patterns are disposed between the insulating base member and the second protection member, with each of the plurality of second conductor patterns being set in contact with a first thermoelectric element and a second thermoelectric element that are mutually adjacent, among the plurality of first thermoelectric elements and second thermoelectric elements; and
- in the application of pressure, the filler material is caused to flow, while also the first protection member is deformed, making a surface of the first protection member on the side of the first protection member that is opposite from the insulating base member have an uneven shape with a plurality of concave portions and a plurality of convex portions, the plate-like member is caused to deform to follow the uneven shape of the surface of the first protection member such that a part of the flattening member having the plate-like member fills in at least one of the plurality of concave portions on the surface of the first protection member, the filler material is caused to flow, forming a filling member that fills in gaps between the part of the plate-like member and the first protection member within the at least one of the concave portions to flatten the surface of the first protection member such that a surface of the flattening member constitutes at least part of an outer surface of the heat flux sensor, and a degree of flatness of the outer surface of the heat flux sensor, that is constituted by at least a surface of the plate-like member, is higher than a degree of flatness of the surface of the first protection member that is on the side of the first protection member that is opposite from the insulating base member, the plate-like member having a first surface and a second surface opposite of the plate-like member from the first surface with the first surface being stacked on the surface of the first protection member and the second surface of the plate-like member constituting the outer surface of the heat flux sensor.

* * * * *